US012738986B2

(12) United States Patent
Elshafie et al.

(10) Patent No.: US 12,738,986 B2
(45) Date of Patent: Sep. 15, 2026

(54) RECONFIGURABLE SURFACE TRAINING FOR SIDELINK

(71) Applicant: QUALCOMM INCORPORATED, San Diego, CA (US)

(72) Inventors: Ahmed Elshafie, San Diego, CA (US); Hung Dinh Ly, San Diego, CA (US); Yu Zhang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 240 days.

(21) Appl. No.: 18/722,476

(22) PCT Filed: Feb. 11, 2022

(86) PCT No.: PCT/CN2022/075969

§ 371 (c)(1),
(2) Date: Jun. 20, 2024

(87) PCT Pub. No.: WO2023/151001

PCT Pub. Date: Aug. 17, 2023

(65) Prior Publication Data

US 2025/0047327 A1 Feb. 6, 2025

(51) Int. Cl.

*H04B 7/04* (2017.01)
*H04B 7/06* (2006.01)

(Continued)

(52) U.S. Cl.

CPC ....... *H04B 7/04013* (2023.05); *H04B 7/0695* (2013.01); *H04L 5/0048* (2013.01); *H04W 24/10* (2013.01)

(58) Field of Classification Search

CPC ............ H04B 7/04013; H04B 7/04026; H04B 7/06954; H04B 7/0452; H04B 7/0695;

(Continued)

(56) References Cited

U.S. PATENT DOCUMENTS 11,799,536 B2 * 10/2023 Ashari ................. H04B 7/0417
12,334,996 B2 * 6/2025 Prasad ............... H04B 7/04013

(Continued)

FOREIGN PATENT DOCUMENTS

CN 108886397 A 11/2018
CN 109565805 A 4/2019

(Continued)

OTHER PUBLICATIONS

3GPP: "3rd Generation Partnership Project, Technical Specification Group Radio Access Network, NR, Medium Access Control (MAC) Protocol Specification (Release 16)", 3GPP TS 38.321 V16.5.0, Technical Specification, 3GPP Organizational Partners, Sophia Antipolis Valbonne, France, pp. 137-138 and 150, Jun. 2021, 5 Pages.

(Continued)

*Primary Examiner* — Bailor C Hsu
(74) *Attorney, Agent, or Firm* — Holland & Hart LLP

(57) ABSTRACT

Methods, systems, and devices for wireless communications are described. The described techniques provide for beam training a reconfigurable intelligent surface (RIS) for sidelink communications between UEs. A base station may transmit an indication of a resource pool to a receiving UE and a transmitting UE for beam training a RIS. The transmitting UE may identify a resource pattern for training the RIS using the indicated resource pool where the resource pattern is associated with a pattern of beams at the RIS. The transmitting UE may transmit a sidelink reference signal using the identified resource. The receiving UE may receive the reference signal via the RIS according the pattern of beams and transmit a beam report to the transmitting UE. Beam training may be based on a capability of the RIS to use either a different beamformer or a different RIS configuration on different subchannels of the same resource pool.

30 Claims, 28 Drawing Sheets

600

(51) Int. Cl.
*H04L 5/00* (2006.01)
*H04W 24/10* (2009.01)

(58) Field of Classification Search
CPC ... H04L 5/0048; H04L 5/0051; H04L 5/0057; H04L 5/0094; H04W 8/24; H04W 24/02; H04W 24/10
See application file for complete search history.

(56) References Cited

U.S. PATENT DOCUMENTS

| | | | | |
|---|---|---|---|---|
| 12,470,273 | B2 * | 11/2025 | MolavianJazi | H04B 7/0639 |
| 2022/0060238 | A1 * | 2/2022 | Jassal | H04L 5/0005 |
| 2023/0144085 | A1 * | 5/2023 | Dutta | G01S 3/14<br>342/350 |
| 2023/0179277 | A1 | 6/2023 | Yang et al. | |
| 2024/0015797 | A1 * | 1/2024 | Sahraei | H04B 7/04013 |
| 2024/0413858 | A1 * | 12/2024 | Mcmenamy | H04W 24/10 |

FOREIGN PATENT DOCUMENTS

| | | | |
|---|---|---|---|
| CN | 113316967 | A | 8/2021 |
| WO | WO-2019160788 | A1 | 8/2019 |
| WO | WO-2022007417 | A1 | 1/2022 |
| WO | WO-2022028292 | A1 | 2/2022 |
| WO | WO-2023123007 | A1 | 7/2023 |

OTHER PUBLICATIONS

3GPP: "3rd Generation Partnership Project, Technical Specification Group Radio Access Network, NR, Physical Layer Procedures for Data (Release 16)", 3GPP TS 38.214 V16.6.0, Technical Specification, 3GPP Organizational Partners, Sophia Antipolis Valbonne, France, pp. 163-165, Jun. 2021, 5 Pages.

Supplementary Partial European Search Report—EP22925363—Search Authority—Munich—Aug. 14, 2025.

Ericsson: "Aperiodic CSI and CSI-RS Resource Pooling", 3GPP Draft; 3GPP TSG-RAN WG1 #86bis, R1-1609763, 3rd Generation Partnership Project, Mobile Competence Centre, 650, Route Des Lucioles, F-06921 Sophia-Antipolis Cedex, France, vol. RAN WG1, No. Lisbon, Portugal, Oct. 10, 2016-Oct. 14, 2016, Oct. 14, 2016, 4 Pages, XP051149793.

International Search Report and Written Opinion—PCT/CN2022/075969—ISA/EPO—Oct. 26, 2022.

Supplementary European Search Report EP22925363 Search Authority Munich Nov. 4, 2025.

* cited by examiner

200

300

500

600

800

1500

1700

2600

RECONFIGURABLE SURFACE TRAINING FOR SIDELINK

CROSS REFERENCE

The present Application is a 371 national stage filing of International PCT Application No. PCT/CN2022/075969 by Elshafie et al. entitled "RECONFIGURABLE SURFACE TRAINING FOR SIDELINK," filed Feb. 11, 2022, which is assigned to the assignee hereof, and which is expressly incorporated by reference in its entirety herein.

FIELD OF TECHNOLOGY

The following relates to wireless communications, including reconfigurable surface training for sidelink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (e.g., one or more network devices) or one or more network access nodes, each simultaneously supporting communication for multiple communication devices, which may be otherwise known as user equipment (UE).

SUMMARY

The described techniques relate to improved methods, systems, devices, and apparatuses that support reconfigurable surface training for sidelink. Generally, the described techniques provide for beam training for a reconfigurable surface (e.g., a reconfigurable intelligent surface (RIS)) for sidelink communications between a transmitting user equipment (UE) and a receiving UE that may include using a configured resource pool and reference signal resource allocations within the resource pool. A receiving UE and/or a transmitting UE may indicate to a network device that the receiving UE and the transmitting UE may communicate through a RIS. The network device may transmit an indication of a resource pool to the receiving UE and the transmitting UE for beam training the RIS for sidelink communications between the receiving UE and the transmitting UE. The transmitting UE may identify a resource pattern for training the RIS using the indicated resource pool where the resource pattern is associated with a pattern of beams at the RIS. In some examples, the network device may indicate the resource pattern (e.g., assign resources for the training). In some examples, the transmitting UE may identify resources to train the RIS. The transmitting UE may transmit a sidelink reference signal using the identified resource. The receiving UE may receive the reference signal via the RIS according the pattern of beams and transmit a beam report to the transmitting UE based on the received reference signal. In some examples, the receiving UE may report the best or strongest beams. In some examples, the receiving UE may report the best or strongest beams and the worst or weakest beams (which may be helpful in groupcast cases or when the transmitting UE serves multiple receiving UEs in a unicast manner in order to reduce interference. The transmitting UE and the receiving UE may transmit and receive sidelink communications using the RIS based on the beam report.

In some examples, the RIS may have a capability to use either a different beamformer or a different RIS configuration on different subchannels of the same resource pool. In some examples, the RIS may indicate the capability to the network device and transmitting UE, and the network device may divide and define the resource pool into sub-resource pools with a resource gap between the sub-resource pools. The transmitting UE may change beams across the sub-resource pools when training the RIS, or the transmitting UE may use the same beam and the RIS may use a different RIS configuration across the different sub-resource pools to receive the beam. The receiving UE may apply the resource gap and receive the reference signals using the sub-resource pools.

A method for wireless communication at a first user equipment (UE) is described. The method may include receiving an indication of a resource pool for training a reconfigurable surface for sidelink communications with a second UE, transmitting a reference signal over a subset of resources of the resource pool according to a resource pattern, where the resource pattern is identified based on the resource pool and is associated with a pattern of beams for the reconfigurable surface, and receiving a report indicating at least one selected beam of the pattern of beams.

An apparatus for wireless communication at a first UE is described. The apparatus may include a processor, memory coupled with the processor, and instructions stored in the memory. The instructions may be executable by the processor to cause the apparatus to receive an indication of a resource pool for training a reconfigurable surface for sidelink communications with a second UE, transmit a reference signal over a subset of resources of the resource pool according to a resource pattern, where the resource pattern is identified based on the resource pool and is associated with a pattern of beams for the reconfigurable surface, and receive a report indicating at least one selected beam of the pattern of beams.

Another apparatus for wireless communication at a first UE is described. The apparatus may include means for receiving an indication of a resource pool for training a reconfigurable surface for sidelink communications with a second UE, means for transmitting a reference signal over a subset of resources of the resource pool according to a resource pattern, where the resource pattern is identified based on the resource pool and is associated with a pattern of beams for the reconfigurable surface, and means for receiving a report indicating at least one selected beam of the pattern of beams.

A non-transitory computer-readable medium storing code for wireless communication at a first UE is described. The code may include instructions executable by a processor to receive an indication of a resource pool for training a reconfigurable surface for sidelink communications with a second UE, transmit a reference signal over a subset of resources of the resource pool according to a resource pattern, where the resource pattern is identified based on the resource pool and is associated with a pattern of beams for the reconfigurable surface, and receive a report indicating at least one selected beam of the pattern of beams.

Some examples of the method, apparatuses, and non-transitory computer-readable medium described herein may further include operations, features, means, or instructions for receiving an indication of the resource pattern, where the resource pattern includes a set of symbols across one or more slots of the resource pool and resource gaps between one or more symbols of the set of symbols.

In some examples of the method, apparatuses, and non-transitory computer-readable medium described herein, the resource pattern may be based on an indicated capability of the reconfigurable surface to switch between different beams or different configurations for the reconfigurable surface.

Some examples of the method, apparatuses, and non-transitory computer-readable medium described herein may further include operations, features, means, or instructions for receiving an indication of a set of multiple resource patterns associated with the resource pool and selecting the resource pattern from the set of multiple resource patterns based on one or more attributes of the sidelink communications.

Some examples of the method, apparatuses, and non-transitory computer-readable medium described herein may further include operations, features, means, or instructions for transmitting an indication of the resource pattern to the second UE via one of a radio resource control message, a medium access control control element message, a sidelink control information message, or a physical sidelink shared channel message.

Some examples of the method, apparatuses, and non-transitory computer-readable medium described herein may further include operations, features, means, or instructions for receiving, from a network entity, an indication of a report format, where receiving the report indicating the at least one selected beam of the pattern of beams may be based on the report format.

In some examples of the method, apparatuses, and non-transitory computer-readable medium described herein, receiving the indication of the report format may include operations, features, means, or instructions for receiving the indication of the report format via one of a radio resource control message or a medium access control control element message.

In some examples of the method, apparatuses, and non-transitory computer-readable medium described herein, the report format includes a first set of best beams, a second set of worst beams, one or more metrics associated with beams of the pattern of beams, or a combination thereof.

In some examples of the method, apparatuses, and non-transitory computer-readable medium described herein, the one or more metrics associated with the beams of the pattern of beams include a reference signal received power measurement, a reference signal received quality measurement, or a signal to interference and noise ratio.

In some examples of the method, apparatuses, and non-transitory computer-readable medium described herein, the report format indicates a selected metric of the one or more metrics based on a determined priority or a determined quality of service target associated with the sidelink communications.

Some examples of the method, apparatuses, and non-transitory computer-readable medium described herein may further include operations, features, means, or instructions for receiving, from a network entity, an indication of a set of report formats associated with a set of priorities and quality of service targets and transmitting, to the second UE, an indication of a selected report format of the set of report formats associated with the set of priorities and quality of service targets, where receiving the report indicating the at least one selected beam of the pattern of beams may be based on the selected report format.

Some examples of the method, apparatuses, and non-transitory computer-readable medium described herein may further include operations, features, means, or instructions for receiving, from a network entity, an indication of a set of report formats associated with a set of priorities and transmitting, to the second UE, an indication of a priority of the set of priorities for the reference signal, where receiving the report indicating the at least one selected beam of the pattern of beams includes receiving the report based on a report format of the set of report formats associated with the indicated priority.

Some examples of the method, apparatuses, and non-transitory computer-readable medium described herein may further include operations, features, means, or instructions for receiving, from a network entity, an indication of a set of frequency watermarks associated with the resource pool for the reconfigurable surface: where transmitting the reference signal over the subset of resources of the resource pool may be based on a selected frequency watermark associated with the resource pool of the set of frequency watermarks.

In some examples of the method, apparatuses, and non-transitory computer-readable medium described herein, transmitting the reference signal over the subset of resources of the resource pool may include operations, features, means, or instructions for transmitting the reference signal over a set of multiple transmit beams associated with the subset of resources.

In some examples of the method, apparatuses, and non-transitory computer-readable medium described herein, the report further indicates at least one selected transmit beam of the set of multiple transmit beams.

Some examples of the method, apparatuses, and non-transitory computer-readable medium described herein may further include operations, features, means, or instructions for communicating with the second UE via the reconfigurable surface based on the at least one selected beam.

A method for wireless communication at a second UE is described. The method may include receiving an indication of a resource pool for training a reconfigurable surface for sidelink communications with a first UE, receiving, from the first UE via the reconfigurable surface, a reference signal over a subset of resources of the resource pool according to a pattern of beams for the reconfigurable surface, where the pattern of beams is based on a resource pattern associated with the resource pool, and transmitting, to the first UE, a report indicating at least one selected beam of the pattern of beams.

An apparatus for wireless communication at a second UE is described. The apparatus may include a processor, memory coupled with the processor, and instructions stored in the memory. The instructions may be executable by the processor to cause the apparatus to receive an indication of a resource pool for training a reconfigurable surface for sidelink communications with a first UE, receive, from the first UE via the reconfigurable surface, a reference signal over a subset of resources of the resource pool according to a pattern of beams for the reconfigurable surface, where the pattern of beams is based on a resource pattern associated with the resource pool, and transmit, to the first UE, a report indicating at least one selected beam of the pattern of beams.

Another apparatus for wireless communication at a second UE is described. The apparatus may include means for receiving an indication of a resource pool for training a reconfigurable surface for sidelink communications with a first UE, means for receiving, from the first UE via the reconfigurable surface, a reference signal over a subset of resources of the resource pool according to a pattern of beams for the reconfigurable surface, where the pattern of beams is based on a resource pattern associated with the resource pool, and means for transmitting, to the first UE, a report indicating at least one selected beam of the pattern of beams.

A non-transitory computer-readable medium storing code for wireless communication at a second UE is described. The code may include instructions executable by a processor to receive an indication of a resource pool for training a reconfigurable surface for sidelink communications with a first UE, receive, from the first UE via the reconfigurable surface, a reference signal over a subset of resources of the resource pool according to a pattern of beams for the reconfigurable surface, where the pattern of beams is based on a resource pattern associated with the resource pool, and transmit, to the first UE, a report indicating at least one selected beam of the pattern of beams.

Some examples of the method, apparatuses, and non-transitory computer-readable medium described herein may further include operations, features, means, or instructions for receiving an indication of the resource pattern, where the resource pattern includes a set of symbols across one or more slots of the resource pool and resource gaps between one or more symbols of the set of symbols.

In some examples of the method, apparatuses, and non-transitory computer-readable medium described herein, receiving the reference signal may include operations, features, means, or instructions for monitoring for the reference signal during the set of symbols.

In some examples of the method, apparatuses, and non-transitory computer-readable medium described herein, the resource pattern may be based on an indicated capability of the reconfigurable surface to switch between different beams or different configurations for the reconfigurable surface.

Some examples of the method, apparatuses, and non-transitory computer-readable medium described herein may further include operations, features, means, or instructions for receiving, from the first UE, an indication of the resource pattern via one of a radio resource control message, a medium access control control element message, a sidelink control information message, or a physical sidelink shared channel message.

Some examples of the method, apparatuses, and non-transitory computer-readable medium described herein may further include operations, features, means, or instructions for receiving, from a network entity, an indication of a report format, where transmitting the report indicating the at least one selected beam of the pattern of beams may be based on the report format.

In some examples of the method, apparatuses, and non-transitory computer-readable medium described herein, receiving the indication of the report format may include operations, features, means, or instructions for receiving the indication of the report format via one of a radio resource control message or a medium access control control element message.

In some examples of the method, apparatuses, and non-transitory computer-readable medium described herein, the report format includes a first set of best beams, a second set of worst beams, one or more metrics associated with beams of the pattern of beams, or a combination thereof.

In some examples of the method, apparatuses, and non-transitory computer-readable medium described herein, the one or more metrics associated with the beams of the pattern of beams include a reference signal received power measurement, a reference signal received quality measurement, or a signal to interference and noise ratio.

In some examples of the method, apparatuses, and non-transitory computer-readable medium described herein, the report format indicates a selected metric of the one or more metrics based on a determined priority or a determined quality of service target associated with the sidelink communications.

Some examples of the method, apparatuses, and non-transitory computer-readable medium described herein may further include operations, features, means, or instructions for receiving, from a network entity, an indication of a set of report formats associated with a set of priorities and quality of service targets and receiving, from the first UE, an indication of a selected report format of the set of report formats associated with the set of priorities and quality of service targets, where transmitting the report indicating the at least one selected beam of the pattern of beams may be based on the selected report format.

Some examples of the method, apparatuses, and non-transitory computer-readable medium described herein may further include operations, features, means, or instructions for receiving, from a network entity, an indication of a set of report formats associated with a set of priorities and receiving, from the first UE, an indication of a priority of the set of priorities associated with the reference signal, where transmitting the report indicating the at least one selected beam of the pattern of beams includes transmitting the report based on a report format of the set of report formats associated with the indicated priority.

Some examples of the method, apparatuses, and non-transitory computer-readable medium described herein may further include operations, features, means, or instructions for receiving, from a network entity, an indication of a set of frequency watermarks associated with the resource pool for the reconfigurable surface: where receiving the reference signal over the subset of resources of the resource pool may be based on a selected frequency watermark associated with the resource pool of the set of frequency watermarks.

Some examples of the method, apparatuses, and non-transitory computer-readable medium described herein may further include operations, features, means, or instructions for communicating with the first UE via the reconfigurable surface based on the at least one selected beam.

A method for wireless communication at a second UE is described. The method may include receiving a first indication of a resource pool for training a reconfigurable surface for sidelink communications between a first UE and the second UE, where the resource pool includes a first sub-resource pool, a second sub-resource pool, and a resource gap, and where the resource gap is based on an indicated capability of the reconfigurable surface to support different beams or different configurations for the reconfigurable surface between sub-resource pools, receiving, from the first UE via the reconfigurable surface, a first reference signal over the first sub-resource pool in a first beam, receiving, from the first UE via the reconfigurable surface, a second reference signal over the second sub-resource pool in a second beam, and transmitting, to the first UE, a report indicating a selection of the first beam or the second beam for communicating with the first UE via the reconfigurable surface.

An apparatus for wireless communication at a second UE is described. The apparatus may include a processor, memory coupled with the processor, and instructions stored in the memory. The instructions may be executable by the processor to cause the apparatus to receive a first indication of a resource pool for training a reconfigurable surface for sidelink communications between a first UE and the second UE, where the resource pool includes a first sub-resource pool, a second sub-resource pool, and a resource gap, and where the resource gap is based on an indicated capability of the reconfigurable surface to support different beams or different configurations for the reconfigurable surface between sub-resource pools, receive, from the first UE via the reconfigurable surface, a first reference signal over the first sub-resource pool in a first beam, receive, from the first UE via the reconfigurable surface, a second reference signal over the second sub-resource pool in a second beam, and transmit, to the first UE, a report indicating a selection of the first beam or the second beam for communicating with the first UE via the reconfigurable surface.

Another apparatus for wireless communication at a second UE is described. The apparatus may include means for receiving a first indication of a resource pool for training a reconfigurable surface for sidelink communications between a first UE and the second UE, where the resource pool includes a first sub-resource pool, a second sub-resource pool, and a resource gap, and where the resource gap is based on an indicated capability of the reconfigurable surface to support different beams or different configurations for the reconfigurable surface between sub-resource pools, means for receiving, from the first UE via the reconfigurable surface, a first reference signal over the first sub-resource pool in a first beam, means for receiving, from the first UE via the reconfigurable surface, a second reference signal over the second sub-resource pool in a second beam, and means for transmitting, to the first UE, a report indicating a selection of the first beam or the second beam for communicating with the first UE via the reconfigurable surface.

A non-transitory computer-readable medium storing code for wireless communication at a second UE is described. The code may include instructions executable by a processor to receive a first indication of a resource pool for training a reconfigurable surface for sidelink communications between a first UE and the second UE, where the resource pool includes a first sub-resource pool, a second sub-resource pool, and a resource gap, and where the resource gap is based on an indicated capability of the reconfigurable surface to support different beams or different configurations for the reconfigurable surface between sub-resource pools, receive, from the first UE via the reconfigurable surface, a first reference signal over the first sub-resource pool in a first beam, receive, from the first UE via the reconfigurable surface, a second reference signal over the second sub-resource pool in a second beam, and transmit, to the first UE, a report indicating a selection of the first beam or the second beam for communicating with the first UE via the reconfigurable surface.

Some examples of the method, apparatuses, and non-transitory computer-readable medium described herein may further include operations, features, means, or instructions for receiving the first reference signal includes receiving the first reference signal based on a first configuration of the reconfigurable surface for the first sub-resource pool and receiving the second reference signal includes receiving the second reference signal based on a second configuration of the reconfigurable surface for the second sub-resource pool.

In some examples of the method, apparatuses, and non-transitory computer-readable medium described herein, and the method, apparatuses, and non-transitory computer-readable medium may include further operations, features, means, or instructions for receiving, from the reconfigurable surface, a third reference signal over the third sub-resource pool via a third beam.

In some examples of the method, apparatuses, and non-transitory computer-readable medium described herein, the indicated capability may be based on an ability of the reconfigurable surface to adjust surface elements of the reconfigurable surface over a frequency range.

In some examples of the method, apparatuses, and non-transitory computer-readable medium described herein, the first sub-resource pool includes a first set of symbols within a first frequency range and the second sub-resource pool includes a second set of symbols within a second frequency range and the resource gap includes a duration of time between the first set of symbols and the second set of symbols or a third frequency range between the first frequency range and the second frequency range.

In some examples of the method, apparatuses, and non-transitory computer-readable medium described herein, the first beam may be associated with a first transmit beam transmitted by the first UE and a first configuration of the reconfigurable surface and the second beam may be associated with a second transmit beam transmitted by the first UE and the first configuration of the reconfigurable surface.

Some examples of the method, apparatuses, and non-transitory computer-readable medium described herein may further include operations, features, means, or instructions for transmitting, to the first UE with the report, an indication of a second selection of the first transmit beam or the second transmit beam for communicating with the first UE via the reconfigurable surface.

A method for wireless communication at a network entity is described. The method may include receiving an indication of a capability of a reconfigurable surface to support different beams or different configurations for the reconfigurable surface between sub-resource pools and transmitting an indication of a resource pool for training the reconfigurable surface for sidelink communications between a first UE and a second UE, where the resource pool includes a first sub-resource pool, a second sub-resource pool, and a resource gap, and where the resource gap is based on the indicated capability of the reconfigurable surface.

An apparatus for wireless communication at a network entity is described. The apparatus may include a processor, memory coupled with the processor, and instructions stored in the memory. The instructions may be executable by the processor to cause the apparatus to receive an indication of a capability of a reconfigurable surface to support different beams or different configurations for the reconfigurable surface between sub-resource pools and transmit an indication of a resource pool for training the reconfigurable surface for sidelink communications between a first UE and a second UE, where the resource pool includes a first sub-resource pool, a second sub-resource pool, and a resource gap, and where the resource gap is based on the indicated capability of the reconfigurable surface.

Another apparatus for wireless communication at a network entity is described. The apparatus may include means for receiving an indication of a capability of a reconfigurable surface to support different beams or different configurations for the reconfigurable surface between sub-resource pools and means for transmitting an indication of a resource pool for training the reconfigurable surface for sidelink communications between a first UE and a second UE, where the resource pool includes a first sub-resource pool, a second sub-resource pool, and a resource gap, and where the resource gap is based on the indicated capability of the reconfigurable surface.

A non-transitory computer-readable medium storing code for wireless communication at a network entity is described. The code may include instructions executable by a processor to receive an indication of a capability of a reconfigurable surface to support different beams or different configurations for the reconfigurable surface between sub-resource pools and transmit an indication of a resource pool for training the reconfigurable surface for sidelink communications between a first UE and a second UE, where the resource pool includes a first sub-resource pool, a second sub-resource pool, and a resource gap, and where the resource gap is based on the indicated capability of the reconfigurable surface.

In some examples of the method, apparatuses, and non-transitory computer-readable medium described herein, the first sub-resource pool includes a first set of symbols within a first frequency range and the second sub-resource pool includes a second set of symbols within a second frequency range and the resource gap includes a duration of time between the first set of symbols and the second set of symbols or a third frequency range between the first frequency range and the second frequency range.

In some examples of the method, apparatuses, and non-transitory computer-readable medium described herein, the capability may be based on an ability of the reconfigurable surface to adjust surface elements of the reconfigurable surface over a frequency range.

Some examples of the method, apparatuses, and non-transitory computer-readable medium described herein may further include operations, features, means, or instructions for transmitting a second indication of a first beam of the reconfigurable surface associated with the first sub-resource pool and a second beam of the reconfigurable surface associated with the second sub-resource pool.

Some examples of the method, apparatuses, and non-transitory computer-readable medium described herein may further include operations, features, means, or instructions for transmitting a second indication of a first transmit beam for the first sub-resource pool and of a second transmit beam for the second sub-resource pool.

In some examples of the method, apparatuses, and non-transitory computer-readable medium described herein, the resource pool includes a third sub-resource pool and a second resource gap.

DETAILED DESCRIPTION

Figure 1:
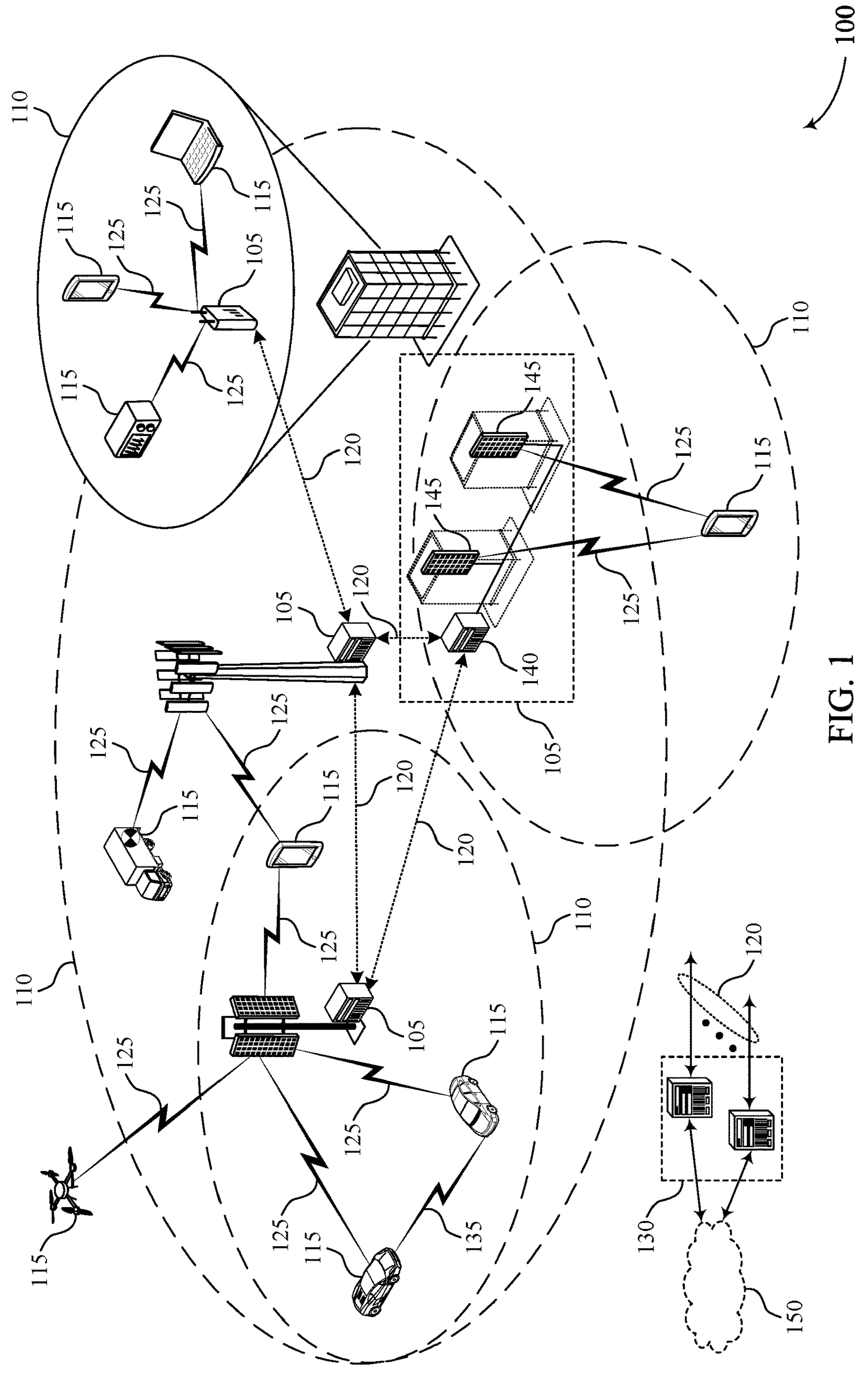
FIG. 1 illustrates an example of a wireless communications system that supports reconfigurable surface training for sidelink in accordance with aspects of the present disclosure.

Some wireless communications such as fifth generation (5G) New Radio (NR) systems may employ reconfigurable surfaces (e.g., a reconfigurable intelligent surfaces (RIS)) to extend wireless communications coverage, for example around or because of blockages, with negligible power consumption costs. RISs extend coverage by redirecting (e.g., reflecting, refracting) beams around blockages so that a network device may serve a user equipment (UE) in the presence of the blockages. RISs may be used for sidelink communications between UEs. Successful use of a RIS for sidelink communications may involve beam training the RIS for communications between a transmitting UE and a receiving UE.

The present disclosure relates to techniques for beam training a RIS for sidelink communications between a transmitting UE and a receiving UE that may include using a configured resource pool and reference signal resource allocations within the resource pool. A receiving UE and/or a transmitting UE may indicate to a network device that the receiving UE and the transmitting UE may communicate through a RIS. The network device may transmit an indication of a resource pool to the receiving UE and the transmitting UE for beam training the RIS for sidelink communications between the receiving UE and the transmitting UE. The transmitting UE may identify a resource pattern for training the RIS using the indicated resource pool where the resource pattern is associated with a pattern of beams at the RIS. In some examples, the network device may indicate the resource pattern (e.g., assign resources for the training). In some examples, the transmitting UE may identify resources to train the RIS. The transmitting UE may transmit a sidelink reference signal using the identified resource. The receiving UE may receive the reference signal via the RIS according the pattern of beams and transmit a beam report to the transmitting UE based on the received reference signal. In some examples, the receiving UE may report the best or strongest beams. In some examples, the receiving UE may report the best or strongest beams and the worst or weakest beams (which may be helpful in groupcast cases or when the transmitting UE serves multiple receiving UEs in a unicast manner in order to reduce interference. In some examples, the network device may configure and indicate the nature of the report to the receiving UE, the transmitting UE, and the RIS. The receiving UE may compare the received beams based on a metric such as reference signal received power (RSRP), reference signal received quality (RSRQ), or signal to interference and noise ratio (SINR). In some examples, the receiving UE may Additionally, or alternatively report the metrics of the received beams. In some examples, the network device may configure the RIS with frequency watermarks, and the transmitting UE or the receiving UE may select a watermark on a per resource pool basis. The transmitting UE and the receiving UE may transmit and receive sidelink communications using the RIS based on the beam report.

Additionally, or alternatively, the RIS may have a capability to use either a different beamformer or a different RIS configuration on different subchannels of the same resource pool. In some examples, the RIS may indicate the capability to the network device and transmitting UE, and the network device may divide and define the resource pool into sub-resource pools with a resource gap between the sub-resource pools. The transmitting UE may change beams across the sub-resource pools when training the RIS, or the transmitting UE may use the same beam and the RIS may use a different RIS configuration across the different sub-resource pools to receive the beam. The receiving UE may apply the resource gap and receive the reference signals using the sub-resource pools.

Aspects of the disclosure are initially described in the context of wireless communications systems. Aspects of the disclosure are further illustrated by and described with reference to wireless communications systems, resource diagrams, resource mappings, and process flows. Aspects of the disclosure are further illustrated by and described with reference to apparatus diagrams, system diagrams, and flowcharts that relate to reconfigurable surface training for sidelink.

FIG. 1 illustrates an example of a wireless communications system 100 that supports reconfigurable surface training for sidelink in accordance with aspects of the present disclosure. The wireless communications system 100 may include one or more network devices 105 (e.g., a base station or one or more components of a base station), one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The network devices 105 may be dispersed throughout a geographic area to form the wireless communications system 100 and may be devices in different forms or having different capabilities. The network devices 105 and the UEs 115 may wirelessly communicate via one or more communication links 125. Each network device 105 may provide a coverage area 110 over which the UEs 115 and the network device 105 may establish one or more communication links 125. The coverage area 110 may be an example of a geographic area over which a network device 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the network devices 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, network device 105, entity of a core network 130, apparatus, device, or computing system configured to perform any techniques described herein. For example, a network node may be a UE 115. As another example, a network node may be a network device 105. As another example, a first network node may be configured to communicate with a second network node or a third network node. In one aspect of this example, the first network node may be a UE 115, the second network node may be a network device 105, and the third network node may be a UE 115. In another aspect of this example, the first network node may be a UE 115, the second network node may be a network device 105, and the third network node may be a network device 105. In yet other aspects of this example, the first, second, and third network nodes may be different. Similarly, reference to a UE 115, a network device 105, an apparatus, a device, or a computing system may include disclosure of the UE 115, network device 105, apparatus, device, or computing system being a network node. For example, disclosure that a UE 115 is configured to receive information from a network device 105 also discloses that a first network node is configured to receive information from a second network node. In this example, consistent with this disclosure, the first network node may refer to a first UE 115, a first network device 105, a first apparatus, a first device, or a first computing system configured to receive the information; and the second network node may refer to a second UE 115, a second network device 105, a second apparatus, a second device, or a second computing system.

The network devices 105 may communicate with the core network 130, or with one another, or both. For example, the network devices 105 may interface with the core network 130 through one or more backhaul links 120 (e.g., via an S1, N2, N3, or other interface). The network devices 105 may communicate with one another over the backhaul links 120 (e.g., via an X2, Xn, or other interface) either directly (e.g., directly between network devices 105), or indirectly (e.g., via core network 130), or both. In some examples, the backhaul links 120 may be or include one or more wireless links.

One or more of the network devices 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network devices 105 and the network equipment including macro eNBs or gNBs, small cell eNBs or gNBs, or relay base stations, among other examples, as shown in FIG. 1.

The UEs 115 and the network devices 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a network device 105, or downlink transmissions from a network device 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the network devices 105, the UEs 115, or both) may have hardware configurations that support communications over a particular carrier bandwidth or may be configurable to support communications over one of a set of carrier bandwidths. In some examples, the wireless communications system 100 may include network devices 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network devices 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each network device 105 may provide communication coverage via one or more cells, for example a macro cell, a small cell, a hot spot, or other types of cells, or any combination thereof. The term "cell" may refer to a logical communication entity used for communication with a network device 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the network device 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network device 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network device 105 may support one or multiple cells and may also support communications over the one or more cells using one or multiple component carriers.

In some examples, a carrier may support multiple cells, and different cells may be configured according to different protocol types (e.g., MTC, narrow band IoT (NB-IoT), enhanced mobile broadband (eMBB)) that may provide access for different types of devices.

In some examples, a network device 105 may be movable and therefore provide communication coverage for a moving geographic coverage area 110. In some examples, different geographic coverage areas 110 associated with different technologies may overlap, but the different geographic coverage areas 110 may be supported by the same network device 105. In other examples, the overlapping geographic coverage areas 110 associated with different technologies may be supported by different network devices 105. The wireless communications system 100 may include, for example, a heterogeneous network in which different types of the network devices 105 provide coverage for various geographic coverage areas 110 using the same or different radio access technologies.

The wireless communications system 100 may support synchronous or asynchronous operation. For synchronous operation, the network devices 105 may have similar frame timings, and transmissions from different network devices 105 may be approximately aligned in time. For asynchronous operation, the network devices 105 may have different frame timings, and transmissions from different network devices 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network device 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrow band communications), or a combination of these techniques. For example, some UEs 115 may be configured for operation using a narrow band protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a network device 105. Other UEs 115 in such a group may be outside the geographic coverage area 110 of a network device 105 or be otherwise unable to receive transmissions from a network device 105. In some examples, groups of the UEs 115 communicating via D2D communications may utilize a one-to-many (1:M) system in which each UE 115 transmits to every other UE 115 in the group. In some examples, a network device 105 facilitates the scheduling of resources for D2D communications. In other cases, D2D communications are carried out between the UEs 115 without the involvement of a network device 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network devices 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network devices 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a network device 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or network device 105 may be distributed across various network devices (e.g., radio heads and ANCs) or consolidated into a single network device (e.g., a network device 105).

Thus, as described herein, a base station may include one or more components that are located at a single physical location or one or more components located at various physical locations. In examples in which the base station includes components that are located at various physical locations, the various components may each perform various functions such that, collectively, the various components achieve functionality that is similar to a base station that is located at a single physical location. As such, a base station described herein may equivalently refer to a standalone base station (also known as a monolithic base station) or a base station including components that are located at various physical locations or virtualized locations (also known as a disaggregated base station). In some implementations, such a base station including components that are located at various physical locations may be referred to as or may be associated with a disaggregated radio access network (RAN) architecture, such as an Open RAN (O-RAN) or Virtualized RAN (VRAN) architecture. In some implementations, such components of a base station may include or refer to one or more of a central unit (or centralized unit CU), a distributed unit (DU), or a radio unit (RU).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network devices 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the network devices 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network device 105 or a UE 115 may be equipped with multiple antennas, which may be used to employ techniques such as transmit diversity, receive diversity, multiple-input multiple-output (MIMO) communications, or beamforming. The antennas of a network device 105 or a UE 115 may be located within one or more antenna arrays or antenna panels, which may support MIMO operations or transmit or receive beamforming. For example, one or more network device antennas or antenna arrays may be co-located at an antenna assembly, such as an antenna tower. In some examples, antennas or antenna arrays associated with a network device 105 may be located in diverse geographic locations. A network device 105 may have an antenna array with a number of rows and columns of antenna ports that the network device 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The network devices 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network device 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network device 105 or a UE 115 may use beam sweeping techniques as part of beam forming operations. For example, a network device 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network device 105 multiple times in different directions. For example, the network device 105 may transmit a signal according to different beamforming weight sets associated with different directions of transmission. Transmissions in different beam directions may be used to identify (e.g., by a transmitting device, such as a network device 105, or by a receiving device, such as a UE 115) a beam direction for later transmission or reception by the network device 105.

Some signals, such as data signals associated with a particular receiving device, may be transmitted by a network device 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the network device 105 in different directions and may report to the network device 105 an indication of the signal that the UE 115 received with a highest signal quality or an otherwise acceptable signal quality.

In some examples, transmissions by a device (e.g., by a network device 105 or a UE 115) may be performed using multiple beam directions, and the device may use a combination of digital precoding or radio frequency beamforming to generate a combined beam for transmission (e.g., from a network device 105 to a UE 115). The UE 115 may report feedback that indicates precoding weights for one or more beam directions, and the feedback may correspond to a configured number of beams across a system bandwidth or one or more sub-bands. The network device 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a network device 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the network device 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a network device 105 or a core network 130 supporting radio bearers for user plane data. At the physical layer, transport channels may be mapped to physical channels.

The UEs 115 and the network devices 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, the wireless communications systems 100 may employ one or more RISs to extend wireless communications coverage, for example around or because of blockages in the communications link 125 between a network device 105 and a UE 115 or in a sidelink communication link 135 between UEs 115. RISs extend coverage by redirecting beams around blockages. Successful use of a RIS for sidelink communications may involve beam training the RIS for communications between a transmitting UE 115 and a receiving UE 115.

In some examples, a transmitting UE 115 and a receiving UE 115 may perform beam training for a RIS for sidelink communications between the transmitting UE 115 and the receiving UE 115. Beam training the RIS may include using a configured resource pool and reference signal resource allocations within the resource pool. A receiving UE 115 and/or a transmitting UE 115 may indicate to a network device 105 that the receiving UE 115 and the transmitting UE 115 may communicate through a RIS. The network device 105 may transmit an indication of a resource pool to the receiving UE 115 and the transmitting UE 115 for beam training the RIS for sidelink communications between the receiving UE 115 and the transmitting UE 115. The transmitting UE 115 may identify a resource pattern for training the RIS using the indicated resource pool where the resource pattern is associated with a pattern of beams at the RIS. In some examples, the network device 105 may indicate the resource pattern (e.g., assign resources for the training). In some examples, the transmitting UE 115 may identify resources to train the RIS. The transmitting UE 115 may transmit a sidelink reference signal using the identified resource. The receiving UE 115 may receive the reference signal via the RIS according the pattern of beams and transmit a beam report to the transmitting UE 115 based on the received reference signal. In some examples, the receiving UE 115 may report the best or strongest beams. In some examples, the receiving UE 115 may report the best or strongest beams and the worst or weakest beams (which may be helpful in groupcast cases or when the transmitting UE 115 serves multiple receiving UEs 115 in a unicast manner in order to reduce interference. In some examples, the network device 105 may configure and indicate the nature of the report to the receiving UE 115, the transmitting UE 115, and the RIS. The receiving UE 115 may compare the received beams based on a metric such as RSRP, RSRQ, or SINR. In some examples, the receiving UE 115 may additionally, or alternatively, report the metrics of the received beams. In some examples, the network device 105 may configure the RIS with frequency watermarks, and the transmitting UE 115 or the receiving UE 115 may select a watermark on a per resource pool basis. The transmitting UE

115 and the receiving UE 115 may transmit and receive sidelink communications using the RIS based on the beam report.

Additionally, or alternatively, the RIS may have a capability to use either a different beamformer or a different RIS configuration on different subchannels of the same resource pool. In some examples, the RIS may indicate the capability to the network device 105 and transmitting UE 115, and the network device 105 may divide and define the resource pool into sub-resource pools with a resource gap between the sub-resource pools. The transmitting UE 115 may change beams across the sub-resource pools when training the RIS, or the transmitting UE 115 may use the same beam and the RIS may use a different RIS configuration across the different sub-resource pools to receive the beam. The receiving UE 115 may apply the resource gap and receive the reference signals using the sub-resource pools.

Figure 2:
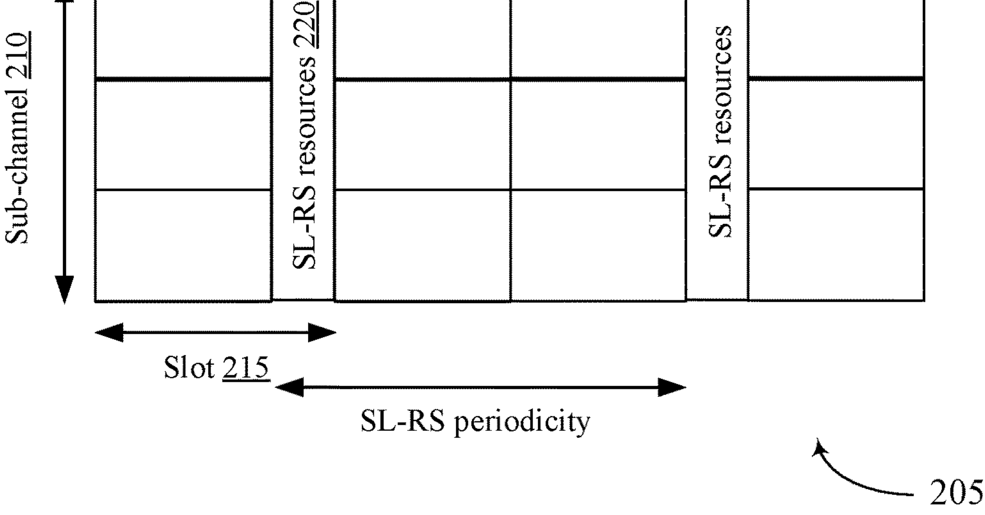
FIG. 2 illustrates an example of a resource diagram that supports reconfigurable surface training for sidelink in accordance with aspects of the present disclosure.
Figure 2:
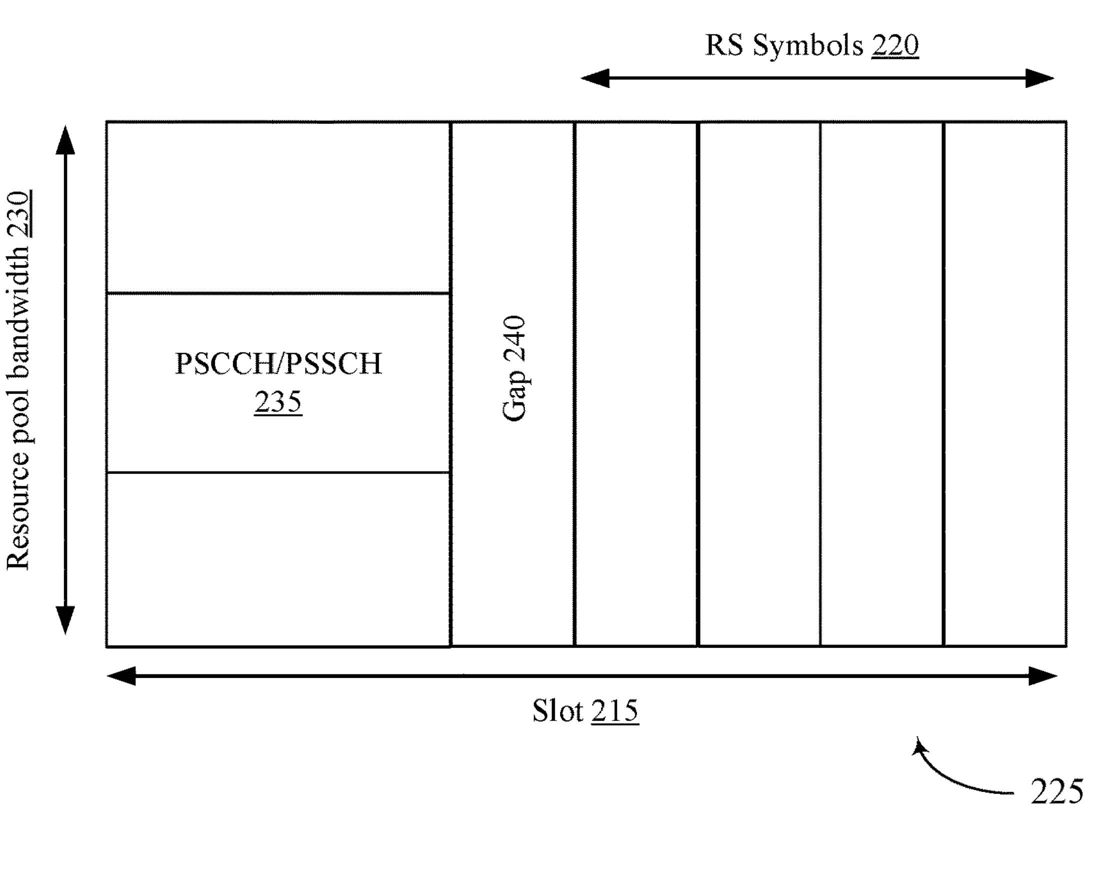

FIG. 2 illustrates an example of a resource diagram 200 that supports reconfigurable surface training for sidelink in accordance with aspects of the present disclosure.

In sidelink communications between UEs 115, a transmitting UE 115 may transmit CSI-RS to a receiving UE 115, and the receiving UE 115 may provide channel state information (CSI) feedback for beam selection based on the CSI-RS. The transmitting UE 115 may transmit CSI-RS within a unicast physical sidelink shared channel (PSSCH) transmission if CSI reporting is enabled by the higher layer parameter sl-CSI-Acquisition and the "CSI Request" field in the corresponding sidelink control information (SCI) format 0-2 is set to 1. For CSI-RS transmission, several parameters may be configured by the higher layer signaling, including: nrofPortsCSIRS-SL which indicates the number of ports for sidelink CSI-RS (1 and 2 antenna ports are supported); firstSymbolInTimeDomainCSIRS-SL which indicates the first OFDM symbol in a physical resource block (PRB) used for sidelink CSI-RS; frequDomainAllocationCSIRS-SL which indicates the frequency domain allocation for sidelink CSI-RS. CSI-RS density of one resource element per port per resource block is supported. Zero-power CSI-RS may not be supported on sidelink.

Channel state information feedback may include channel quality indicator (CQI) and rank indicator (RI) which may be reported together. The CQI may be calculated conditioned on the reported RI. CSI reporting for sidelink may be aperiodic. Aperiodic CSI-RS for sidelink may be triggered by the transmitting UE 115 via SCI. For SCI reporting for sidelink, wideband CQI reporting may be supported. A wideband CQI may be reported for the entire CSI reporting band (which may be the PSSCH transmission band).

The sidelink CSI reporting medium access control (MAC) control element (MAC-CE) may be identified by a MAC header with a logical channel identifier (LCID) specified in the MAC header. The priority of the sidelink CSI reporting MAC-CE may be fixed to "1". The sidelink reporting MAC-CE may include RI, which may indicate the derived value of the RI for the sidelink CSI reporting and may have a 1 bit length. Additionally or alternatively, the sidelink reporting MAC-CE may include CQI, which may indicate the derived value of the CQI for the sidelink CSI reporting and may have a 4 bit length. The sidelink reporting MAC-CE may also include one or more reserved bits set to 0.

In some examples, the CSI-triggering UE 115 (e.g., a transmitting UE 115) may not be allowed to trigger another aperiodic CSI report for the same receiving UE 115 before the last slot of the expected reception or completion of the ongoing aperiodic CSI report associated with the SCI format 2-A with the "CSI Request" field set to 1. To control the sidelink CSI reporting procedure, RRC may configure the parameter sl-LatencyBound-CSI-Report which may be maintained for each PC5-RRC connection. The supported range of sl-LatencyBound-CSI-Report may be {3, . . . , 160} slots.

In some examples, the MAC entity for each pair of the source layer 2 identifier and the destination layer 2 identifier corresponding to a PC5-RRC connection which has been established by an upper layer may be greater than 1 if the sidelink CSI reporting has been triggered by an SCI and not canceled. In some examples, the MAC entity for each pair of the source layer 2 identifier and the destination layer 2 identifier corresponding to a PC5-RRC connection which has been established by an upper layer may be greater than 2 if the latency target of the sidelink CSI reporting in sl-LatencyBound-CSI-Report cannot be met. In some examples, if the MAC entity for each pair of the source layer 2 identifier and the destination layer 2 identifier corresponding to a PC5-RRC connection which has been established by an upper layer is greater than 3, then triggered sidelink CSI reporting may be canceled. In some examples, the MAC entity for each pair of the source layer 2 identifier and the destination layer 2 identifier corresponding to a PC5-RRC connection which has been established by an upper layer may be greater than 2 if the MAC entity has sidelink resources allocated for a new transmission and the sidelink shared channel resources can accommodate the sidelink CSI reporting MAC-CE and its subheader as a result of logical channel prioritization. In some examples, if the MAC entity for each pair of the source layer 2 identifier and the destination layer 2 identifier corresponding to a PC5-RRC connection which has been established by an upper layer is greater than 3 the MAC entity may instruct the multiplexing and assembly procedure to generate a sidelink CSI reporting MAC-CE or to cancel the triggered sidelink CSI reporting. In some examples, the MAC entity for each pair of the source layer 2 identifier and the destination layer 2 identifier corresponding to a PC5-RRC connection which has been established by an upper layer is greater than 2 if the MAC entity has been configured with sidelink resource allocation mode 1. In some examples, if the MAC entity for each pair of the source layer 2 identifier and the destination layer 2 identifier corresponding to a PC5-RRC connection which has been established by an upper layer is greater than 3, then a scheduling request is triggered. The MAC entity configured with sidelink resource allocation mode 1 may trigger a scheduling request if a transmission of a pending sidelink CSI reporting with the sidelink grants cannot fulfill the latency target associated with the sidelink CSI reporting.

To improve resource efficiency for both mode 1 and mode 2 resource allocation, an enhanced CSI reporting using wide-band may be enabled. As shown in the resource diagram 200, in some cases a set of symbols or resource elements per sidelink slots or full slots 215 may be set aside for wide-band sidelink reference signals (RS) on a per resource pool basis. As shown in resource diagrams 205 and 225, in some examples, for a sub-channel 210 or a resource pool bandwidth 230 (associated with a physical sidelink control channel (PSCCH) or a PSSCH 235), a number of symbols 220 at the end of some sidelink slots may be used for sidelink RS. In some examples, one or more gap symbols 240 may separate the PSCCH/PSSCH 235 from the RS symbols 220. In some examples, a number of resource elements may be used for sidelink RS. In some examples, a number of slots may be fully allocated to sidelink RS, and similarly to sidelink synchronization signal block, some slots may be identified as unavailable for sidelink communications. A sidelink RS configuration may be limited to a sidelink bandwidth by may not be restricted to any of the resource pools provided to a UE 115. For UE triggered autonomous CSI acquisition, some slots may be associated with a resource pool and physical sidelink feedback channel (PSFCH) resources may be present in such slots.

Figure 3:
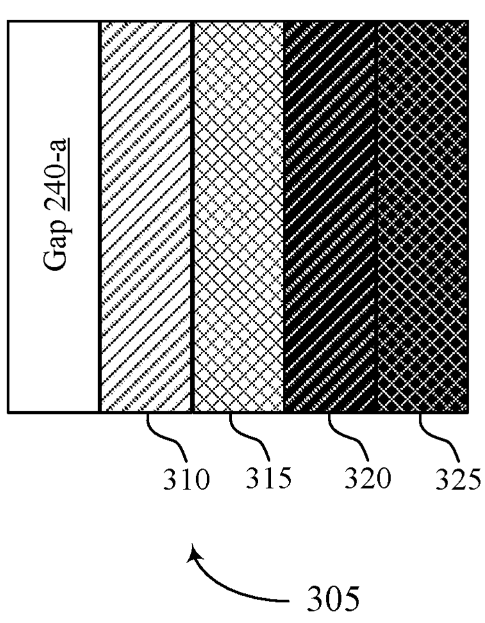
FIG. 3 illustrates an example of a resource diagram that supports reconfigurable surface training for sidelink in accordance with aspects of the present disclosure.
Figure 3:
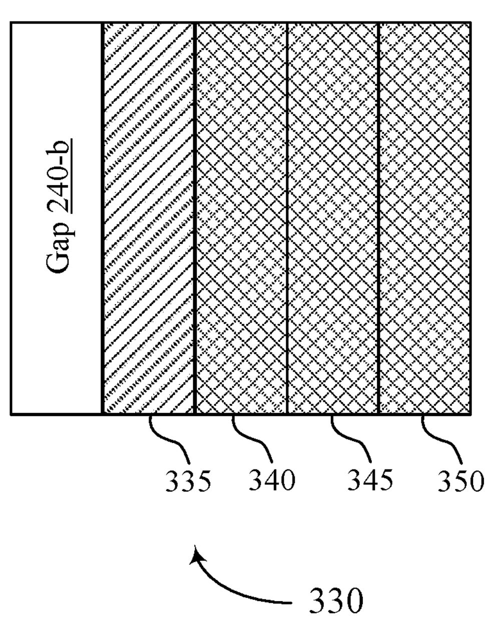
Figure 3:
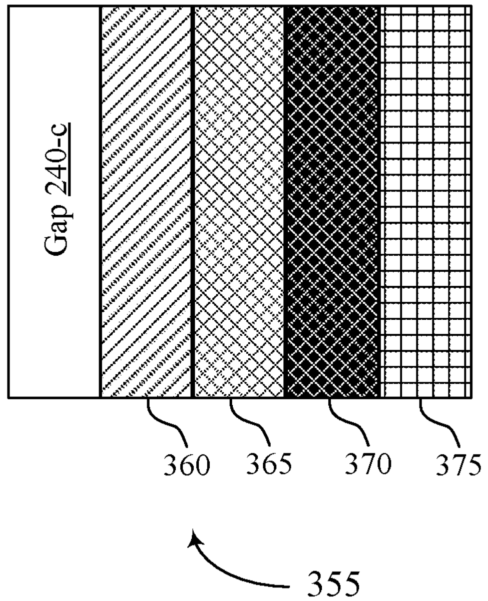

FIG. 3 illustrates an example of a resource diagram 300 that supports reconfigurable surface training for sidelink in accordance with aspects of the present disclosure. Multiple RS configurations may be provided for a resource pool as shown in resource diagrams 305, 330, and 355.

For example, as shown in resource diagram 305, after a gap symbol 240-*a*, a first UE 115 may reserve two symbols 310 and 315 (where symbol 310 may be an automatic gain control (AGC) symbol), and a second UE 115 may reserve to symbols 320 and 325 (where symbol 320 may be an AGC symbol). The RS symbols 315 and 325 may not be repeated.

As shown in resource diagram 330, after a gap symbol 240-*b*, a UE may reserve four symbols 335, 340, 345, and 350, where symbol 335 is an AGC symbol, and the RS is repeated over symbols 340, 345, and 350.

As shown in resource diagram 355, after a gap symbol 240-*c*, three UEs 115 may share an AGC symbol 360 and each reserve one RS symbol (symbols 365, 370, and 375).

Once a configuration is provided for a resource pool, all UEs 115 communicating via sidelink communications may rate-match their transmissions and receptions around the reserved resources. The UEs 115 communicating via sidelink communications may assume that transmissions are rate-matched. In some examples, if may be inefficient for the UE receiving sidelink RS and the UE transmitting on the overlapping resources are not physically close. Under mode 1 resource allocation, more efficient resource utilization may be achieved if the network device 105 is provided sidelink cross link interference (CLI) information. Under mode 2 resource allocation, reservations for resources may be made to provide greater efficiency.

For periodic sidelink RS transmission, a transmitting UE 115 may transmit a sidelink RS to a receiving UE 115. The receiving UE 115 may perform CSI estimation and transmit sidelink scheduling information to the transmitting UE 115 based on the CSI estimation. The transmitting UE 115 may transmit a sidelink transmission according to the scheduling information, and the UEs 115 may repeat this process periodically.

For aperiodic sidelink RS with CSI estimation at a relay UE 115 (e.g., where the network device 105 is in communication with a receiving UE 115), a network device 105 may transmit a sidelink RS request to the receiving UE 115, which may forward the sidelink RS request to the transmitting UE 115. The transmitting UE 115 may transmit the sidelink RS to the receiving UE 115. The receiving UE 115 may perform CSI estimation and transmit a CSI report to the network device 105. The network device 105 may transmit scheduling information to the receiving UE 115, which may forward the scheduling information to the transmitting UE 115. The transmitting UE 115 may transmit a sidelink transmission according to the scheduling information.

For aperiodic sidelink RS with CSI estimation at a remote UE 115 (e.g., where the network device 105 is in communication with a transmitting UE 115), a network device 105 may transmit a sidelink RS request to the transmitting UE 115. The transmitting UE 115 may transmit a sidelink RS to the receiving UE 115, which may perform CSI estimation and transmit a CSI report to the transmitting UE 115, which may forward the CSI report to the network device 105. The network device 105 may transmit sidelink scheduling information to the transmitting UE 115, which may transmit a sidelink transmission based on the scheduling information.

Sidelink RS may be independent of data transmission, and may be periodic or aperiodic (e.g., based on a request from a network device 105 or a relay or remote UE 115). Sidelink RS may be sent by a remote UE 115 or a primary or relay UE 115 followed by a report from a remote UE 115.

Figure 4:
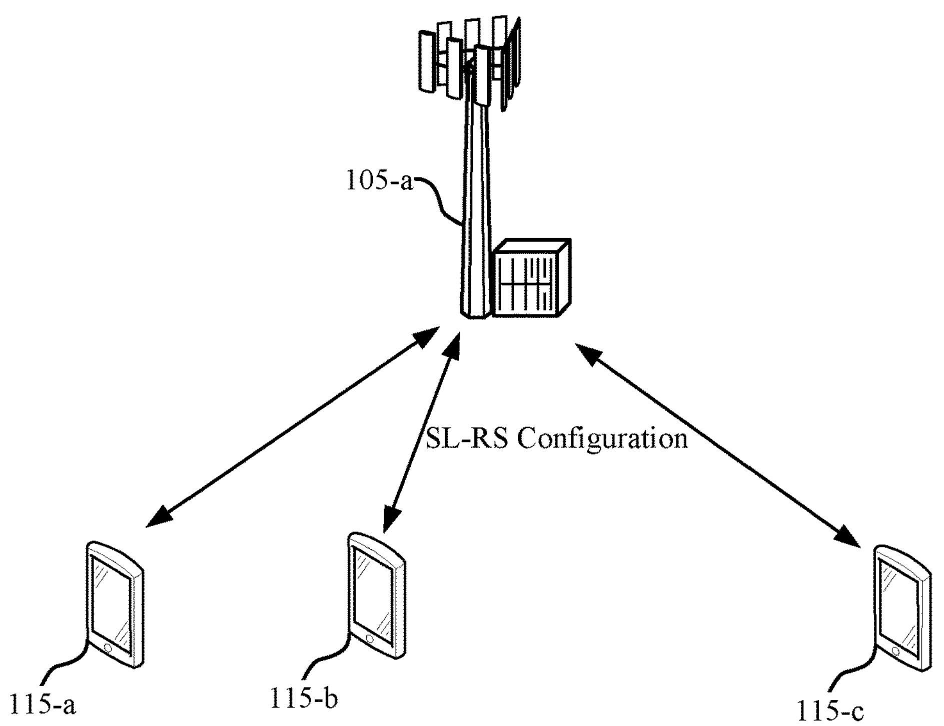
FIG. 4 illustrates an example of a resource mapping that supports reconfigurable surface training for sidelink in accordance with aspects of the present disclosure.
Figure 4:
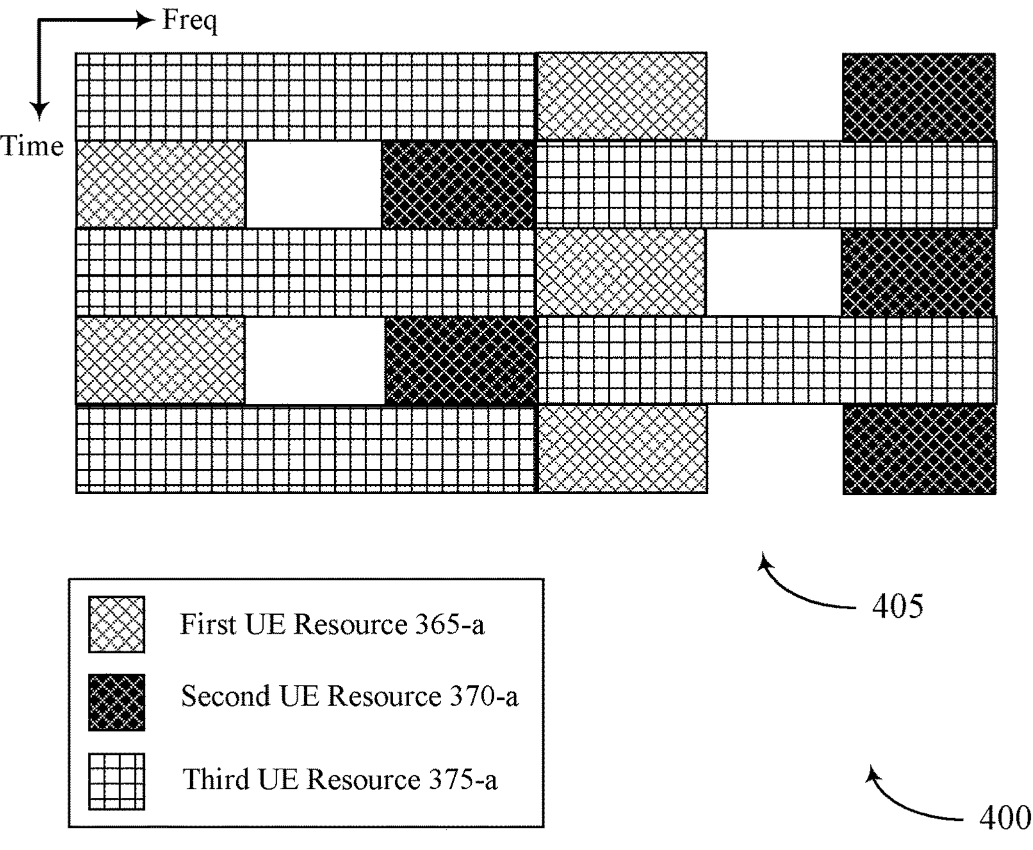

FIG. 4 illustrates an example of a resource mapping 400 that supports reconfigurable surface training for sidelink in accordance with aspects of the present disclosure. In some examples, the resource mapping 400 may be implemented by or may implement aspects of the wireless communications system 100. The resource mapping 400 may include a UE 115-*a*, a UE 115-*b*, and a UE 115-*c* which may be examples of a UE 115 as described herein. The resource mapping 400 may also include a network device 105-*a* which may be an example of the network device 105 as described herein.

To provide for quality sidelink channel estimation, collisions on sidelink RS resources should be avoided. In some examples, the network (e.g., a network device 105-*a*) may control sidelink RS for multiple UEs (e.g., UEs 115-*a*, 115-*b*, and 115-*c*). For example, the network device may allocate resources 365-*a* for the first UE 115-*a*, resources 370-*a* for the second UE 115-*b*, and resources 375-*a* for the third UE 115-*c*.

In some examples, the network device 105-*a* may trigger periodic or aperiodic sidelink RS transmissions for a given UE 115. The transmitting UE 115 may indicate the rate matching information in the SCI. In some examples, a patch of resources 405 may be provided to a primary UE 115-*a*, which may be distributed across other UEs 115-*b* and 115-*c*. For example, the UE 115-*a* may allocate resources 365-*a* for the UE 115-*a*, resources 370-*a* for the second UE 115-*b*, and resources 375-*a* for the third UE 115-*c*. The primary UE 115-*a* may allocate the resources to avoid inter-UE interference. A hopping pattern may be indicated to avoid acquiring "aged" CSI. Resource reuse across far away users or UEs may be possible.

Figure 5:
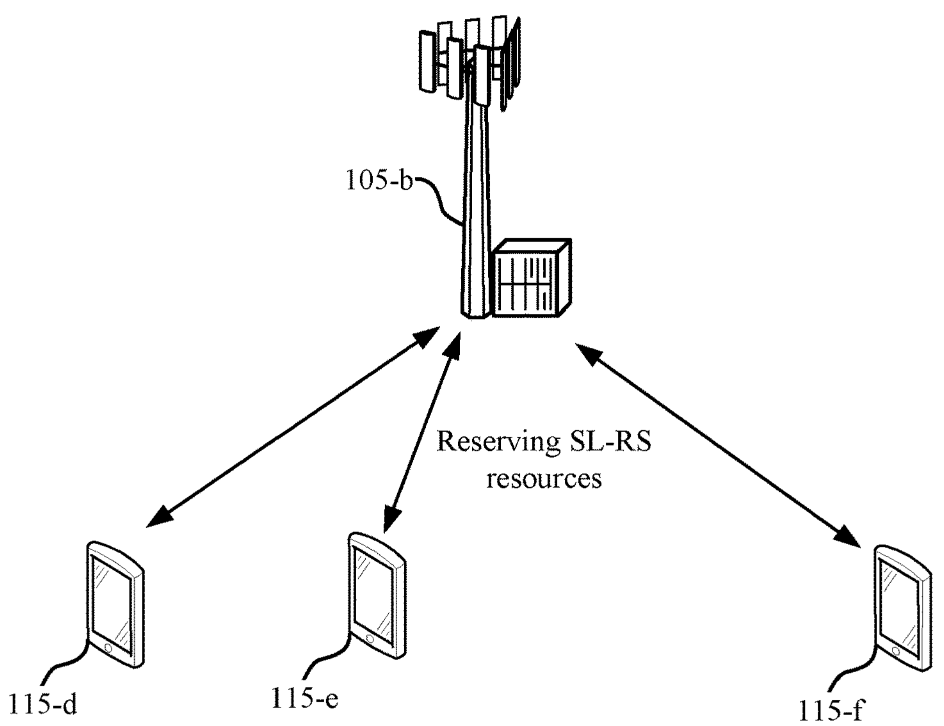
FIG. 5 illustrates an example of a resource mapping that supports reconfigurable surface training for sidelink in accordance with aspects of the present disclosure.
Figure 5:
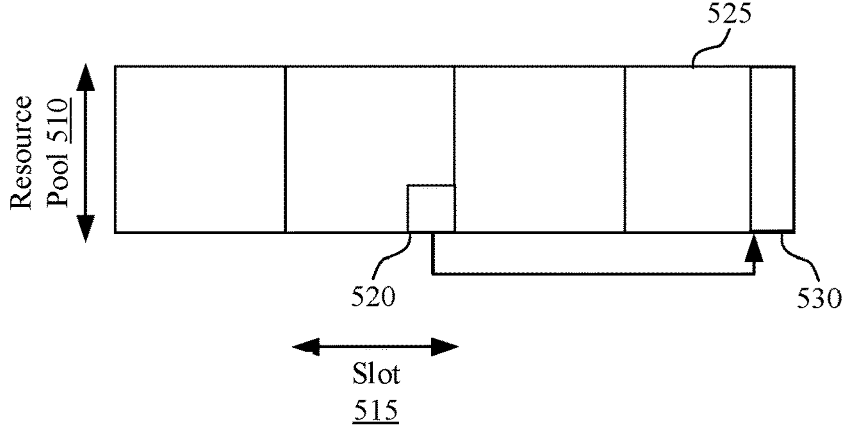

FIG. 5 illustrates an example of a resource mapping 500 that supports reconfigurable surface training for sidelink in accordance with aspects of the present disclosure. In some examples, the resource mapping 500 may be implemented by or may implement aspects of the wireless communications system 100. The resource mapping 500 may include a UE 115-*d*, a UE 115-*e*, and a UE 115-*f* which may be examples of a UE 115 as described herein. The resource mapping 500 may also include a network device 105-*b* which may be an example of the network device 105 as described herein.

In some examples, a UE 115-*d* communicating via sidelink communications may reserve resources either for its own transmission or in favor of the remote UEs 115-*e* or 115-*f*. In some examples, if some resources are reserved, another UE 115 may schedule the remote UEs 115 in the same slot by rate-matching. The reservation of resources may be PSSCH based. When a UE 115-*a* does not have data to transmit, the UE 115-*a* may pad the MAC physical data unit and transmit SCI with a format that indicates the reservation to other UEs 115. In some examples, the UE 115-*a* may reserve resources for sidelink RS with a 1-1 mapping with RS resources for reservation. For example, for a resource pool 510, a UE 115-*a* may transmit a reservation signal 520 in a slot 515, which reserves an RS occasion 530 in a later slot 525 for transmission to one of the UEs 115-*e* or 115-*f*. The resources for the RS occasion 530 may be rate-matched.

Figure 6:
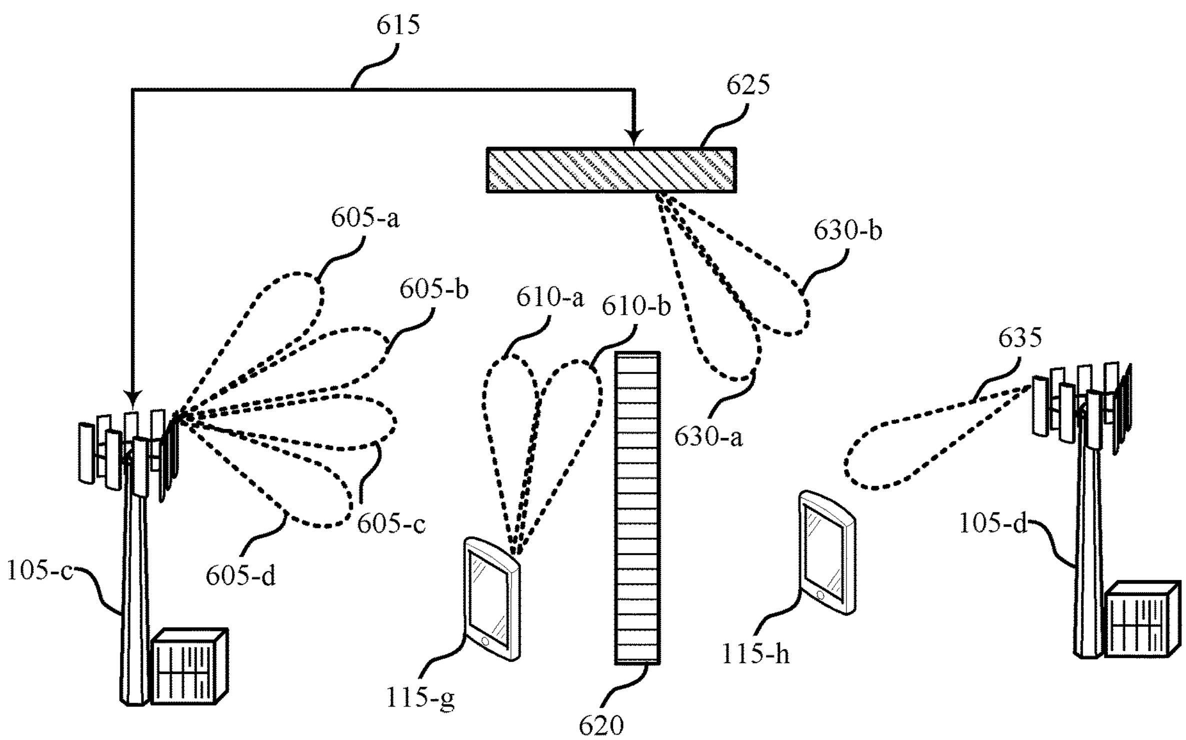
FIG. 6 illustrates an example of a wireless communications system that supports reconfigurable surface training for sidelink in accordance with aspects of the present disclosure.

FIG. 6 illustrates an example of a wireless communications system 600 that supports reconfigurable surface training for sidelink in accordance with aspects of the present disclosure. In some examples, the wireless communications system 600 may implement aspects of wireless communications system 100. The wireless communications system 600 may include UEs 115-*g* and 115-*h*, which may be examples of UEs 115 as described herein. The wireless communications system 600 may include network devices 105-*c* and 105-*d*, which may be examples of network devices 105 as described herein.

In some examples, the network device 105-*c* may communicate with the UE 115-*g* or the UE 115-*h* using directional communications techniques. For example, the network device 105-*c* may communicate with the UE 115-*g* or the UE 115-*g* via one or more beams 605. In some examples, the UE 115-*h* may communicate with the network device 105-*d* using one or more beams 635. The wireless communications system 600 may be an example of a massive MIMO system, which may enable increased throughput. Massive MIMO systems may achieve high beamforming gain by using active antenna units, individual radio frequency chains per antenna port, and may be associated with an increase in power consumption due to the use of active antenna units.

The UEs 115-*g* or UE 115-*h* may perform an initial access procedure to establish a connection with the network device 105-*d*. Some initial access procedures may include the UE 115-*g* or the UE 115-*h* (or both) acquiring synchronization and system information from the network device 105-*c* via one or more synchronization signal blocks (SSBs), for example, sent on a physical broadcast channel (PBCH). For example, the network device 105-*c* may transmit (e.g., broadcast) one or more SSBs associated with the beams 605. In some implementations, the network device 105-*c* may transmit SSBs for each beam 605 using time division multiplexing techniques or using different frequency positions defined by a synchronization raster grid. The UE 115-*g* or the UE 115-*h* (or both) may receive at least one synchronization signal block (SSB) based on which of the beams 605 UE 115-*g* or the UE 115-*h* (or both) monitor. For example, the UE 115-*g* may receive an SSB using the beam 605-*d*, but may not monitor any of the beams 605-*a*, 605-*b*, or 605-*c*.

In some examples, one or more beams 605 may be obstructed by a blockage 620 such that the network device 105-*c* may be unable to establish a connection with the UE 115-*h*. To mitigate the effects of the blockage 620, the wireless communications system 600 may include an RIS 625. The RIS 625 may reflect one or more beams 605 used by the network device 105-*c*. For example, the network device 105-*c* may transmit information using a beam 605-*a*, a beam 605-*b*, a beam 605-*c*, or a beam 605-*d*. In some examples, the beams 605-*c* and 605-*d* may be obstructed by the blockage 620 and so may not be used by the network device 105-*c* to communicate with the UE 115-*h*. The beams 605-*a* and 605-*b*, however, may not be obstructed by the blockage 620, but rather may be reflected by the RIS 625 to create a reflected beam 630-*a* and a reflected beam 630-*b*. The reflected beams 630-*a* and 630-*b* may bypass the blockage 620 and so may be used by the network device 105-*c* to communicate with the UE 115-*h*. In some examples, the network device 105-*c* may communicate with the RIS 625 via a link 615. In some implementations the link 615 may be unidirectional where the network device 105-*c* may communicate with the RIS 625 or the link 615 may be bi-directional where the RIS 625 may also communicate with the network device 105-*c*. Accordingly, the network device 105-*c* may adjust a set of phase weights, position, orientation, other factor, or any combination thereof of the RIS 625 to change a reflection direction of one or more beams 605. In some implementations, the RIS 625 may be an example of a near-passive device that exhibits a relatively low power consumption. A RIS 625 may reflect an impinging wave to a desired direction. The reflection direction may be controlled by the network device 105-*c*.

In such cases where the wireless communications system 600 uses the RIS 625, a path or channel between the network device 105-*c* and the UE 115-*h* may be different from a path or channel between the network device 105-*c* and the UE 115-*g*. For example, a path or channel between the UE 115-*h* and the network device 105-*c* may include the RIS 625 while a path or channel between the UE 115-*g* and the network device 105-*c* may be direct. Due to an existence of different paths or channels, an initial access procedure performed by the network device 105-*c* and the UE 115-*g* may be different from an initial access procedure performed by the network device 105-*c* and the UE 115-*h*. For example, the network device 105-*c* and the UE 115-*g* or the UE 115-*h* may differentiate an SSB received by the UE 115-*g* and an SSB received by the UE 115-*h* as part of one or more initial access procedures.

The UEs 115-*g* and 115-*h* may also communicate over a sidelink channel using directional communications techniques. For example, the UE 115-*g* may communicate with the UE 115-*h* via one or more beams 610. In some examples, the beams 610 may be obstructed by the blockage 620 such that the UE 115-*g* may be unable to establish a connection with the UE 115-*h*. To mitigate the effects of the blockage, the UE 115-*g* may communicate with the UE 115-*h* via the RIS 625, which may reflect the one or more beams 610 used by the UE 115-*g*. For example, the RIS may reflect beams 610-*a* and 610-*b* to create reflected beams 630-*a* and 630-*b*. The reflected beams 630-*a* and 630-*b* may bypass the blockage 620 and so may be used by the UE 115-*g* to communicate with the UE 115-*h*. The UEs 115-*g* and 115-*h* may determine whether to use the RIS 625 using SSB detection. For example, the UEs 115-*g* and 115-*h* may determine whether communications between the UEs 115-*g* and 115-*h* are better using the RIS 625 or without the RIS 625.

If the UEs 115-*g* and 115-*h* determine that the UEs 115-*g* and 115-*h* communicate better with the RIS 625, the UEs 115-*g* and 115-*h* may indicate to the network device 105-*c* that the UEs 115-*g* and 115-*h* should train the RIS 625 for communication between the UEs 115-*g* and 115-*h*. The RIS 625 may be trained by using a sequence of training reference sequences or reference signals over several beams. For example, a UE 115-*g* may transmit a beam 610-*a* or multiple beams 610-*a* and 610-*b* which may be reflected over several beams 630-*a* and 630-*b* at the RIS 625. The RIS 625 may use a different codebook or non-codebook precoder for each RS occasion or transmission. The UE 115-*h* may determine the best beam (e.g., of 630-*a* or 630-*b*) based on a receiving metric such as RSRP, RSRQ, or SINR, and report the index associated with the best beam.

In some examples, the UE 115-*g* may indicate to the network device 105-*c* that the UE 115-*g* should communicate with the UE 115-*h* via the RIS 625. The network device 105-*c* may transmit an indication of a resource pool(s) to the receiving UE 115-*h* and the transmitting UE 115-*g* for beam training the RIS 625 for sidelink communications between the receiving UE 115-*h* and the transmitting UE 115-*g*. In some resource pools, there may be no RIS training. The transmitting UE 115-*g* may identify a resource pattern for training the RIS 625 using the indicated resource pool where the resource pattern is associated with a pattern of beams at the RIS 625. In some examples, the network device 105-*c* may indicate the resource pattern (e.g., assign resources for the training). In some examples, the transmitting UE 115-*g* may identify resources to train the RIS 625. The transmitting UE 115-*g* may transmit a sidelink reference signal using the identified resource.

In some examples, some resource pools may contain periodic full slots for training the RIS 625 and transmitting UE 115-*g* may reserve the periodic full slots. The full slots for training the RIS 625 may include training symbols with time gaps (e.g., one or more symbols) between beam switching times to allow for switching of beams at the RIS 625. The gap may be a function of RIS's capability to switch between two beams or configurations. The subcarrier spacing of these slots may be a high value to allow for a longer time per symbol and to allow for easier switching at the surface of the RIS 625.

In some examples, per resource pool, there may be multiple patterns for sidelink RS allocations for the purpose of RIS 625 training with patterns for training based on, for example targets of resolution and priority of transmissions. In some examples, the UE 115-*g* or the UE 115-*h* may select a dense pattern for better training. In Mode 1, the network device 105-*c* may select one of those patterns in downlink control information (DCI) transmitted to the UE 115-*g*. The UE 115-*g* may deliver this info to the receiving UE 115-*h* if the receiving UE 115-*h* is out-of-coverage (e.g., via PC5-RRC, MAC-CE, SCI-2 or a PSSCH).

In some examples, the network device 105-*c* may configure the resource pool with a number of training beams that should be used per slot or sidelink RS reservation. The beams may be configured by the network device 105-*c* or may be transparent to the network device 105-*c* (e.g., a controller of the RIS 625 may select the beams (e.g., beams 630-*a* and 630-*b*)).

The receiving UE 115-*h* may receive the reference signal via the RIS 625 according the pattern of beams and transmit a beam report to the transmitting UE 115-*g* based on the received reference signal. In some examples, the receiving UE 115-*h* may report the best or strongest beams. In some examples, the receiving UE 115-*h* may report the best or strongest beams and the worst or weakest beams (which may be helpful in groupcast cases or when the transmitting UE 115-*g* serves multiple receiving UE 115-*hs* in a unicast manner in order to reduce interference.

The receiving UE 115-*h* may compare the received beams based on a metric such as RSRP, RSRQ, or SINR. In some examples, the network device 105-*c* may configure and indicate the nature of the report to the receiving UE 115-*h*, the transmitting UE 115-*g*, and the RIS 625. For example, the number of beam indices that the receiving UE 115-*h* will send (report) and the nature of report may be configured by RRC or MAC-CE by the network device 105-*c* or per resource pool config by the network device 105-*c*. The transmitting UE 115-*g*, the receiving UE 115-*h*, and the RIS 625 controller may all to agree on the number of beam indices that the receiving UE 115-*h* will send (report) and the nature of report. For example, the report of the L best beams and the K worst beams may be a mode that is configured per resource. In some examples, there may be 2 modes: 1) best L1 beams only: or 2) best L2 beams and worst K beams, where L1 and L2 may be different since when K is not sent, the transmitting UE 115-*g* may send more of the best beams (where L1 is greater than L2). It may be useful to know the worst K beams in the case of groupcast or when the transmitting UE 115-*g* will serve multiple UEs 115 in unicast manner where the transmitting UE 115-*g* could use this worst beam information to reduce interference. The mode can be configured per resource pool (or both modes could be allowed at some resource pools and a switch of modes by DCI or SCI can be configured). In some examples, parameters K and L or potential values of parameters K and L may be configured by the network device 105-*c* per resource pool.

In some examples, the potential values (set of values) of K and L may be defined per priority or per Quality of Service target, and the transmitting UE 115-*g* may select the values of K and L and indicate the selected values to the receiving UE 115-*h* using SCI-2, RRC, or MAC-CE. If a single value of K and L is defined per priority, then the transmitting UE 115-*g* may not indicate the selected values of K and L to the receiving UE 115-*h*, and by determining the priority field in SCI-1, each the transmitting UE 115-*g*, the receiving UE 115-*h*, and the RIS 625 will be comprised of the values of K and L.

In some examples, the receiving UE 115-*h* may report the metrics of the received beams (e.g., RSRP, RSRQ, SINR, or energy) in addition to the indices of the best beams. The metrics may be reported based on the configuration per resource pool or based on a separate RRC or MAC-CE configuration. In some examples, reporting of the metrics of the received beams bay be added, enabled, or disabled through SCI (e.g., through SCI-2. For example, a flag to enable reporting the metrics of the received beams may be added to SCI. Reporting of the metrics of the received beams may be decided per resource pool (e.g., by the network device 105-*c*) and may be based on priorities or Quality of Service targets and the capabilities of the UE 115-*h* to perform measurements associated with the metrics.

In some examples, the network device 105-*c* may configure the RIS 625 with frequency watermarks, as explained in more detail with reference to FIG. 7, and the transmitting UE 115-*g* or the receiving UE 115-*h* may select a watermark on a per resource pool basis.

The transmitting UE 115-*g* and the receiving UE 115-*h* may transmit and receive sidelink communications using the RIS 625 based on the beam report.

Additionally, or alternatively, the RIS 625 may have a capability to use either a different beamformer or a different RIS 625 configuration on different subchannels of the same resource pool. In some examples, the RIS 625 may indicate the capability to the network device 105-*c* and transmitting UE 115-*g*, and the network device 105-*c* may divide and define the resource pool into sub-resource pools with a resource gap between the sub-resource pools. The transmitting UE 115-*g* may change beams across the sub-resource pools when training the RIS 625, or the transmitting UE 115-*g* may use the same beam and the RIS 625 may use a different RIS configuration across the different sub-resource pools to receive the beam. The receiving UE 115-*h* may apply the resource gap and receive the reference signals using the sub-resource pools.

Figure 7:
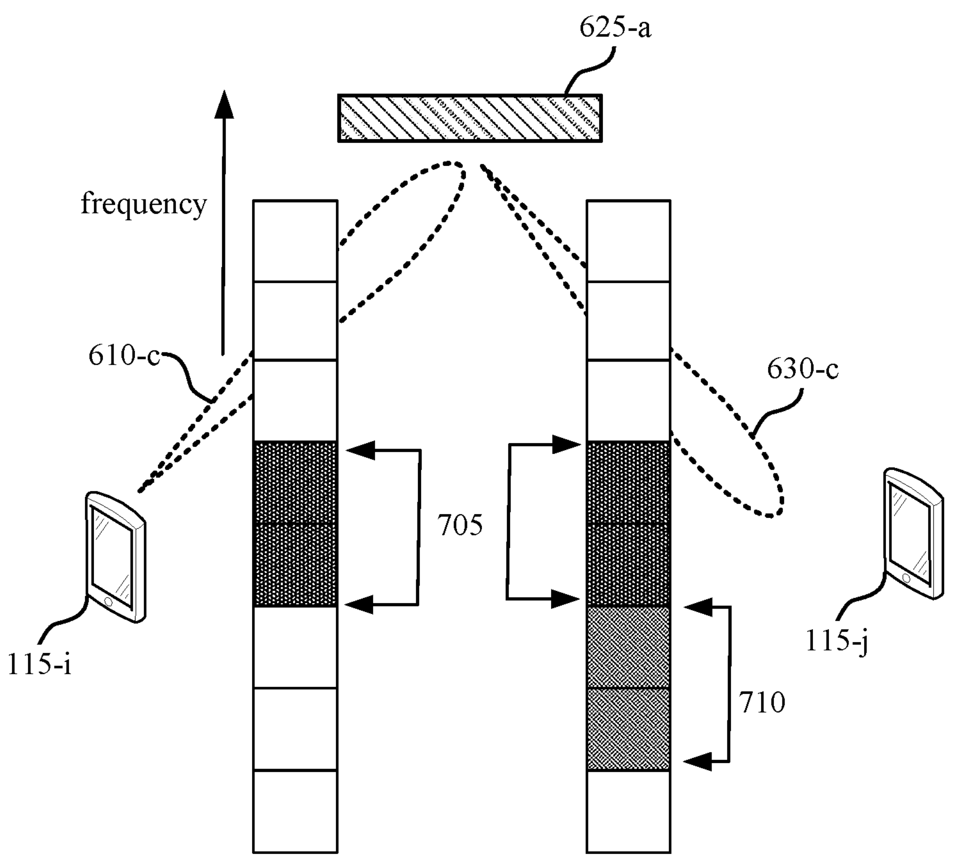
FIG. 7 illustrates an example of a resource mapping that supports reconfigurable surface training for sidelink in accordance with aspects of the present disclosure.

FIG. 7 illustrates an example of a resource mapping 700 that supports reconfigurable surface training for sidelink in accordance with aspects of the present disclosure. In some examples, the resource mapping 700 may implement aspects of wireless communications system 100 or the wireless communications system 600. The resource mapping 700 may include UEs 115-*i* and 115-*j*, which may be examples of UEs 115 as described herein. The wireless communications system 600 may include a RIS 625-*a*, which may be an example of a RIS 625 as described herein.

In some examples, resource pools may be configured with water marking parameters (such as the frequency offset used by the RIS 625-*a* controller on the RIS 625-*a* surface) for a RIS. The UEs 115-*i* and 115-*j* may indicate to each other the frequency water mark parameters that are used. By slowly changing the configuration of a RIS 625-*a* over time, the reflected signal 630-*c* of a signal 610-*c* may be shifted in the frequency domain. For example, without watermarking, if the RIS 625-*a* configuration is fixed over time, then the frequency 705 of the signal 610-*c* is the same as the frequency 705 of the signal 630-*c*. In other words, $\Phi(t)=\Phi_0$. However, with watermarking, the RIS 625-*a* configuration may change according to a sinusoid function, and the frequency 710 of the signal 630-*c* is shifted by a scalar function in comparison to the signal 610-*c*. In other words, $\Phi(t)=\Phi_0\times e^{j2\pi f_0 t}$, where $\Phi(t)$ represents the signal 610-*c* and $\Phi_0\times e^{j2\pi f_0 t}$ represents the signal 630-*c*, and $e^{j2\pi f_0 t}$ a scalar that is the same for all RIS elements.

If a RIS 625-*a* is to add a frequency watermark, the network device 105 may configure resource pools to associate each available RIS 625 with one or more frequency watermarks to be used. In an RRC or MAC-CE, the frequency watermarks per RIS 625 may be updated by the network device 105. The controller of the RIS 625-*a* should be notified of the resource pool configuration. In some examples, a separate signaling indicating the frequency watermark may be communicated to the RIS 625-*a*.

In some examples, per RIS 625, there may be multiple configured frequency watermarks per resource pool. The transmitting UE 115-*i* or the receiving UE 115-*j* may select one of the frequency watermarks associated with the resource pool that will serve the transmitting UE 115-*i* and the receiving UE 115-*j* and indicate the selection using PC5-RRC, MAC-CE, SCI-2, or a PSSCH dedicated for signaling or updating the RIS 625 frequency watermark.

Figure 8:
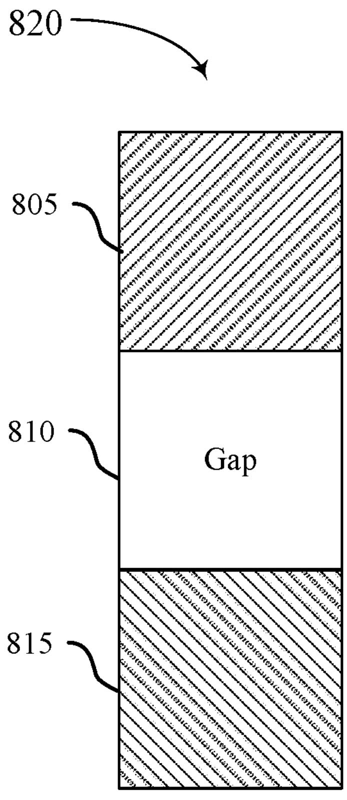
FIG. 8 illustrates an example of a resource diagram that supports reconfigurable surface training for sidelink in accordance with aspects of the present disclosure.

FIG. 8 illustrates an example of a resource diagram 800 that supports reconfigurable surface training for sidelink in accordance with aspects of the present disclosure.

In some examples, a RIS 625 may have a capability to split the frequency domain and use a gap and use different beams in the frequency domain. In some examples, a RIS 625 may adjust weights per set or bundle or resource blocks or resources such that the RIS may use a first configuration for a first resource set 805 and the RIS may use a second configuration for a second resource set 815, where there is a gap 810 of resource blocks, sub-channels, or resources between the first resource set and the second resource set.

In some examples, if two signals associated with the first resource set 805 and the second resource set 815 are frequency domain multiplexed with a gap 810 in resources, based on the capability of the RIS 625 to adjust the element weights of the RIS 625 based on a frequency range (or allocation), the transmitting UE 115 may train the RIS 625 with the same beamformer across the two sets of resources 805 and 815. In some examples, the UE 115 may train the RIS 625 with the different beamformers across the two sets of resources 805 and 815. Accordingly, the same RIS configuration may be trained with two different PMIs or beams used by the transmitting UE 115.

In some examples, per resource pool 820, based on the capability of the RIS 625, the network device may divide the resource pool 820 into sub-resource pools 805 and 815 where there is a gap 810 between the sub-resource pools 805 and 815. In some examples, the transmitting UE 115 may use the same beam across the sub resource pools 805 and 815 and the RIS may change configurations of the RIS across the two sub-resource pools 805 and 815. In some examples, the RIS may use the same RIS configuration across the two sub-resource pools 805 and 815 and the transmitting UE 115 may change beams (e.g., change beamformers) across the sub-resource pools 805 and 815.

Figure 9:
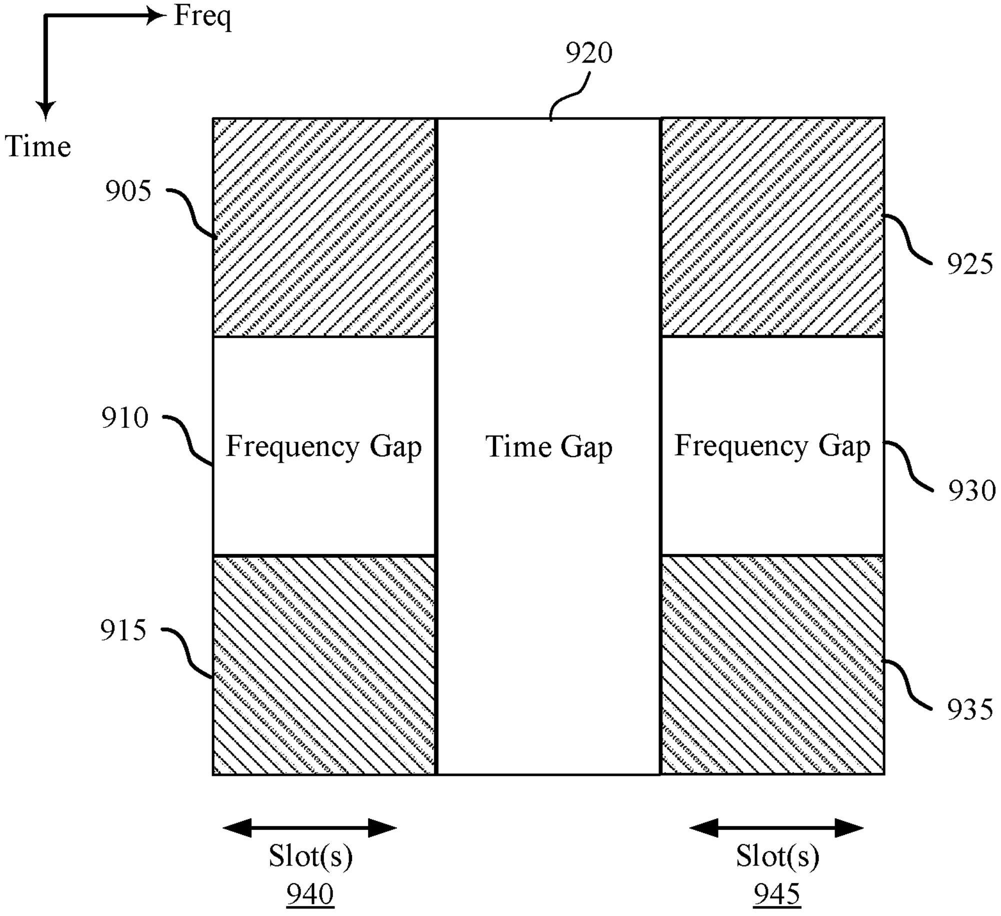
FIG. 9 illustrates an example of a resource diagram that supports reconfigurable surface training for sidelink in accordance with aspects of the present disclosure.

FIG. 9 illustrates an example of a resource diagram 900 that supports reconfigurable surface training for sidelink in accordance with aspects of the present disclosure. In some examples, there may be time-frequency patterns for RIS 625 training where the behavior of the RIS 625 and the transmitting UE may change across the time-frequency patterns, where behavior corresponds to the use of different beamformers and configurations of the RIS 625. Time-frequency patterns may be constrained by a time gap 920 between behaviors and frequency gaps 910 and 930 between sub-resource pools (905, 915, 925, and 935) associated with different beams or RIS configurations.

For example, for during slots 940, a resource pool may be split into sub-resource pools 905 and 915 with a resource gap 910 separating sub-resource pools 905 and 915. The transmitting UE 115 may use the same beam across the sub-resource pools 905 and 915 and the RIS may change configurations of the RIS across the two sub-resource pools 905 and 915. After a time gap 920, at a second set of slots 945, the resource pool may be split into sub-resource pools 925 and 935 with a resource gap 930 separating sub-resource pools 925 and 935. The RIS may use the same RIS configuration across the two sub-resource pools 925 and 935 and the transmitting UE 115 may change beams (e.g., change beamformers) across the sub-resource pools 925 and 935.

Figure 10:
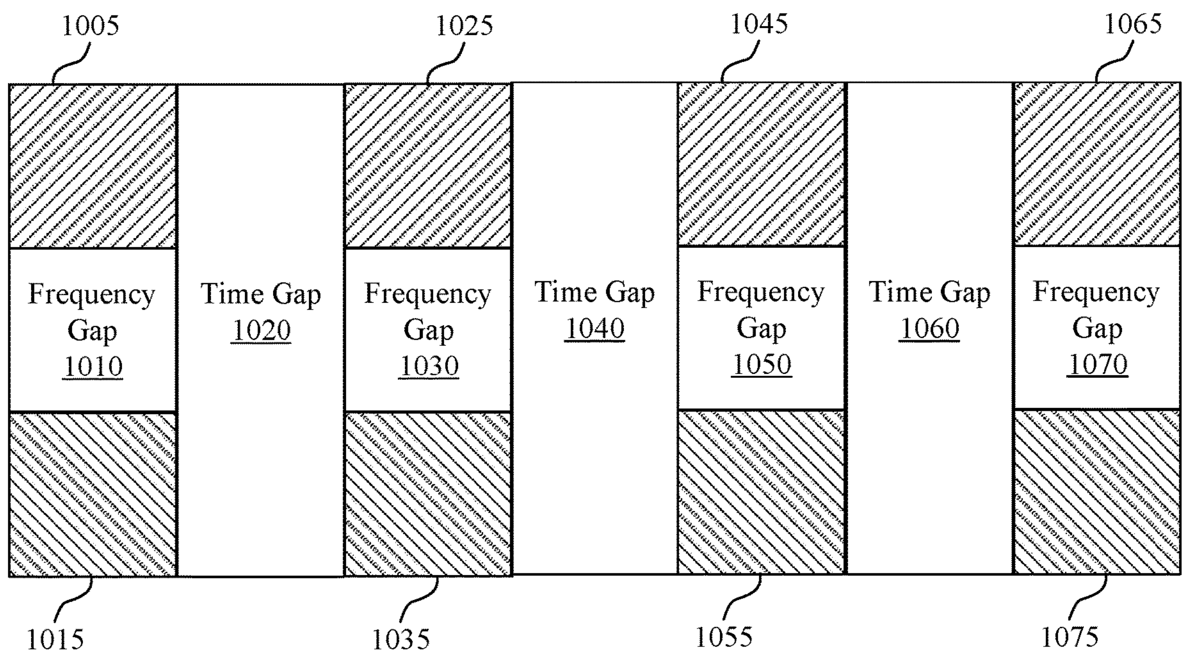
FIG. 10 illustrates an example of a resource diagram that supports reconfigurable surface training for sidelink in accordance with aspects of the present disclosure.

FIG. 10 illustrates an example of a resource diagram 1000 that supports reconfigurable surface training for sidelink in accordance with aspects of the present disclosure.

In some examples, the transmitting UE 115 and the receiving UE 115 ma agree on how to report the best beam(s). In some examples, a time-frequency index may represent a pair of beams at the transmitting UE 115 and the RIS 625 surface. In the resource diagram 1000, each sub-resource pool 1005, 1015, 1025, 1035, 1045, 1055, 1065, and 1075 may be associated with two beam indices (e.g., a beam transmitted by the transmitting UE 115 and a beam reflected by the RIS 625). The sub-resource pools 1005, 1015, 1025, 1035, 1045, 1055, 1065, and 1075 may be separated by respective frequency gaps (1010, 1030, 1050, and 1070) and time gaps (1020, 1040, 1060). The receiving UE 115 may report the sub-resource pool 1005, 1015, 1025, 1035, 1045, 1055, 1065, or 1075 associated with the best performance, and the transmitting UE 115 and the RIS may accordingly know the best beams.

In some examples, the transmitting UE 115 and the RIS 625 may agree with the receiving UE to transmit the best L (where L may be as small as 1) of the indices with a certain order of signaling (e.g., report preparation) and the worst K beam pair. In some examples. metrics such as RSRP, RSRQ, or SINR may also be reported. The value of L may be signaled or configured per resource pool or using PC5-RRC, MAC-CE, SCI-2 or PSSCH to configure both the receiving UE 115 and the RIS 625 if the transmitting UE 115 may communicate with the RIS 625 (otherwise the network device 105 or another device may communicate the value of L to the RIS 625).

In mode 1, the network device may assign resources for training the RIS 625. Both the transmitting UE 115 and the receiving UE 115 should know the training and the purpose of the transmissions as the receiving UE will compute metrics such as RSRP, RSRQ, or SINR on certain resources (e.g., certain symbols and frequencies). In mode 2, the transmitting UE 115, the receiving UE 115, or both may find resources to train a RIS 625, which may contain a narrow band sidelink RS (e.g., the same band as the PSSCH) as well as the demodulation reference signal (DMRS) which may be used to train the RIS. In some examples, over each DMRS symbol, the controller of the RIS 625 may change the surface beam of the RIS across the DMRS symbols. In some examples, the controller of the RIS 625 may change the surface beam of the RIS across some resource blocks based on the agreement between the RIS 625, the transmitting UE 115, and the receiving UE 115. In some examples, the RIS 625 may contribute in determining resources to train the RIS 625 if the RIS 625 has a PC5 interface and the controller of the RIS 625 is capable of engaging in communication with the UEs 115.

In some examples, even if there is no actual frequency gap (e.g., 1010, 1030, 1050, 1070), in the case of using DMRS to train the RIS 625, all tones may include DMRS including the frequency gaps 1010, 1030, 1050, and 1070. The gap definition may be known at the transmitting UE 115 and the controller of the RIS 625. The RIS 625 may change the beam across the frequencies corresponding to sub-resource pools 1005, 1015, 1025, 1035, 1045, 1055, 1065, and 1075 or the UE may change the beamformer across the frequencies corresponding to sub-resource pools 1005, 1015, 1025, 1035, 1045, 1055, 1065, and 1075. The DMRSs received across the frequency gaps 1010, 1030, 1050, and 1070 may be discarded from the decision of which beams are the best to be used to serve the receiving UE 115.

Figure 11:
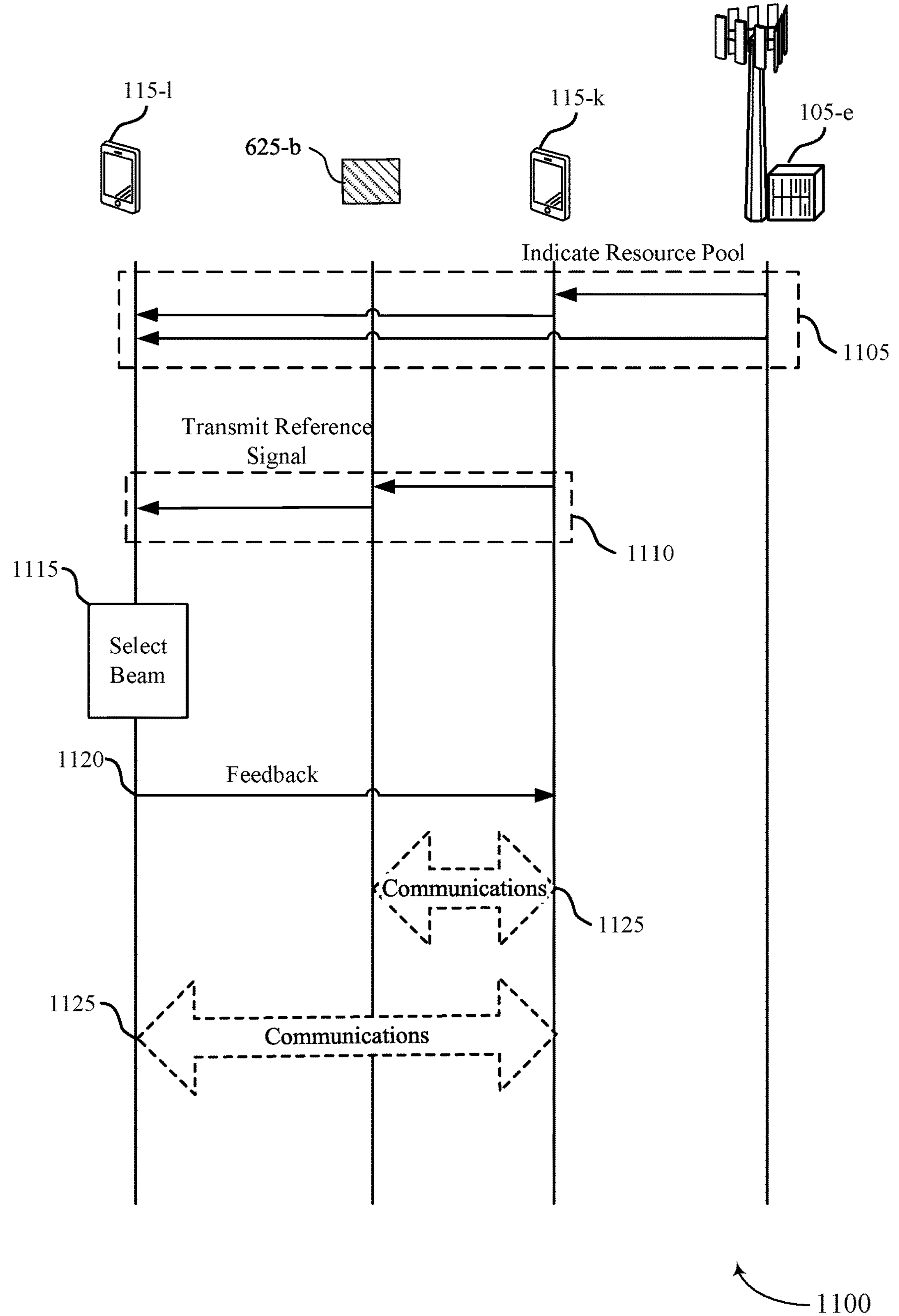
FIG. 11 illustrates an example of a process flow that supports reconfigurable surface training for sidelink in accordance with aspects of the present disclosure.

FIG. 11 illustrates an example of a process flow 1100 that supports reconfigurable surface training for sidelink in accordance with aspects of the present disclosure. In some examples, the process flow: 1100 may be implemented by or may implement aspects of the wireless communications system 100 or 600 or the resource mapping 700 or the resource diagrams 800, 900, or 1000. The process flow 1100 may include a UE 115-*k* and a UE 115-*l* which may be examples of a UE 115 as described herein. The process flow 1100 may also include a network device 105-*e* which may be an example of the network device 105 as described herein. The process flow 1100 may also include a RIS 625-*b* which may be an example of a RIS 625 as described herein. In the following description of the process flow 1100, the operations between the network device 105-*e*, the UE 115-*k*, the UE 115-*l*, and the RIS 625-*b* may be transmitted in a different order than the example order shown, or the operations performed by the network device 105-*e*, the UE 115-*k*, the UE 115-*l*, and the RIS 625-*b* may be performed in different orders or at different times. Some operations may also be omitted from the process flow 1100, and other operations may be added to the process flow 1100.

At 1105, the transmitting UE 115-*k* and the receiving UE 115-*l* may receive an indication of a resource pool for training a RIS 625-*b* for sidelink communications between the UE 115-*k* and the UE 115-*l*. In some examples, the network device 105-*e* may transmit the indication of the resource pool. In some examples, the transmitting UE 115-*k* may receive the indication of the resource pool from the network device 105-*e* (e.g., via an RRC or MAC-CE message) and may forward the indication of the resource pool to the receiving UE 115-*l* (e.g., via an SCI, PSSCH, a MAC-CE, or PC5-RRC message).

At 1110, the transmitting UE 115-*k* may transmit a reference signal over a subset of resources of the resource pool according to a resource pattern, wherein the resource pattern is identified based at least in part on the resource pool and is associated with a pattern of beams for the RIS 625-*b*. For example, the transmitting UE 115-*k* may transmit a reference signal using beamforming techniques according to the resource pattern. The receiving UE 115-*l* may receive the reference signal by determining a set of symbols and frequencies to monitor based on the resource pattern, and demodulating reference signals received during the identified symbols and frequencies. In some examples, the transmitting UE 115-*k* and the receiving UE 115-*l* may receive an indication of the resource pattern from the network device 105-*e*, where the resource pattern includes a set of symbols across one or more slots of the resource pool and resource gaps between one or more symbols of the set of symbols. In some examples, the resource pattern is based on an indicated capability of the RIS 625-*b* to switch between different beams or different configurations for the reconfigurable surface. For example, the RIS 625-*b* may indicate, to the network device, the capability of the RIS 625-*b* to switch between different beams or different configurations for the RIS 625-*b* across sub-resource pools. In some examples, the transmitting UE 115-*k* may receive, from the network device 105-*e*, an indication of a set of resource patterns associated with the resource pool, and the transmitting UE 115-*k* may select the resource pattern from the set of resource patterns based on one or more attributes of the sidelink communications (e.g., a priority or quality of service target).

In some examples, the transmitting UE 115-*k* may transmit an indication of the resource pattern to the receiving UE 115-*l*, for example via an RRC, MAC-CE, SCI, or PSSCH message. In some examples, the receiving UE 115-*l* may monitor for the reference signal during the set of symbols associated with the resource pattern.

In some examples, the transmitting UE 115-*k* and the RIS 625-*b* may receive, from the network device 105-*e*, an indication of a set of frequency watermarks associated with the resource pool for the reconfigurable surface. The transmitting UE 115-*k* may transmit the reference signal over the subset of resources of the resource pool based on a selected frequency watermark associated with the resource pool of the set of frequency watermarks.

In some examples, the transmitting UE may transmit the reference signal over a set of transmit beams associated with the subset of resources.

At 1115, the receiving UE 115-*l* may select at least one beam of the pattern of beams. In some examples, the receiving UE 115-*l* may also select a transmit beam of the set of transmit beams.

At 1120, the receiving UE 115-*l* may transmit, to the transmitting UE 115-*k*, a feedback report indicating the selected beam of the pattern of beams. For example, the receiving UE 115-*l* may transmit the report via a SCI, PSSCH, a MAC-CE, or PC5-RRC message. In some examples, the transmitting UE 115-*k* and the receiving UE 115-*l* may receive an indication of a report format from the network device 105-*e*, and the feedback report is based on the report format. In some examples, the network device transmits the indication of the report format via an RRC or MAC-CE message. In some examples, the report format includes a first set of best beams, a second set of worst beams, one or more metrics associated with beams of the pattern of beams, or a combination thereof. In some examples, the metrics may include an RSRP, an RSRQ, or an SINR associated with the beams. In some examples, the report may indicate at least one selected transmit beam of the set of transmit beams.

In some examples, the transmitting UE 115-*k* may receive from the network device 105-*e* an indication of a set of report formats associated with a set of priorities and quality of service targets, and the transmitting UE 115-*k* may transmit, to the receiving UE 115-*l*, an indication of a selected report format of the set of report formats associated with the set of priorities and quality of service targets, and receiving the feedback report is based on the indicated report format. In some examples, the transmitting UE 115-*k* may receive from the network device 105-*e* an indication of a set of report formats associated with a set of priorities, and the transmitting UE 115-*k* may transmit, to the receiving UE 115-*l*, an indication of a priority of the set of priorities for the reference signal, and receiving the feedback report is based on the indicated report format.

At 1125, the transmitting UE 115-*k* may communicate with the receiving UE 115-*l* via the RIS 625-*b* based on the feedback report. For example, the transmitting UE 115-*k* and/or the RIS 625-*b* may communicate with the receiving UE 115-*l* based on the beam(s) reported by the receiving UE 115-*l*.

Figure 12:
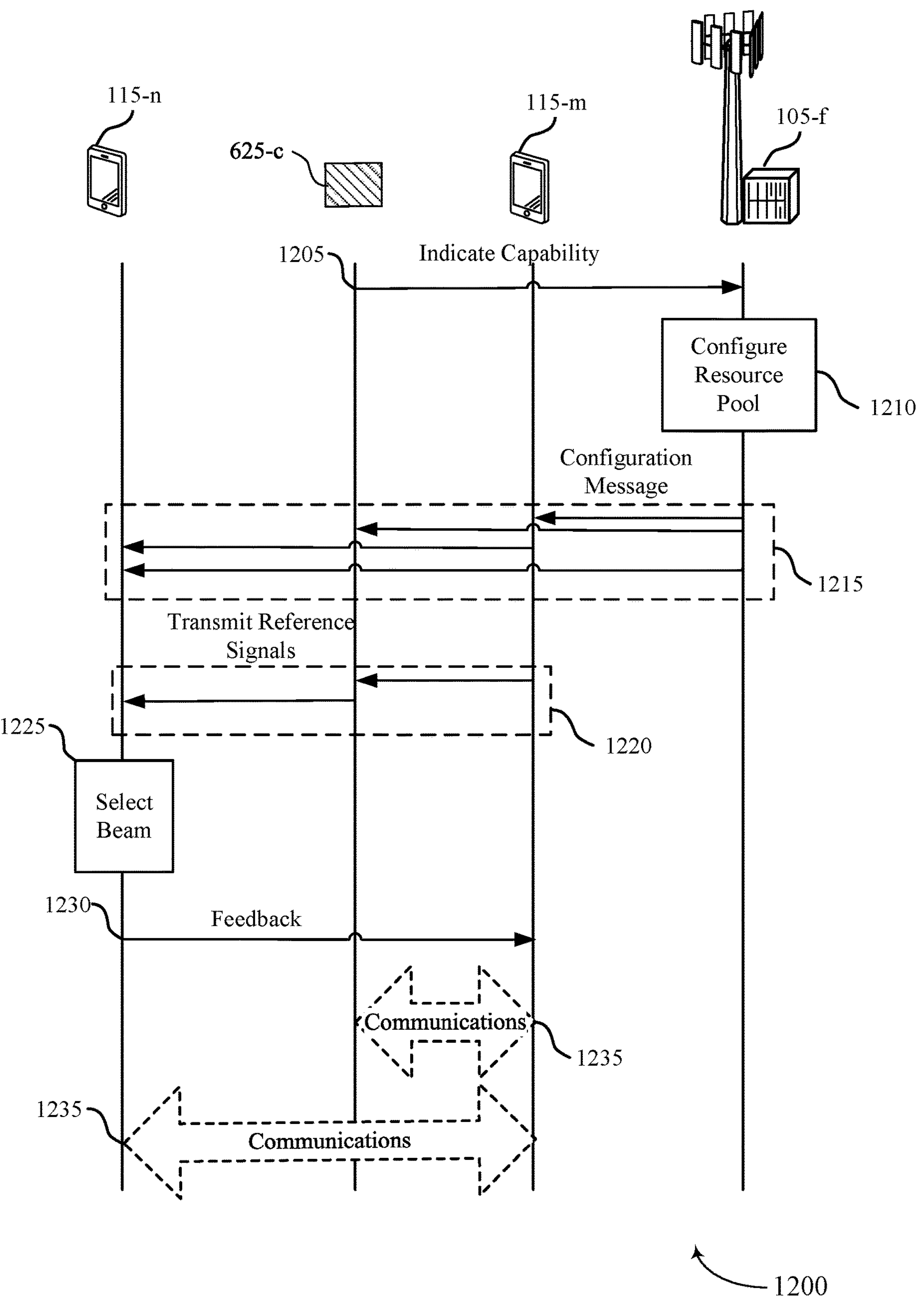
FIG. 12 illustrates an example of a process flow that supports reconfigurable surface training for sidelink in accordance with aspects of the present disclosure.

FIG. 12 illustrates an example of a process flow 1200 that supports reconfigurable surface training for sidelink in accordance with aspects of the present disclosure. In some examples, the process flow 1200 may be implemented by or may implement aspects of the wireless communications system 100 or 600 or the resource mapping 700 or the resource diagrams 800, 900, or 1000. The process flow 1200 may include a UE 115-*m* and a UE 115-*n* which may be examples of a UE 115 as described herein. The process flow 1200 may also include a network device 105-*f* which may be an example of the network device 105 as described herein. The process flow 1100 may also include a RIS 625-*c* which may be an example of a RIS 625 as described herein. In the following description of the process flow 1200, the operations between the network device 105-*f*, the UE 115-*m*, the UE 115-*n*, and the RIS 625-*c* may be transmitted in a different order than the example order shown, or the operations performed by the network device 105-*f*, the UE 115-*m*, the UE 115-*n*, and the RIS 625-*c* may be performed in different orders or at different times. Some operations may also be omitted from the process flow 1200, and other operations may be added to the process flow 1200.

At 1205, the network device 105-*f* may receive, from the RIS 625-*c*, an indication of a capability of the RIS 625-*c* to support different beams or different configurations for the RIS 625-*c* between sub-resource pools. For example, the network device 105-*f* may receive the indication via a communication link between the network device 105-*f* and the RIS 625-*c* (e.g., a backhaul link). In some examples, the capability is based on an ability of the RIS 625-*c* to adjust surface elements of the RIS 625-*c* over a frequency range.

At 1210, the network device 105-*f* may configure a resource pool for beam training the RIS for communications between the transmitting UE 115-*m* and the receiving UE 115-*n* based on the indicated capability of the RIS 625-*c*. The resource pool may include a first sub-resource pool, a second sub-resource pool, and a resource gap, and where the resource gap is based at least in part on the indicated capability of the RIS 625-*c*. In some examples, the first sub-resource pool includes a first set of symbols within a first frequency range and the second sub-resource pool includes a second set of symbols within a second frequency range, and the resource gap includes a duration of time between the first set of symbols and the second set of symbols or a third frequency range between the first frequency range and the second frequency range. In some examples, the resource pool includes a third sub-resource pool and a second resource gap.

At 1215, the network device 105-*f* may transmit, to the RIS 625-*c*, the transmitting UE 115-*m*, and the receiving UE 115-*n*, a configuration message indicating the configured resource pool for beam training the RIS for communications between the transmitting UE 115-*m* and the receiving UE 115-*n*. The network device 105-*f* may transmit the indication via a MAC-CE or an RRC message or via a communication link between the network device 105-*f* and the RIS 625-*c* (e.g., a backhaul link). In some examples, if the receiving UE 115-*n* is out of range of the network device 105-*f*, the transmitting UE 115-*m* may transmit an indication of the configuration of the resource pool to the receiving UE 115-*n*.

In some examples, the network device 105-*f* may transmit, to the receiving UE 115-*n* and the RIS 625-*c*, an indication of a first beam of the RIS 625-*c* associated with the first sub-resource pool and a second beam of the RIS 625-*c* associated with the second sub-resource pool. The network device 105-*f* may transmit the indication via a MAC-CE or an RRC message. In some examples, the network device 105-*f* may transmit, to the transmitting UE 115-*m*, an indication of a first transmit beam for the first sub-resource pool and of a second transmit beam for the second sub-resource pool.

At 1220, the receiving UE 115-*n* receives, from the transmitting UE 115-*m* via the RIS 625-*c*, a first reference signal over the first sub-resource pool in a first beam and a second reference signal over the second sub-resource pool in a second beam. In some examples, receiving the first reference signal includes receiving the first reference signal based on a first configuration of the RIS 625-*c* for the first sub-resource pool and receiving the second reference signal includes receiving the second reference signal based on a second configuration of the RIS 625-*c* for the second sub-resource pool. The transmitting UE 115-*m* may transmit the reference signals using beamforming techniques according to the first and second sub-resource pools. Receiving the first and second reference signals may include determining, at the receiving UE 115-*n*, a set of symbols and frequencies of the first sub-resource pool to monitor and a set of symbols and frequencies of the second sub-resource pool to monitor, and demodulating reference signals received during the identified symbols and frequencies. In some examples, the first beam is associated with a first transmit beam transmitted by the transmitting UE 115-*m* and a first configuration of the RIS 625-*c* and the second beam is associated with a second transmit beam transmitted by the transmitting UE 115-*m* and the same configuration of the RIS 625-*c*.

In some examples, where the resource pool includes a third sub-resource pool, the receiving UE 115-*n* may receive, from the transmitting UE 115-*m* via the RIS 625-*c*, a third reference signal over the third sub-resource pool in a third beam.

At 1225, the receiving UE 115-*n* selects at least one of the first beam or the second beam. In some examples, the receiving UE 115-*n* may also select a transmit beam of the transmit beams transmitted by the transmitting UE 115-*m*.

At 1230, the receiving UE 115-*n* transmits a feedback report indicating the selection of the at least one of the first beam or the second beam. For example, the receiving UE 115-*n* may transmit the report via a SCI, PSSCH, a MAC-CE, or PC5-RRC message. In some examples, the feedback report may indicate the selected transmit beam of the transmit beams transmitted by the transmitting UE 115-*m*.

At 1235, the transmitting UE 115-*m* may communicate with the receiving UE 115-*n* via the RIS 625-*c* based on the feedback report. For example, the transmitting UE 115-*m* and/or the RIS 625-*c* may communicate with the receiving UE 115-*n* based on the beam(s) reported by the receiving UE 115-*n*.

Figure 13:
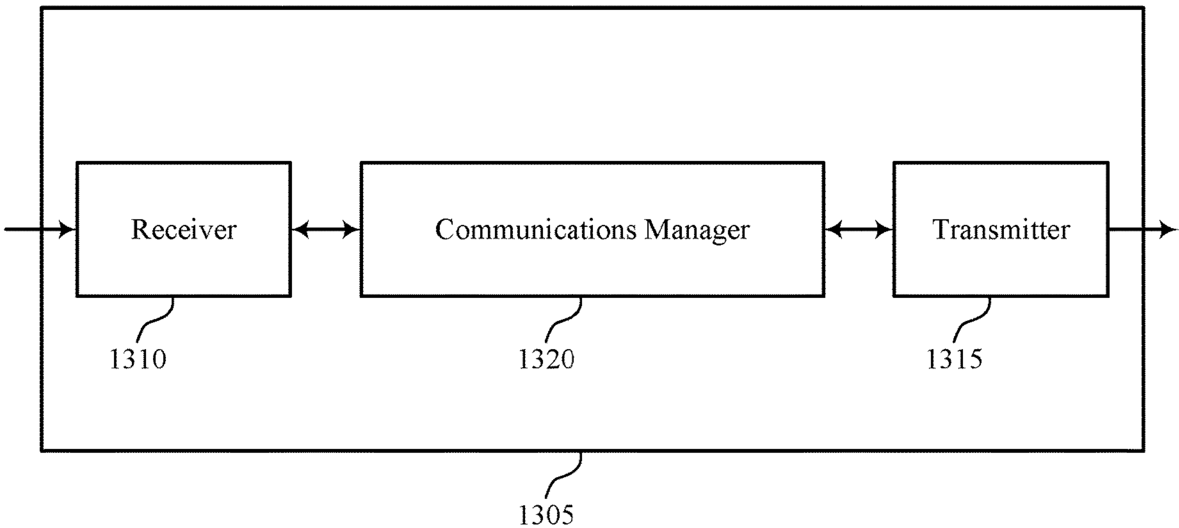
FIGS. 13 and 14 show block diagrams of devices that support reconfigurable surface training for sidelink in accordance with aspects of the present disclosure.

FIG. 13 shows a block diagram 1300 of a device 1305 that supports reconfigurable surface training for sidelink in accordance with aspects of the present disclosure. The device 1305 may be an example of aspects of a UE 115 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to reconfigurable surface training for sidelink). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to reconfigurable surface training for sidelink). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of reconfigurable surface training for sidelink as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a first UE in accordance with examples as disclosed herein. For example, the communications manager 1320 may be configured as or otherwise support a means for receiving an indication of a resource pool for training a reconfigurable surface for sidelink communications with a second UE. The communications manager 1320 may be configured as or otherwise support a means for transmitting a reference signal over a subset of resources of the resource pool according to a resource pattern, where the resource pattern is identified based on the resource pool and is associated with a pattern of beams for the reconfigurable surface. The communications manager 1320 may be configured as or otherwise support a means for receiving a report indicating at least one selected beam of the pattern of beams.

Additionally, or alternatively, the communications manager 1320 may support wireless communication at a second UE in accordance with examples as disclosed herein. For example, the communications manager 1320 may be configured as or otherwise support a means for receiving an indication of a resource pool for training a reconfigurable surface for sidelink communications with a first UE. The communications manager 1320 may be configured as or otherwise support a means for receiving, from the first UE via the reconfigurable surface, a reference signal over a subset of resources of the resource pool according to a pattern of beams for the reconfigurable surface, where the pattern of beams is based on a resource pattern associated with the resource pool. The communications manager 1320 may be configured as or otherwise support a means for transmitting, to the first UE, a report indicating at least one selected beam of the pattern of beams.

Additionally, or alternatively, the communications manager 1320 may support wireless communication at a second UE in accordance with examples as disclosed herein. For example, the communications manager 1320 may be configured as or otherwise support a means for receiving a first indication of a resource pool for training a reconfigurable surface for sidelink communications between a first UE and the second UE, where the resource pool includes a first sub-resource pool, a second sub-resource pool, and a resource gap, and where the resource gap is based on an indicated capability of the reconfigurable surface to support different beams or different configurations for the reconfigurable surface between sub-resource pools. The communications manager 1320 may be configured as or otherwise support a means for receiving, from the first UE via the reconfigurable surface, a first reference signal over the first sub-resource pool in a first beam. The communications manager 1320 may be configured as or otherwise support a means for receiving, from the first UE via the reconfigurable surface, a second reference signal over the second sub-resource pool in a second beam. The communications manager 1320 may be configured as or otherwise support a means for transmitting, to the first UE, a report indicating a selection of the first beam or the second beam for communicating with the first UE via the reconfigurable surface.

By including or configuring the communications manager 1320 in accordance with examples as described herein, the device 1305 (e.g., a processor controlling or otherwise coupled to the receiver 1310, the transmitter 1315, the communications manager 1320, or a combination thereof) may support techniques for more efficient utilization of communication resources by using techniques to beam train a RIS for sidelink communications.

Figure 14:
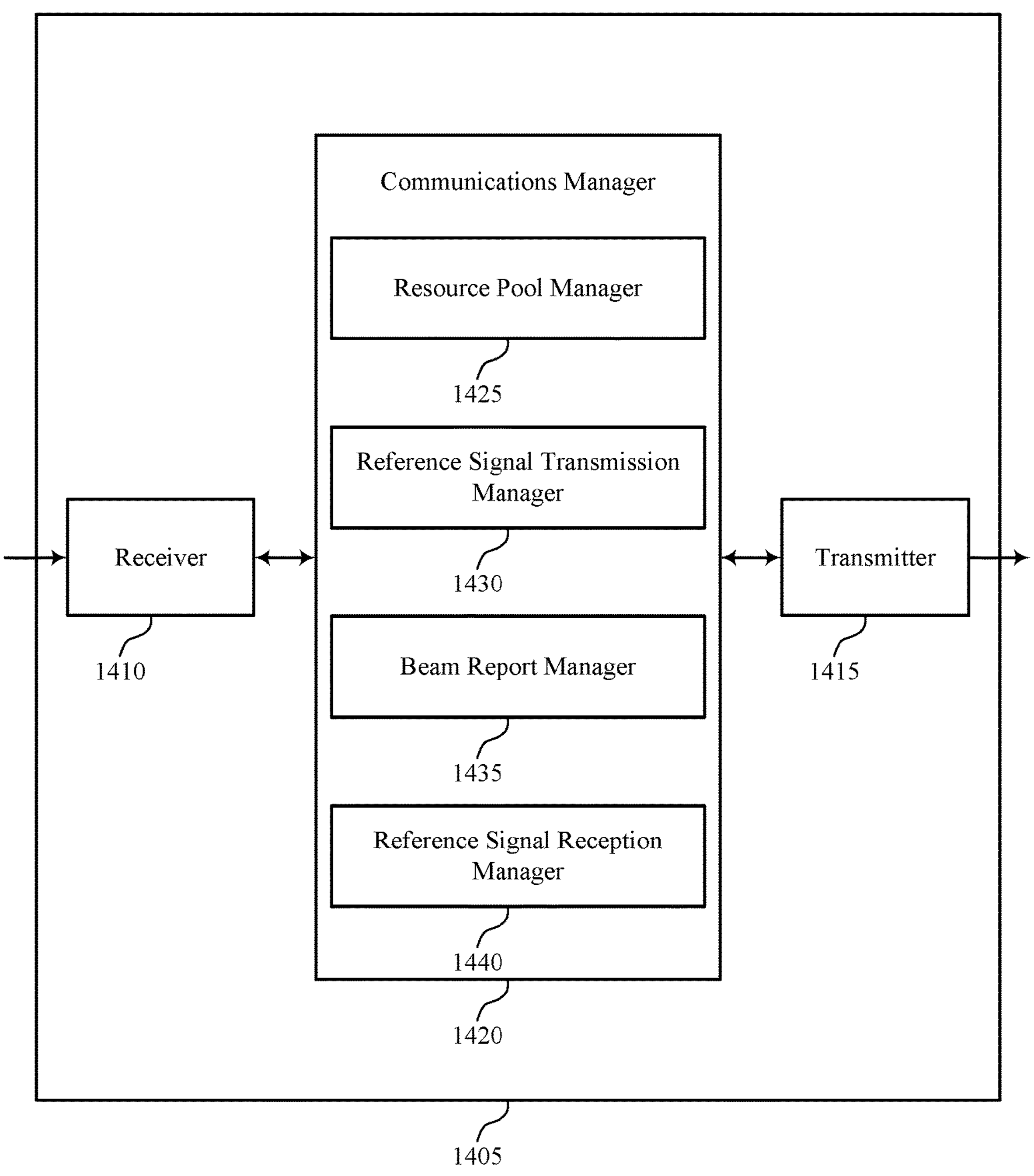

FIG. 14 shows a block diagram 1400 of a device 1405 that supports reconfigurable surface training for sidelink in accordance with aspects of the present disclosure. The device 1405 may be an example of aspects of a device 1305 or a UE 115 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to reconfigurable surface training for sidelink). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to reconfigurable surface training for sidelink). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of reconfigurable surface training for sidelink as described herein. For example, the communications manager 1420 may include a resource pool manager 1425, a reference signal transmission manager 1430, a beam report manager 1435, a reference signal reception manager 1440, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a first UE in accordance with examples as disclosed herein. The resource pool manager 1425 may be configured as or otherwise support a means for receiving an indication of a resource pool for training a reconfigurable surface for sidelink communications with a second UE. The reference signal transmission manager 1430 may be configured as or otherwise support a means for transmitting a reference signal over a subset of resources of the resource pool according to a resource pattern, where the resource pattern is identified based on the resource pool and is associated with a pattern of beams for the reconfigurable surface. The beam report manager 1435 may be configured as or otherwise support a means for receiving a report indicating at least one selected beam of the pattern of beams.

Additionally, or alternatively, the communications manager 1420 may support wireless communication at a second UE in accordance with examples as disclosed herein. The resource pool manager 1425 may be configured as or otherwise support a means for receiving an indication of a resource pool for training a reconfigurable surface for sidelink communications with a first UE. The reference signal reception manager 1440 may be configured as or otherwise support a means for receiving, from the first UE via the reconfigurable surface, a reference signal over a subset of resources of the resource pool according to a pattern of beams for the reconfigurable surface, where the pattern of beams is based on a resource pattern associated with the resource pool. The beam report manager 1435 may be configured as or otherwise support a means for transmitting, to the first UE, a report indicating at least one selected beam of the pattern of beams.

Additionally, or alternatively, the communications manager 1420 may support wireless communication at a second UE in accordance with examples as disclosed herein. The resource pool manager 1425 may be configured as or otherwise support a means for receiving a first indication of a resource pool for training a reconfigurable surface for sidelink communications between a first UE and the second UE, where the resource pool includes a first sub-resource pool, a second sub-resource pool, and a resource gap, and where the resource gap is based on an indicated capability of the reconfigurable surface to support different beams or different configurations for the reconfigurable surface between sub-resource pools. The reference signal reception manager 1440 may be configured as or otherwise support a means for receiving, from the first UE via the reconfigurable surface, a first reference signal over the first sub-resource pool in a first beam. The reference signal reception manager 1440 may be configured as or otherwise support a means for receiving, from the first UE via the reconfigurable surface, a second reference signal over the second sub-resource pool in a second beam. The beam report manager 1435 may be configured as or otherwise support a means for transmitting, to the first UE, a report indicating a selection of the first beam or the second beam for communicating with the first UE via the reconfigurable surface.

Figure 15:
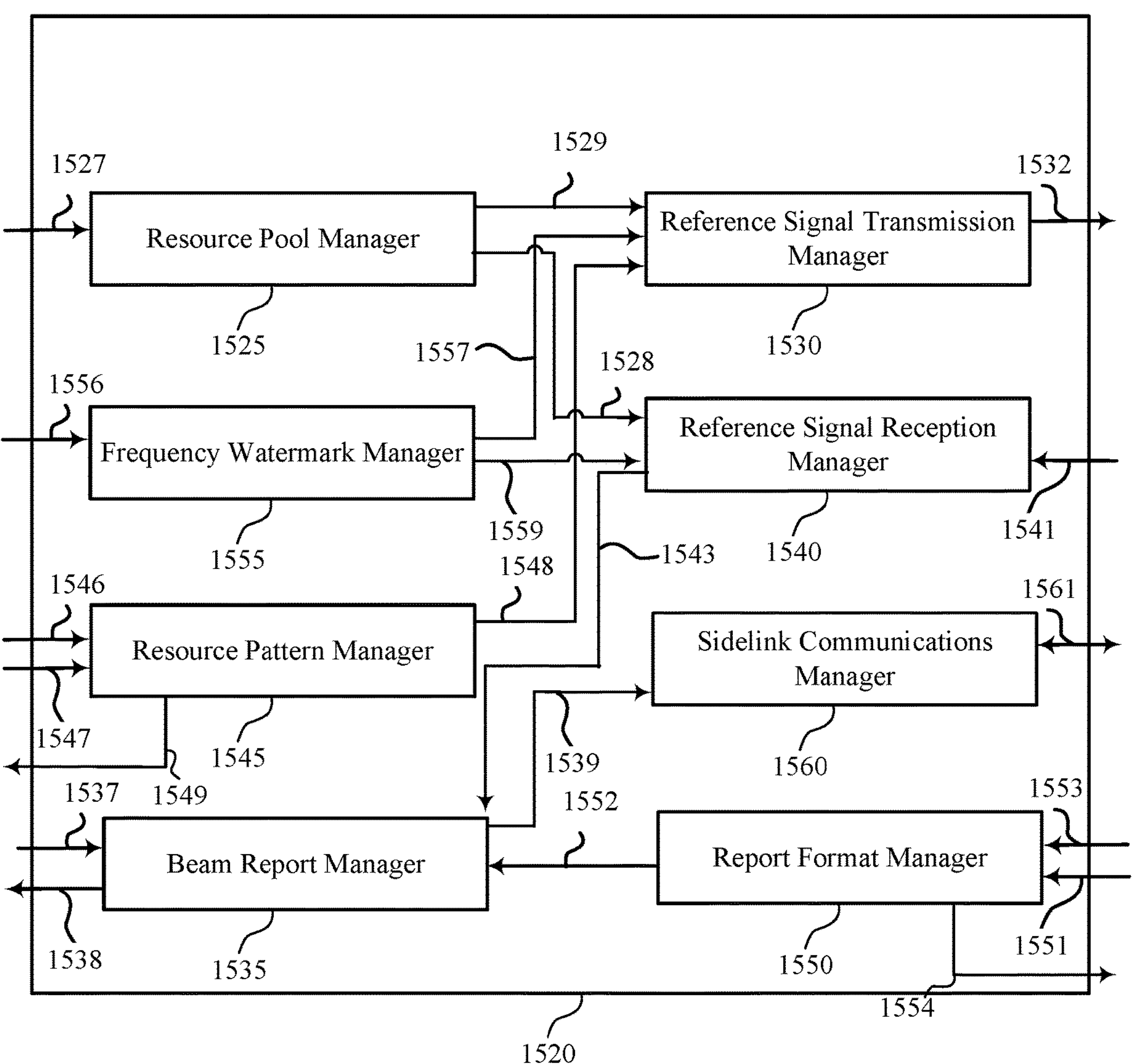
FIG. 15 shows a block diagram of a communications manager that supports reconfigurable surface training for sidelink in accordance with aspects of the present disclosure.

FIG. 15 shows a block diagram 1500 of a communications manager 1520 that supports reconfigurable surface training for sidelink in accordance with aspects of the present disclosure. The communications manager 1520 may be an example of aspects of a communications manager 1320, a communications manager 1420, or both, as described herein. The communications manager 1520, or various components thereof, may be an example of means for performing various aspects of reconfigurable surface training for sidelink as described herein. For example, the communications manager 1520 may include a resource pool manager 1525, a reference signal transmission manager 1530, a beam report manager 1535, a reference signal reception manager 1540, a resource pattern manager 1545, a report format manager 1550, a frequency watermark manager 1555, a sidelink communications manager 1560, or any combination thereof.

Each of these components may communicate, directly or indirectly, with one another (e.g., via one or more buses).

The communications manager 1520 may support wireless communication at a first UE in accordance with examples as disclosed herein. The resource pool manager 1525 may be configured as or otherwise support a means for receiving an indication 1527 of a resource pool for training a reconfigurable surface for sidelink communications with a second UE. The reference signal transmission manager 1530 may be configured as or otherwise support a means for transmitting a reference signal 1532 over a subset of resources of the resource pool according to a resource pattern, where the resource pattern is identified based on the resource pool and is associated with a pattern of beams for the reconfigurable surface. The resource pool manager 1525 may be configured as or otherwise support a means for transmitting an information 1529 (e.g., an indication of the resource pool for training a reconfigurable surface for sidelink communications with a second UE) to the reference signal transmission manager 1530. The beam report manager 1535 may be configured as or otherwise support a means for receiving a report 1537 indicating at least one selected beam of the pattern of beams. The beam report manager 1535 may be configured as or otherwise support a means for transmitting information 1539 (e.g., an indication of the report indicating at least one selected beam of the pattern of beams) to the sidelink communications manager 1560.

In some examples, the resource pattern manager 1545 may be configured as or otherwise support a means for receiving an indication 1546 of the resource pattern, where the resource pattern may include a set of symbols across one or more slots of the resource pool and resource gaps between one or more symbols of the set of symbols.

In some examples, the resource pattern is based on an indicated capability of the reconfigurable surface to switch between different beams or different configurations for the reconfigurable surface.

In some examples, the resource pattern manager 1545 may be configured as or otherwise support a means for receiving an indication 1547 of a set of multiple resource patterns associated with the resource pool. In some examples, the resource pattern manager 1545 may be configured as or otherwise support a means for selecting the resource pattern from the set of multiple resource patterns based on one or more attributes of the sidelink communications. The resource pattern manager 1545 may be configured as or otherwise support a means for transmitting information 1548 (e.g., an indication of the resource pattern) to the reference signal transmission manager 1530.

In some examples, the resource pattern manager 1545 may be configured as or otherwise support a means for transmitting information 1549 (e.g., an indication of the resource pattern) to the second UE via one of a RRC message, a MAC-CE message, a sidelink control information message, or a physical sidelink shared channel message.

In some examples, the report format manager 1550 may be configured as or otherwise support a means for receiving, from a network device, an indication 1551 of a report format, where receiving the report indicating the at least one selected beam of the pattern of beams is based on the report format. The report format manager 1550 may be configured as or otherwise support a means for transmitting information 1552 (e.g., an indication of the beam report format) to the beam report manager 1535.

In some examples, to support receiving the indication of the report format, the report format manager 1550 may be configured as or otherwise support a means for receiving the indication 1551 of the report format via one of a RRC message or a MAC-CE message.

In some examples, the report format includes a first set of best beams, a second set of worst beams, one or more metrics associated with beams of the pattern of beams, or a combination thereof.

In some examples, the one or more metrics associated with the beams of the pattern of beams include an RSRP measurement, a reference signal received quality measurement, or an SINR.

In some examples, the report format indicates a selected metric of the one or more metrics based on a determined priority or a determined quality of service target associated with the sidelink communications.

In some examples, the report format manager 1550 may be configured as or otherwise support a means for receiving, from a network device, an indication 1553 of a set of report formats associated with a set of priorities and quality of service targets. In some examples, the report format manager 1550 may be configured as or otherwise support a means for transmitting, to the second UE, information 1554 (e.g., an indication of a selected report format of the set of report formats associated with the set of priorities and quality of service targets, where receiving the report indicating the at least one selected beam of the pattern of beams is based on the selected report format).

In some examples, the report format manager 1550 may be configured as or otherwise support a means for receiving, from a network device, an indication 1553 of a set of report formats associated with a set of priorities. In some examples, the report format manager 1550 may be configured as or otherwise support a means for transmitting, to the second UE, information 1554 (e.g., an indication of a priority of the set of priorities for the reference signal, where receiving the report indicating the at least one selected beam of the pattern of beams includes receiving the report based on a report format of the set of report formats associated with the indicated priority).

In some examples, the frequency watermark manager 1555 may be configured as or otherwise support a means for receiving, from a network device, an indication 1556 of a set of frequency watermarks associated with the resource pool for the reconfigurable surface: where transmitting the reference signal over the subset of resources of the resource pool is based on a selected frequency watermark associated with the resource pool of the set of frequency watermarks. The frequency watermark manager may be configured as or otherwise support a means for transmitting information 1557 (e.g., an indication of the set of frequency watermarks or a selected frequency watermark of the set of frequency watermarks) to the reference signal transmission manager 1530.

In some examples, to support transmitting the reference signal over the subset of resources of the resource pool, the reference signal transmission manager 1530 may be configured as or otherwise support a means for transmitting the reference signal 1532 over a set of multiple transmit beams associated with the subset of resources.

In some examples, the report further indicates at least one selected transmit beam of the set of multiple transmit beams.

In some examples, the sidelink communications manager 1560 may be configured as or otherwise support a means for exchanging communications 1561 with the second UE via the reconfigurable surface based on the at least one selected beam.

Additionally, or alternatively, the communications manager 1520 may support wireless communication at a second UE in accordance with examples as disclosed herein. In some examples, the resource pool manager 1525 may be configured as or otherwise support a means for receiving an indication 1527 of a resource pool for training a reconfigurable surface for sidelink communications with a first UE. The resource pool manager 1525 may be configured as or otherwise support a means for transmitting information 1528 (e.g., an indication of the resource pool for training a reconfigurable surface for sidelink communications with a second UE) to the reference signal reception manager 1540. The reference signal reception manager 1540 may be configured as or otherwise support a means for receiving, from the first UE via the reconfigurable surface, reference signals (e.g., a reference signal over a subset of resources of the resource pool according to a pattern of beams for the reconfigurable surface, where the pattern of beams is based on a resource pattern associated with the resource pool). The reference signal reception manager 1540 may be configured as or otherwise support a means for transmitting information 1543 (e.g., an indication of the received reference signal 1541) to the beam report manager 1535. In some examples, the beam report manager 1535 may be configured as or otherwise support a means for transmitting, to the first UE, a report 1538 (e.g., indicating at least one selected beam of the pattern of beams).

In some examples, the resource pattern manager 1545 may be configured as or otherwise support a means for receiving an indication 1546 of the resource pattern, where the resource pattern includes a set of symbols across one or more slots of the resource pool and resource gaps between one or more symbols of the set of symbols.

In some examples, to support receiving the reference signal, the reference signal reception manager 1540 may be configured as or otherwise support a means for monitoring for the reference signal during the set of symbols.

In some examples, the resource pattern is based on an indicated capability of the reconfigurable surface to switch between different beams or different configurations for the reconfigurable surface.

In some examples, the resource pattern manager 1545 may be configured as or otherwise support a means for receiving, from the first UE, an indication 1546 of the resource pattern via one of a RRC message, a MAC-CE message, a sidelink control information message, or a physical sidelink shared channel message.

In some examples, the report format manager 1550 may be configured as or otherwise support a means for receiving, from a network device, an indication 1551 of a report format, where transmitting the report indicating the at least one selected beam of the pattern of beams is based on the report format.

In some examples, to support receiving the indication of the report format, the report format manager 1550 may be configured as or otherwise support a means for receiving the indication 1551 of the report format via one of a RRC message or a MAC-CE message.

In some examples, the report format includes a first set of best beams, a second set of worst beams, one or more metrics associated with beams of the pattern of beams, or a combination thereof.

In some examples, the one or more metrics associated with the beams of the pattern of beams include an RSRP measurement, an RSRQ measurement, or an SINR.

In some examples, the report format indicates a selected metric of the one or more metrics based on a determined priority or a determined quality of service target associated with the sidelink communications.

In some examples, the report format manager 1550 may be configured as or otherwise support a means for receiving, from a network device, an indication 1553 of a set of report formats associated with a set of priorities and quality of service targets. In some examples, the report format manager 1550 may be configured as or otherwise support a means for receiving, from the first UE, an indication 1551 of a selected report format of the set of report formats associated with the set of priorities and quality of service targets, where transmitting the report indicating the at least one selected beam of the pattern of beams is based on the selected report format.

In some examples, the report format manager 1550 may be configured as or otherwise support a means for receiving, from a network device, an indication 1553 of a set of report formats associated with a set of priorities. In some examples, the report format manager 1550 may be configured as or otherwise support a means for receiving, from the first UE, an indication 1551 of a priority of the set of priorities associated with the reference signal, where transmitting the report indicating the at least one selected beam of the pattern of beams includes transmitting the report based on a report format of the set of report formats associated with the indicated priority.

In some examples, the frequency watermark manager 1555 may be configured as or otherwise support a means for receiving, from a network device, an indication 1556 of a set of frequency watermarks associated with the resource pool for the reconfigurable surface: where receiving the reference signal over the subset of resources of the resource pool is based on a selected frequency watermark associated with the resource pool of the set of frequency watermarks. The frequency watermark manager may be configured as or otherwise support a means for transmitting information 1559 (e.g., an indication of the set of frequency watermarks or a selected frequency watermark of the set of frequency watermarks) to the reference signal reception manager 1540

In some examples, the sidelink communications manager 1560 may be configured as or otherwise support a means for exchanging communications 1561 with the first UE via the reconfigurable surface based on the at least one selected beam.

Additionally, or alternatively, the communications manager 1520 may support wireless communication at a second UE in accordance with examples as disclosed herein. In some examples, the resource pool manager 1525 may be configured as or otherwise support a means for receiving a first indication 1527 of a resource pool for training a reconfigurable surface for sidelink communications between a first UE and the second UE, where the resource pool includes a first sub-resource pool, a second sub-resource pool, and a resource gap, and where the resource gap is based on an indicated capability of the reconfigurable surface to support different beams or different configurations for the reconfigurable surface between sub-resource pools. In some examples, the reference signal reception manager 1540 may be configured as or otherwise support a means for receiving, from the first UE via the reconfigurable surface, a first reference signal over the first sub-resource pool in a first beam. In some examples, the reference signal reception manager 1540 may be configured as or otherwise support a means for receiving, from the first UE via the reconfigurable surface, a second reference signal over the second sub-resource pool in a second beam. In some examples, the beam report manager 1535 may be configured as or otherwise support a means for transmitting, to the first UE, a report 1538 indicating a selection of the first beam or the second beam for communicating with the first UE via the reconfigurable surface.

In some examples, receiving the first reference signal includes receiving the first reference signal based on a first configuration of the reconfigurable surface for the first sub-resource pool. In some examples, receiving the second reference signal includes receiving the second reference signal based on a second configuration of the reconfigurable surface for the second sub-resource pool.

In some examples, to support wireless communications, the reference signal reception manager 1540 may be configured as or otherwise support a means for receiving, from the reconfigurable surface, a third reference signal over the third sub-resource pool via a third beam.

In some examples, the indicated capability is based on an ability of the reconfigurable surface to adjust surface elements of the reconfigurable surface over a frequency range.

In some examples, the first sub-resource pool includes a first set of symbols within a first frequency range and the second sub-resource pool includes a second set of symbols within a second frequency range. In some examples, the resource gap includes a duration of time between the first set of symbols and the second set of symbols or a third frequency range between the first frequency range and the second frequency range.

In some examples, the first beam is associated with a first transmit beam transmitted by the first UE and a first configuration of the reconfigurable surface. In some examples, the second beam is associated with a second transmit beam transmitted by the first UE and the first configuration of the reconfigurable surface.

In some examples, the beam report manager 1535 may be configured as or otherwise support a means for transmitting, to the first UE with the report 1538, an indication of a second selection of the first transmit beam or the second transmit beam for communicating with the first UE via the reconfigurable surface.

Figure 16:
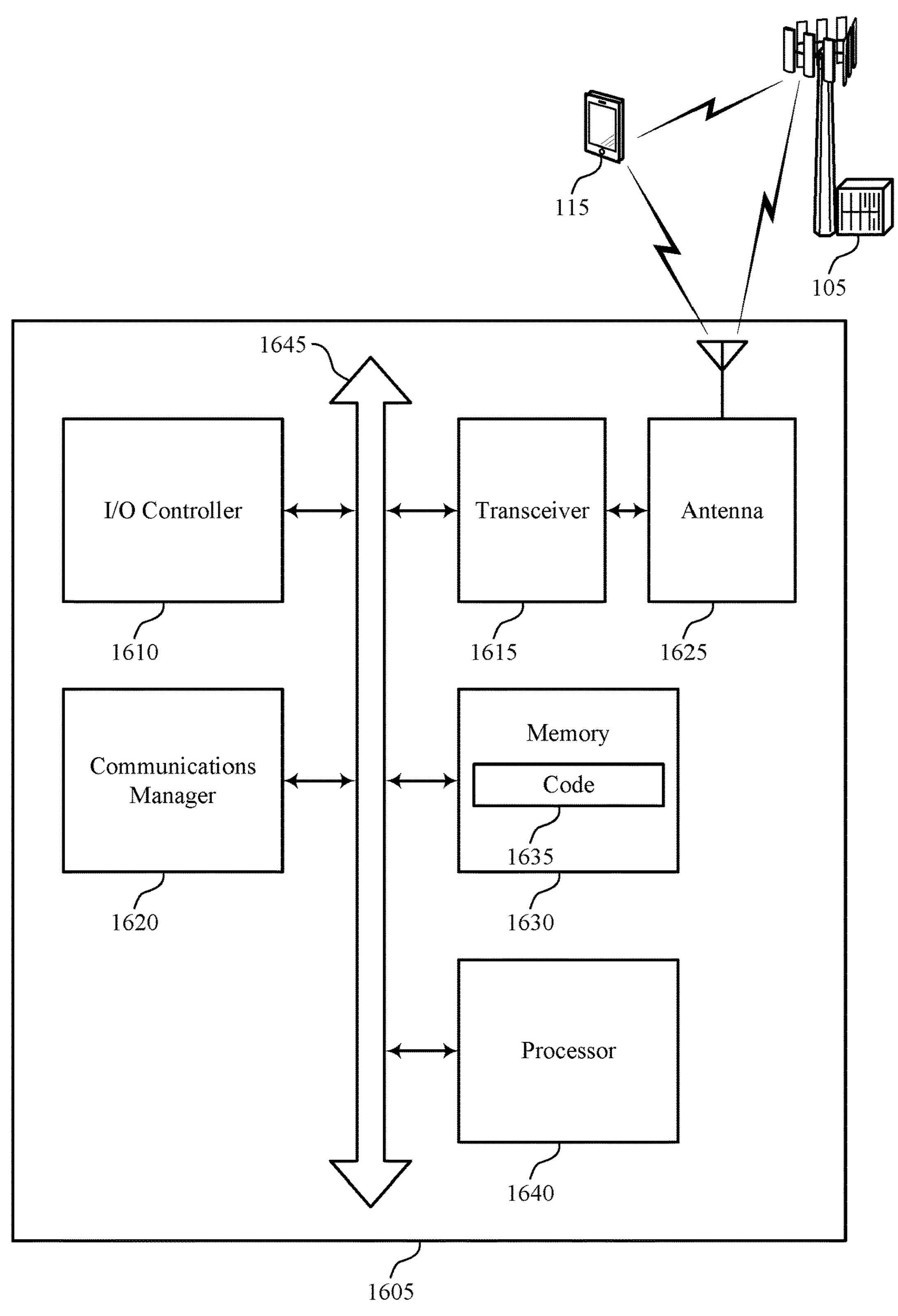
FIG. 16 shows a diagram of a system including a device that supports reconfigurable surface training for sidelink in accordance with aspects of the present disclosure.

FIG. 16 shows a diagram of a system 1600 including a device 1605 that supports reconfigurable surface training for sidelink in accordance with aspects of the present disclosure. The device 1605 may be an example of or include the components of a device 1305, a device 1405, or a UE 115 as described herein. The device 1605 may communicate wirelessly with one or more network devices 105, UEs 115, or any combination thereof. The device 1605 may include components for bi-directional voice and data communications including components for transmitting and receiving communications, such as a communications manager 1620, an input/output (I/O) controller 1610, a transceiver 1615, an antenna 1625, a memory 1630, code 1635, and a processor 1640. These components may be in electronic communication or otherwise coupled (e.g., operatively, communicatively, functionally, electronically, electrically) via one or more buses (e.g., a bus 1645).

The I/O controller 1610 may manage input and output signals for the device 1605. The I/O controller 1610 may also manage peripherals not integrated into the device 1605. In some cases, the I/O controller 1610 may represent a physical connection or port to an external peripheral. In some cases, the I/O controller 1610 may utilize an operating system such as iOS®, ANDROID®, MS-DOS®, MS-WINDOWS®, OS/2®, UNIX®, LINUX®, or another known operating system. Additionally, or alternatively, the I/O controller 1610 may represent or interact with a modem, a keyboard, a mouse, a touchscreen, or a similar device. In some cases, the I/O controller 1610 may be implemented as part of a processor, such as the processor 1640. In some cases, a user may interact with the device 1605 via the I/O controller 1610 or via hardware components controlled by the I/O controller 1610.

In some cases, the device 1605 may include a single antenna 1625. However, in some other cases, the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include random access memory (RAM) and read-only memory (ROM). The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a basic I/O system (BIOS) which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting reconfigurable surface training for sidelink). For example, the device 1605 or a component of the device 1605 may include a processor 1640 and memory 1630 coupled to the processor 1640, the processor 1640 and memory 1630 configured to perform various functions described herein.

The communications manager 1620 may support wireless communication at a first UE in accordance with examples as disclosed herein. For example, the communications manager 1620 may be configured as or otherwise support a means for receiving an indication of a resource pool for training a reconfigurable surface for sidelink communications with a second UE. The communications manager 1620 may be configured as or otherwise support a means for transmitting a reference signal over a subset of resources of the resource pool according to a resource pattern, where the resource pattern is identified based on the resource pool and is associated with a pattern of beams for the reconfigurable surface. The communications manager 1620 may be configured as or otherwise support a means for receiving a report indicating at least one selected beam of the pattern of beams.

Additionally, or alternatively, the communications manager 1620 may support wireless communication at a second UE in accordance with examples as disclosed herein. For example, the communications manager 1620 may be configured as or otherwise support a means for receiving an indication of a resource pool for training a reconfigurable surface for sidelink communications with a first UE. The communications manager 1620 may be configured as or otherwise support a means for receiving, from the first UE via the reconfigurable surface, a reference signal over a subset of resources of the resource pool according to a pattern of beams for the reconfigurable surface, where the pattern of beams is based on a resource pattern associated with the resource pool. The communications manager 1620 may be configured as or otherwise support a means for transmitting, to the first UE, a report indicating at least one selected beam of the pattern of beams.

Additionally, or alternatively, the communications manager 1620 may support wireless communication at a second UE in accordance with examples as disclosed herein. For example, the communications manager 1620 may be configured as or otherwise support a means for receiving a first indication of a resource pool for training a reconfigurable surface for sidelink communications between a first UE and the second UE, where the resource pool includes a first sub-resource pool, a second sub-resource pool, and a resource gap, and where the resource gap is based on an indicated capability of the reconfigurable surface to support different beams or different configurations for the reconfigurable surface between sub-resource pools. The communications manager 1620 may be configured as or otherwise support a means for receiving, from the first UE via the reconfigurable surface, a first reference signal over the first sub-resource pool in a first beam. The communications manager 1620 may be configured as or otherwise support a means for receiving, from the first UE via the reconfigurable surface, a second reference signal over the second sub-resource pool in a second beam. The communications manager 1620 may be configured as or otherwise support a means for transmitting, to the first UE, a report indicating a selection of the first beam or the second beam for communicating with the first UE via the reconfigurable surface.

By including or configuring the communications manager 1620 in accordance with examples as described herein, the device 1605 may support techniques for improved communication reliability, more efficient utilization of communication resources, and improved coordination between devices by using techniques to beam train a RIS for sidelink communications.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of reconfigurable surface training for sidelink as described herein, or the processor 1640 and the memory 1630 may be otherwise configured to perform or support such operations.

Figure 17:
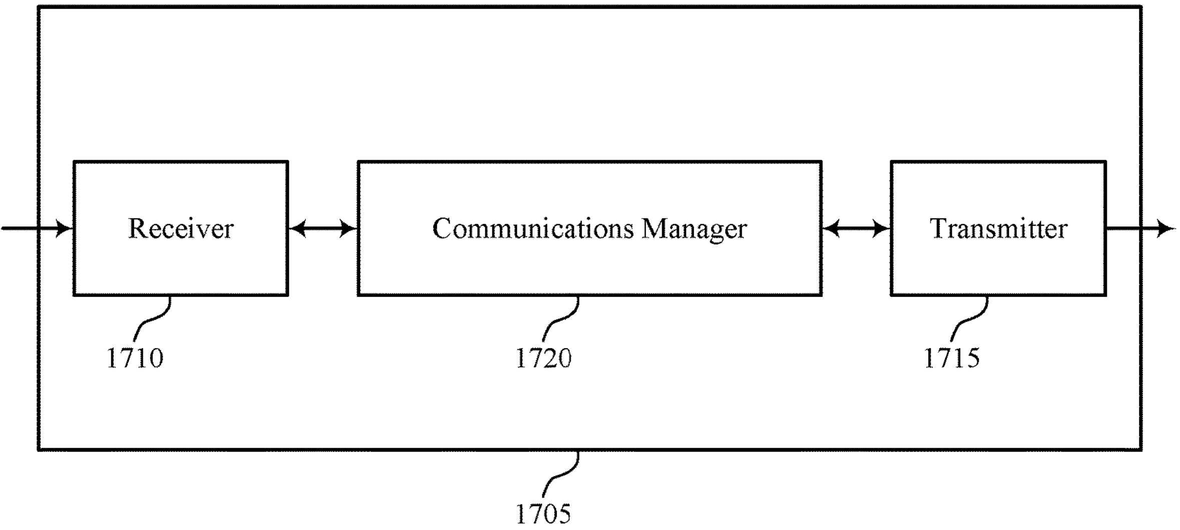
FIGS. 17 and 18 show block diagrams of devices that support reconfigurable surface training for sidelink in accordance with aspects of the present disclosure.

FIG. 17 shows a block diagram 1700 of a device 1705 that supports reconfigurable surface training for sidelink in accordance with aspects of the present disclosure. The device 1705 may be an example of aspects of a network device 105 as described herein. The device 1705 may include a receiver 1710, a transmitter 1715, and a communications manager 1720. The device 1705 may also include a processor. Each of these components may be in communication with one another (e.g., via one or more buses).

The receiver 1710 may provide a means for receiving information such as packets, user data, control information, or any combination thereof associated with various information channels (e.g., control channels, data channels, information channels related to reconfigurable surface training for sidelink). Information may be passed on to other components of the device 1705. The receiver 1710 may utilize a single antenna or a set of multiple antennas.

The transmitter 1715 may provide a means for transmitting signals generated by other components of the device 1705. For example, the transmitter 1715 may transmit information such as packets, user data, control information, or any combination thereof associated with various information channels (e.g., control channels, data channels, information channels related to reconfigurable surface training for sidelink). In some examples, the transmitter 1715 may be co-located with a receiver 1710 in a transceiver module. The transmitter 1715 may utilize a single antenna or a set of multiple antennas.

The communications manager 1720, the receiver 1710, the transmitter 1715, or various combinations thereof or various components thereof may be examples of means for performing various aspects of reconfigurable surface training for sidelink as described herein. For example, the communications manager 1720, the receiver 1710, the transmitter 1715, or various combinations or components thereof may support a method for performing one or more of the functions described herein.

In some examples, the communications manager 1720, the receiver 1710, the transmitter 1715, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1720, the receiver 1710, the transmitter 1715, or various combinations or components thereof may be implemented in code (e.g., as communications management software or firmware) executed by a processor. If implemented in code executed by a processor, the functions of the communications manager 1720, the receiver 1710, the transmitter 1715, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1720 may be configured to perform various operations (e.g., receiving, monitoring, transmitting) using or otherwise in cooperation with the receiver 1710, the transmitter 1715, or both. For example, the communications manager 1720 may receive information from the receiver 1710, send information to the transmitter 1715, or be integrated in combination with the receiver 1710, the transmitter 1715, or both to receive information, transmit information, or perform various other operations as described herein.

The communications manager 1720 may support wireless communication at a network device in accordance with examples as disclosed herein. For example, the communications manager 1720 may be configured as or otherwise support a means for receiving, from a reconfigurable surface, an indication of a capability of the reconfigurable surface to support different beams or different configurations for the reconfigurable surface between sub-resource pools. The communications manager 1720 may be configured as or otherwise support a means for transmitting, to the reconfigurable surface, a first UE, and a second UE, an indication of a resource pool for training the reconfigurable surface for sidelink communications between a first UE and the second UE, where the resource pool includes a first sub-resource pool, a second sub-resource pool, and a resource gap, and where the resource gap is based on the indicated capability of the reconfigurable surface.

By including or configuring the communications manager 1720 in accordance with examples as described herein, the device 1705 (e.g., a processor controlling or otherwise coupled to the receiver 1710, the transmitter 1715, the communications manager 1720, or a combination thereof) may support techniques for more efficient utilization of communication resources by using techniques to beam train a RIS for sidelink communications.

Figure 18:
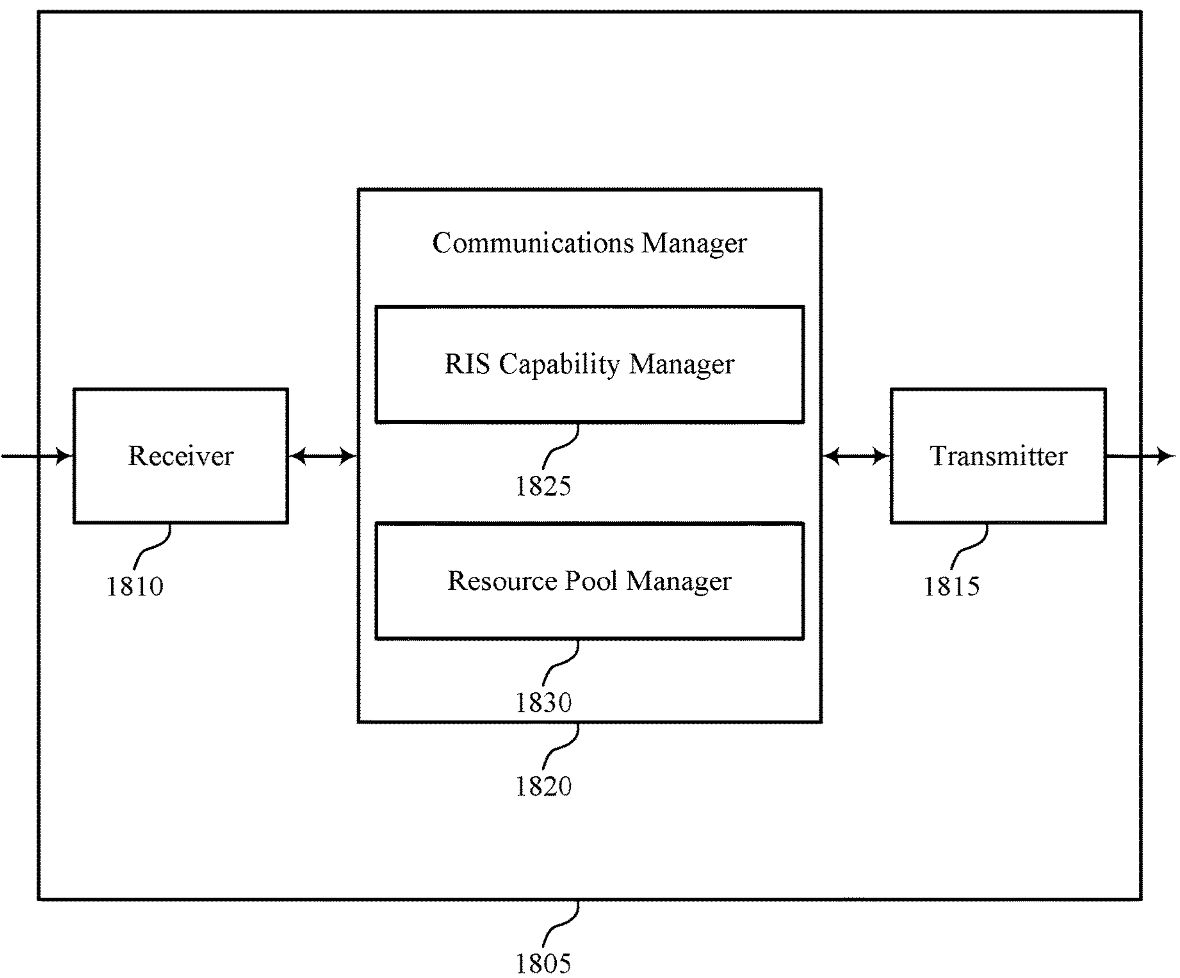
Figure 18:

FIG. 18 shows a block diagram 1800 of a device 1805 that supports reconfigurable surface training for sidelink in accordance with aspects of the present disclosure. The device 1805 may be an example of aspects of a device 1705 or a network device 105 as described herein. The device 1805 may include a receiver 1810, a transmitter 1815, and a communications manager 1820. The device 1805 may also include a processor. Each of these components may be in communication with one another (e.g., via one or more buses).

The receiver 1810 may provide a means for receiving information such as packets, user data, control information, or any combination thereof associated with various information channels (e.g., control channels, data channels, information channels related to reconfigurable surface training for sidelink). Information may be passed on to other components of the device 1805. The receiver 1810 may utilize a single antenna or a set of multiple antennas.

The transmitter 1815 may provide a means for transmitting signals generated by other components of the device 1805. For example, the transmitter 1815 may transmit information such as packets, user data, control information, or any combination thereof associated with various information channels (e.g., control channels, data channels, information channels related to reconfigurable surface training for sidelink). In some examples, the transmitter 1815 may be co-located with a receiver 1810 in a transceiver module. The transmitter 1815 may utilize a single antenna or a set of multiple antennas.

The device 1805, or various components thereof, may be an example of means for performing various aspects of reconfigurable surface training for sidelink as described herein. For example, the communications manager 1820 may include a RIS capability manager 1825 a resource pool manager 1830, or any combination thereof. The communications manager 1820 may be an example of aspects of a communications manager 1720 as described herein. In some examples, the communications manager 1820, or various components thereof, may be configured to perform various operations (e.g., receiving, monitoring, transmitting) using or otherwise in cooperation with the receiver 1810, the transmitter 1815, or both. For example, the communications manager 1820 may receive information from the receiver 1810, send information to the transmitter 1815, or be integrated in combination with the receiver 1810, the transmitter 1815, or both to receive information, transmit information, or perform various other operations as described herein.

The communications manager 1820 may support wireless communication at a network device in accordance with examples as disclosed herein. The RIS capability manager 1825 may be configured as or otherwise support a means for receiving, from a reconfigurable surface, an indication of a capability of the reconfigurable surface to support different beams or different configurations for the reconfigurable surface between sub-resource pools. The resource pool manager 1830 may be configured as or otherwise support a means for transmitting, to the reconfigurable surface, a first UE, and a second UE, an indication of a resource pool for training the reconfigurable surface for sidelink communications between a first UE and the second UE, where the resource pool includes a first sub-resource pool, a second sub-resource pool, and a resource gap, and where the resource gap is based on the indicated capability of the reconfigurable surface.

Figure 19:
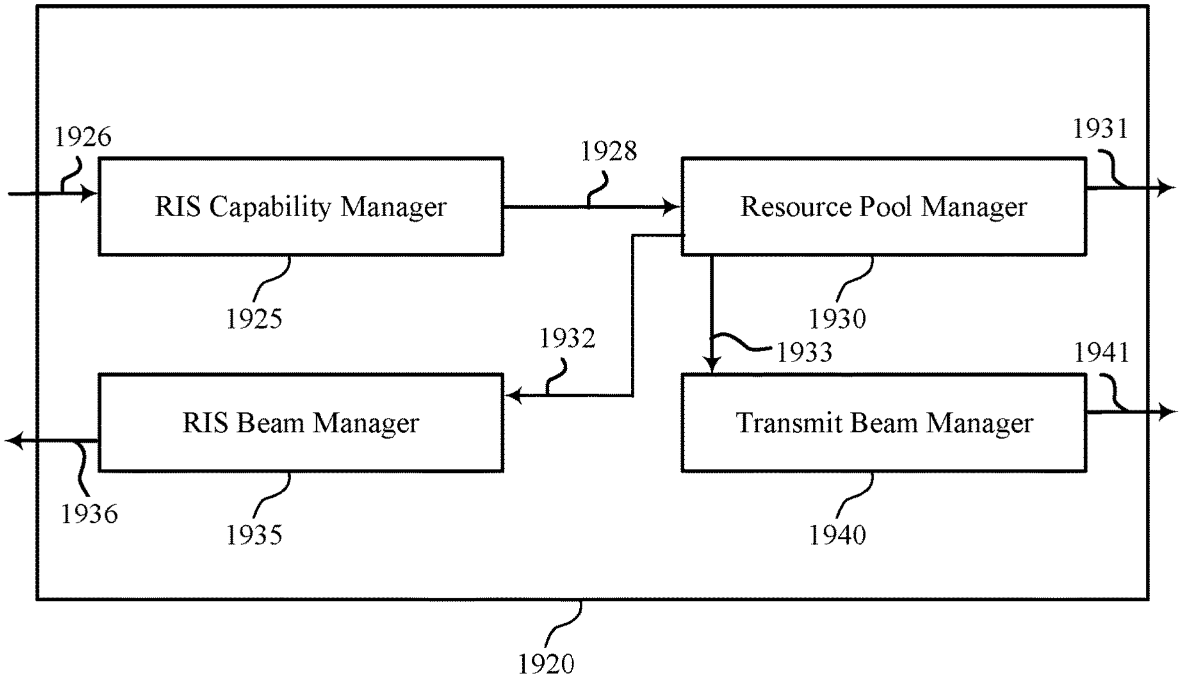
FIG. 19 shows a block diagram of a communications manager that supports reconfigurable surface training for sidelink in accordance with aspects of the present disclosure.
Figure 19:

FIG. 19 shows a block diagram 1900 of a communications manager 1920 that supports reconfigurable surface training for sidelink in accordance with aspects of the present disclosure. The communications manager 1920 may be an example of aspects of a communications manager 1720, a communications manager 1820, or both, as described herein. The communications manager 1920, or various components thereof, may be an example of means for performing various aspects of reconfigurable surface training for sidelink as described herein. For example, the communications manager 1920 may include a RIS capability manager 1925, a resource pool manager 1930, a RIS beam manager 1935, a transmit beam manager 1940, or any combination thereof. Each of these components may communicate, directly or indirectly, with one another (e.g., via one or more buses).

The communications manager 1920 may support wireless communication at a network device in accordance with examples as disclosed herein. The RIS capability manager 1925 may be configured as or otherwise support a means for receiving, from a reconfigurable surface, an indication 1926 of a capability of the reconfigurable surface to support different beams or different configurations for the reconfigurable surface between sub-resource pools. The RIS capability manager 1925 may be configured as or otherwise support a means for transmitting information 1928 (e.g., an indication of capability of the reconfigurable surface to support different beams or different configurations for the reconfigurable surface between sub-resource pools) to the resource pool manager 1930. The resource pool manager 1930 may be configured as or otherwise support a means for transmitting, to the reconfigurable surface, a first UE, and a second UE, an indication 1931 of a resource pool for training the reconfigurable surface for sidelink communications between a first UE and the second UE, where the resource pool includes a first sub-resource pool, a second sub-resource pool, and a resource gap, and where the resource gap is based on the indicated capability of the reconfigurable surface. The resource pool manager 1930 may be configured as or otherwise support a means for transmitting information 1932 (e.g., an indication of the first sub-resource pool, the second sub-resource pool, and the resource gap) to the RIS beam manager 1935. The resource pool manager 1930 may be configured as or otherwise support a means for transmitting information 1933 (e.g., an indication of the first sub-resource pool, the second sub-resource pool, and the resource gap) to the transmit beam manager 1940.

In some examples, the first sub-resource pool includes a first set of symbols within a first frequency range and the second sub-resource pool includes a second set of symbols within a second frequency range. In some examples, the resource gap includes a duration of time between the first set of symbols and the second set of symbols or a third frequency range between the first frequency range and the second frequency range.

In some examples, the capability is based on an ability of the reconfigurable surface to adjust surface elements of the reconfigurable surface over a frequency range.

In some examples, the RIS beam manager 1935 may be configured as or otherwise support a means for transmitting, to the reconfigurable surface and the second UE, a second indication 1936 of a first beam of the reconfigurable surface associated with the first sub-resource pool and a second beam of the reconfigurable surface associated with the second sub-resource pool.

In some examples, the transmit beam manager 1940 may be configured as or otherwise support a means for transmitting, to the first UE, a second indication 1941 of a first transmit beam for the first sub-resource pool and of a second transmit beam for the second sub-resource pool.

In some examples, the resource pool includes a third sub-resource pool and a second resource gap.

Figure 20:
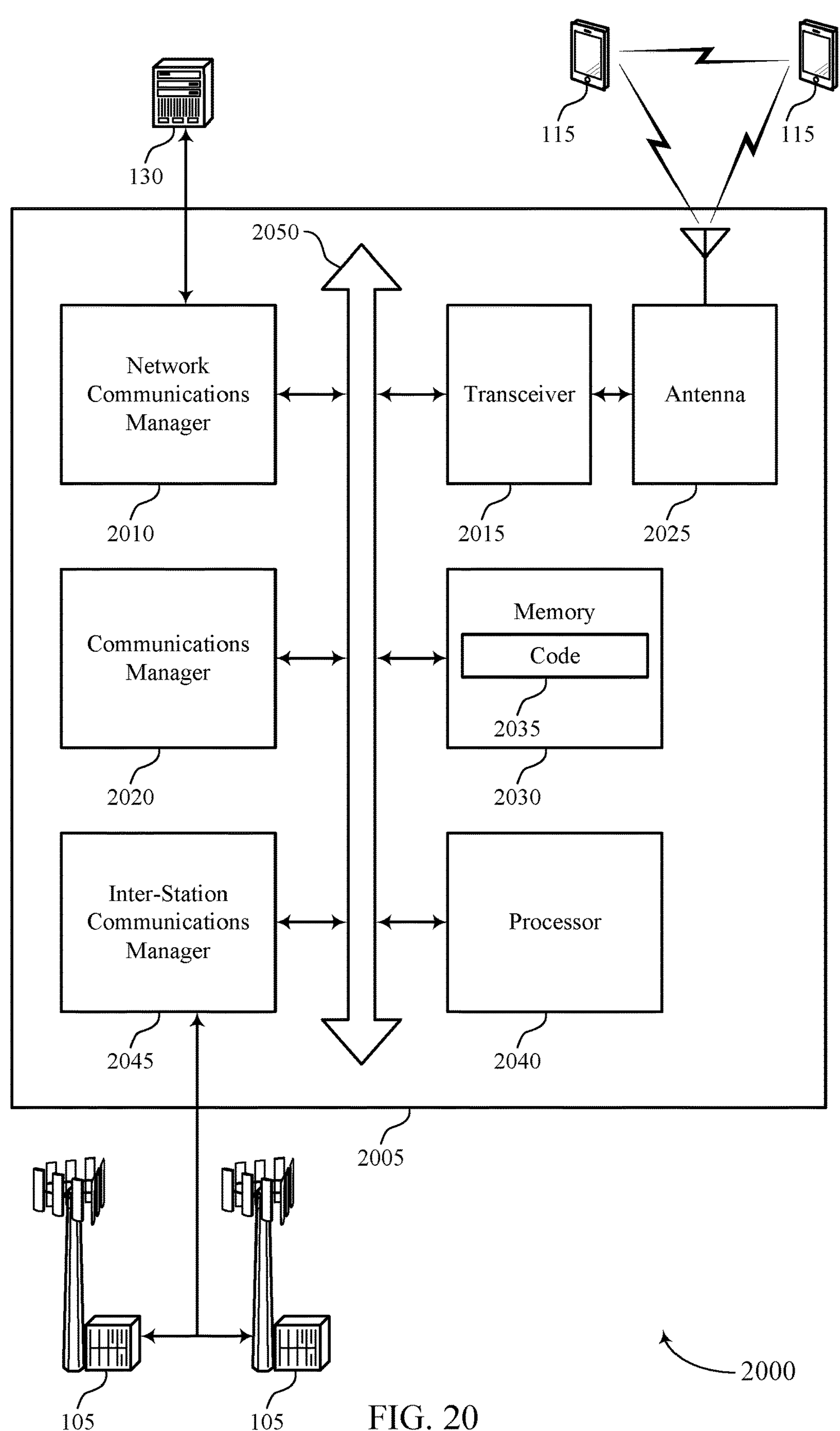
FIG. 20 shows a diagram of a system including a device that supports reconfigurable surface training for sidelink in accordance with aspects of the present disclosure.

FIG. 20 shows a diagram of a system 2000 including a device 2005 that supports reconfigurable surface training for sidelink in accordance with aspects of the present disclosure. The device 2005 may be an example of or include the components of a device 1705, a device 1805, or a network device 105 as described herein. The device 2005 may communicate wirelessly with one or more network devices 105, UEs 115, or any combination thereof. The device 2005 may include components for bi-directional voice and data communications including components for transmitting and receiving communications, such as a communications manager 2020, a network communications manager 2010, a transceiver 2015, an antenna 2025, a memory 2030, code 2035, a processor 2040, and an inter-station communications manager 2045. These components may be in electronic communication or otherwise coupled (e.g., operatively, communicatively, functionally, electronically, electrically) via one or more buses (e.g., a bus 2050).

The network communications manager 2010 may manage communications with a core network 130 (e.g., via one or more wired backhaul links). For example, the network communications manager 2010 may manage the transfer of data communications for client devices, such as one or more UEs 115.

In some cases, the device 2005 may include a single antenna 2025. However, in some other cases the device 2005 may have more than one antenna 2025, which may be capable of concurrently transmitting or receiving multiple wireless transmissions. The transceiver 2015 may communicate bi-directionally, via the one or more antennas 2025, wired, or wireless links as described herein. For example, the transceiver 2015 may represent a wireless transceiver and may communicate bi-directionally with another wireless transceiver. The transceiver 2015 may also include a modem to modulate the packets, to provide the modulated packets to one or more antennas 2025 for transmission, and to demodulate packets received from the one or more antennas 2025. The transceiver 2015, or the transceiver 2015 and one or more antennas 2025, may be an example of a transmitter 1715, a transmitter 1815, a receiver 1710, a receiver 1810, or any combination thereof or component thereof, as described herein.

The memory 2030 may include RAM and ROM. The memory 2030 may store computer-readable, computer-executable code 2035 including instructions that, when executed by the processor 2040, cause the device 2005 to perform various functions described herein. The code 2035 may be stored in a non-transitory computer-readable medium such as system memory or another type of memory. In some cases, the code 2035 may not be directly executable by the processor 2040 but may cause a computer (e.g., when compiled and executed) to perform functions described herein. In some cases, the memory 2030 may contain, among other things, a BIOS which may control basic hardware or software operation such as the interaction with peripheral components or devices.

The processor 2040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2040 may be configured to operate a memory array using a memory controller. In some other cases, a memory controller may be integrated into the processor 2040. The processor 2040 may be configured to execute computer-readable instructions stored in a memory (e.g., the memory 2030) to cause the device 2005 to perform various functions (e.g., functions or tasks supporting reconfigurable surface training for sidelink). For example, the device 2005 or a component of the device 2005 may include a processor 2040 and memory 2030 coupled to the processor 2040, the processor 2040 and memory 2030 configured to perform various functions described herein.

The inter-station communications manager 2045 may manage communications with other network devices 105, and may include a controller or scheduler for controlling communications with UEs 115 in cooperation with other network devices 105. For example, the inter-station communications manager 2045 may coordinate scheduling for transmissions to UEs 115 for various interference mitigation techniques such as beamforming or joint transmission. In some examples, the inter-station communications manager 2045 may provide an X2 interface within an LTE/LTE-A wireless communications network technology to provide communication between network devices 105.

The communications manager 2020 may support wireless communication at a network device in accordance with examples as disclosed herein. For example, the communications manager 2020 may be configured as or otherwise support a means for receiving, from a reconfigurable surface, an indication of a capability of the reconfigurable surface to support different beams or different configurations for the reconfigurable surface between sub-resource pools. The communications manager 2020 may be configured as or otherwise support a means for transmitting, to the reconfigurable surface, a first UE, and a second UE, an indication of a resource pool for training the reconfigurable surface for sidelink communications between a first UE and the second UE, where the resource pool includes a first sub-resource pool, a second sub-resource pool, and a resource gap, and where the resource gap is based on the indicated capability of the reconfigurable surface.

By including or configuring the communications manager 2020 in accordance with examples as described herein, the device 2005 may support techniques for improved communication reliability, more efficient utilization of communication resources, and improved coordination between devices.

In some examples, the communications manager 2020 may be configured to perform various operations (e.g., receiving, monitoring, transmitting) using or otherwise in cooperation with the transceiver 2015, the one or more antennas 2025, or any combination thereof. Although the communications manager 2020 is illustrated as a separate component, in some examples, one or more functions described with reference to the communications manager 2020 may be supported by or performed by the processor 2040, the memory 2030, the code 2035, or any combination thereof. For example, the code 2035 may include instructions executable by the processor 2040 to cause the device 2005 to perform various aspects of reconfigurable surface training for sidelink as described herein, or the processor 2040 and the memory 2030 may be otherwise configured to perform or support such operations.

Figure 21:
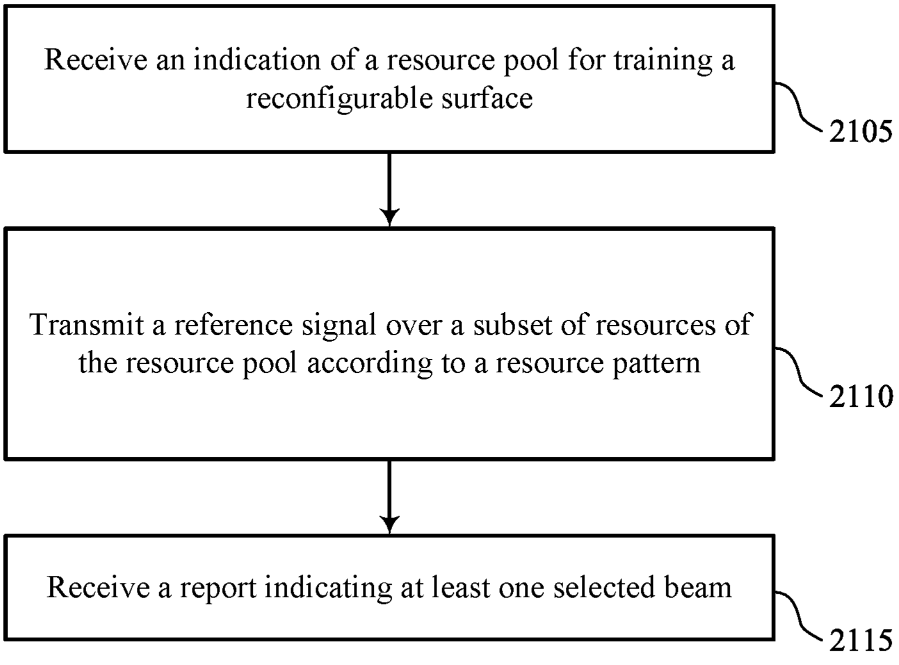
FIGS. 21 through 28 show flowcharts illustrating methods that support reconfigurable surface training for sidelink in accordance with aspects of the present disclosure.

FIG. 21 shows a flowchart illustrating a method 2100 that supports reconfigurable surface training for sidelink in accordance with aspects of the present disclosure. The operations of the method 2100 may be implemented by a UE or its components as described herein. For example, the operations of the method 2100 may be performed by a UE 115 as described with reference to FIGS. 1 through 16. In some examples, a UE may execute a set of instructions to control the functional elements of the UE to perform the described functions. Additionally, or alternatively, the UE may perform aspects of the described functions using special-purpose hardware.

At 2105, the method may include receiving an indication of a resource pool for training a reconfigurable surface for sidelink communications with a second UE. The operations of 2105 may be performed in accordance with examples as disclosed herein. For example, the UE may receive the indication of a resource pool from a network device via an RRC or MAC-CE message. In some examples, aspects of the operations of 2105 may be performed by a resource pool manager 1525 as described with reference to FIG. 15.

At 2110, the method may include transmitting a reference signal over a subset of resources of the resource pool according to a resource pattern, where the resource pattern is identified based on the resource pool and is associated with a pattern of beams for the reconfigurable surface. The operations of 2110 may be performed in accordance with examples as disclosed herein. For example, the UE may receive an indication of a resource pattern and transmit a reference signal using beamforming techniques according to the resource pattern. In some examples, aspects of the operations of 2110 may be performed by a reference signal transmission manager 1530 as described with reference to FIG. 15.

At 2115, the method may include receiving a report indicating at least one selected beam of the pattern of beams. The operations of 2115 may be performed in accordance with examples as disclosed herein. For example, the UE may receive the report via an SCI, PSSCH, a MAC-CE, or PC5-RRC message. In some examples, aspects of the operations of 2115 may be performed by a beam report manager 1535 as described with reference to FIG. 15.

Figure 22:
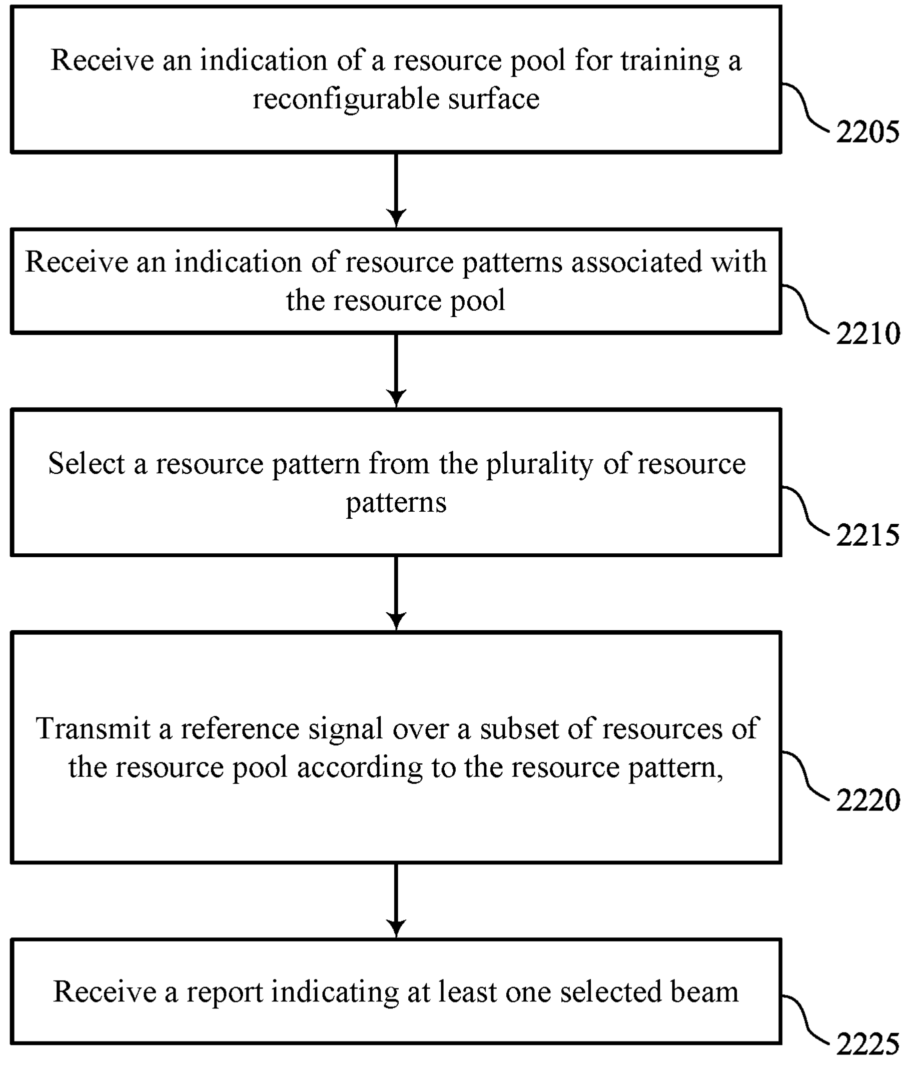

FIG. 22 shows a flowchart illustrating a method 2200 that supports reconfigurable surface training for sidelink in accordance with aspects of the present disclosure. The operations of the method 2200 may be implemented by a UE or its components as described herein. For example, the operations of the method 2200 may be performed by a UE 115 as described with reference to FIGS. 1 through 16. In some examples, a UE may execute a set of instructions to control the functional elements of the UE to perform the described functions. Additionally, or alternatively, the UE may perform aspects of the described functions using special-purpose hardware.

At 2205, the method may include receiving an indication of a resource pool for training a reconfigurable surface for sidelink communications with a second UE. The operations of 2205 may be performed in accordance with examples as disclosed herein. For example, the UE may receive the indication of a resource pool from a network device via an RRC or MAC-CE message. In some examples, aspects of the operations of 2205 may be performed by a resource pool manager 1525 as described with reference to FIG. 15.

At 2210, the method may include receiving an indication of a set of multiple resource patterns associated with the resource pool. The operations of 2210 may be performed in accordance with examples as disclosed herein. For example, the UE may receive the indication of a resource pool from a network device via an RRC or MAC-CE message. In some examples, aspects of the operations of 2210 may be performed by a resource pattern manager 1545 as described with reference to FIG. 15.

At 2215, the method may include selecting a resource pattern from the set of multiple resource patterns based on one or more attributes of the sidelink communications. The operations of 2215 may be performed in accordance with examples as disclosed herein. For example, the UE may select a resource pattern based on a configured quality of service target or a priority associated with the sidelink communications. In some examples, aspects of the operations of 2215 may be performed by a resource pattern manager 1545 as described with reference to FIG. 15.

At 2220, the method may include transmitting a reference signal over a subset of resources of the resource pool according to the resource pattern, where the resource pattern is identified based on the resource pool and is associated with a pattern of beams for the reconfigurable surface. The operations of 2220 may be performed in accordance with examples as disclosed herein. For example, the UE may receive an indication of a resource pattern and transmit a reference signal using beamforming techniques according to the resource pattern. In some examples, aspects of the operations of 2220 may be performed by a reference signal transmission manager 1530 as described with reference to FIG. 15.

At 2225, the method may include receiving a report indicating at least one selected beam of the pattern of beams. The operations of 2225 may be performed in accordance with examples as disclosed herein. For example, the UE may receive the report via an SCI, PSSCH, a MAC-CE, or PC5-RRC message. In some examples, aspects of the operations of 2225 may be performed by a beam report manager 1535 as described with reference to FIG. 15.

Figure 23:
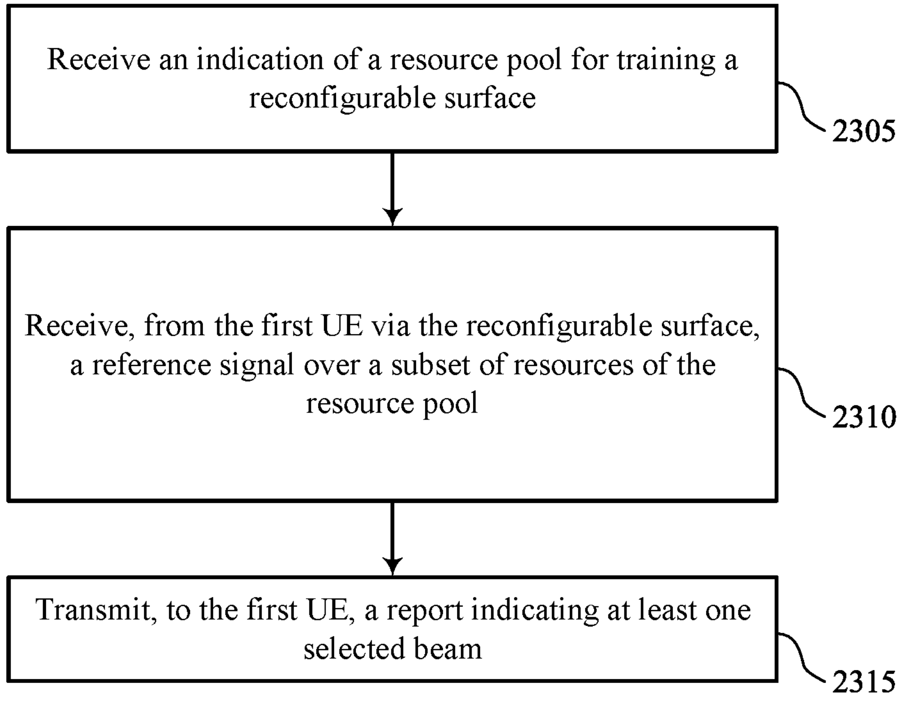

FIG. 23 shows a flowchart illustrating a method 2300 that supports reconfigurable surface training for sidelink in accordance with aspects of the present disclosure. The operations of the method 2300 may be implemented by a UE or its components as described herein. For example, the operations of the method 2300 may be performed by a UE 115 as described with reference to FIGS. 1 through 16. In some examples, a UE may execute a set of instructions to control the functional elements of the UE to perform the described functions. Additionally, or alternatively, the UE may perform aspects of the described functions using special-purpose hardware.

At 2305, the method may include receiving an indication of a resource pool for training a reconfigurable surface for sidelink communications with a first UE. The operations of 2305 may be performed in accordance with examples as disclosed herein. For example, the second UE may receive the indication of a resource pool from a network device via an RRC or MAC-CE message or from the first UE via a PC5-RRC, SCI, MAC-CE, or PSSCH message. In some examples, aspects of the operations of 2305 may be performed by a resource pool manager 1525 as described with reference to FIG. 15.

At 2310, the method may include receiving, from the first UE via the reconfigurable surface, a reference signal over a subset of resources of the resource pool according to a pattern of beams for the reconfigurable surface, where the pattern of beams is based on a resource pattern associated with the resource pool. The operations of 2310 may be performed in accordance with examples as disclosed herein. For example, the second UE may determine a set of symbols and frequencies to monitor based on the resource pattern, and demodulate reference signals received during the identified symbols and frequencies. In some examples, aspects of the operations of 2310 may be performed by a reference signal reception manager 1540 as described with reference to FIG. 15.

At 2315, the method may include transmitting, to the first UE, a report indicating at least one selected beam of the pattern of beams. The operations of 2315 may be performed in accordance with examples as disclosed herein. For example, the second UE may transmit the report via a SCI, PSSCH, a MAC-CE, or PC5-RRC message. In some examples, aspects of the operations of 2315 may be performed by a beam report manager 1535 as described with reference to FIG. 15.

Figure 24:
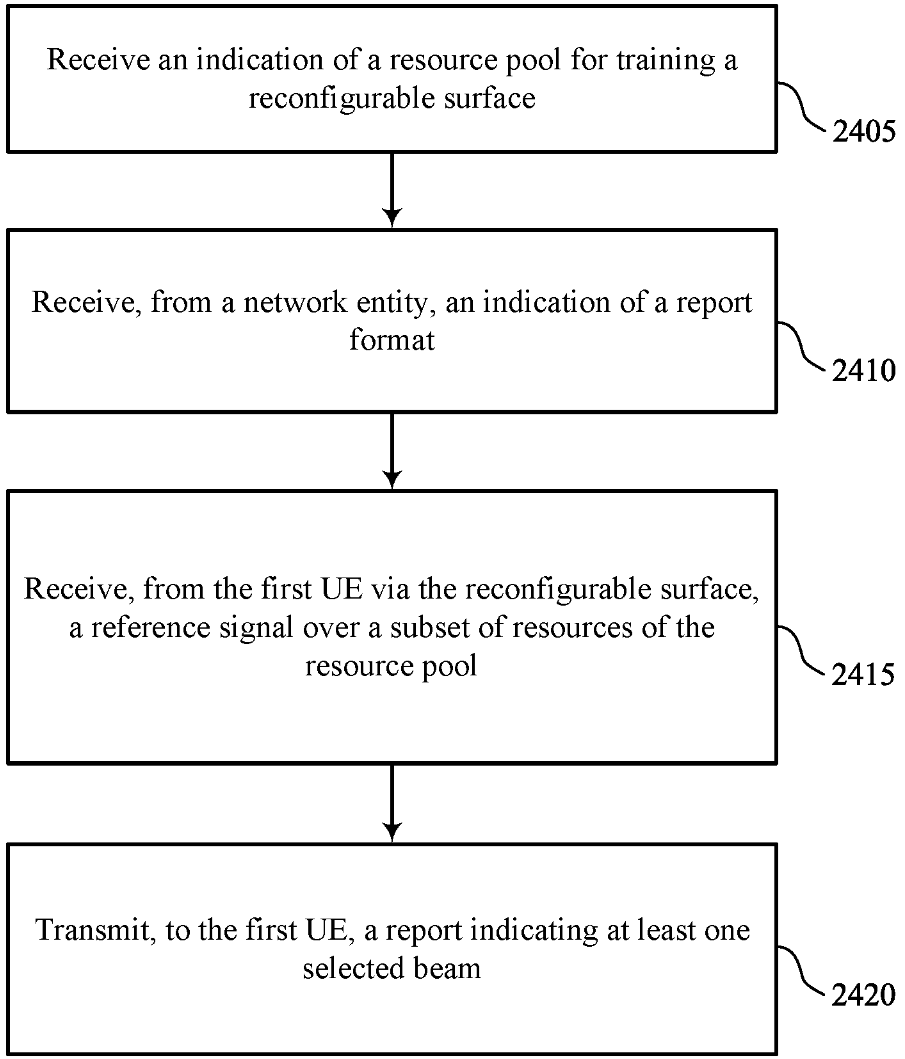

FIG. 24 shows a flowchart illustrating a method 2400 that supports reconfigurable surface training for sidelink in accordance with aspects of the present disclosure. The operations of the method 2400 may be implemented by a UE or its components as described herein. For example, the operations of the method 2400 may be performed by a UE 115 as described with reference to FIGS. 1 through 16. In some examples, a UE may execute a set of instructions to control the functional elements of the UE to perform the described functions. Additionally, or alternatively, the UE may perform aspects of the described functions using special-purpose hardware.

At 2405, the method may include receiving an indication of a resource pool for training a reconfigurable surface for sidelink communications with a first UE. The operations of 2405 may be performed in accordance with examples as disclosed herein. For example, the second UE may receive the indication of a resource pool from a network device via an RRC or MAC-CE message or from the first UE via a PC5-RRC, SCI, MAC-CE, or PSSCH message. In some examples, aspects of the operations of 2405 may be performed by a resource pool manager 1525 as described with reference to FIG. 15.

At 2410, the method may include receiving, from a network entity, an indication of a report format. The operations of 2410 may be performed in accordance with examples as disclosed herein. For example, the second UE may receive the indication of the report format from a network device via an RRC or MAC-CE message. In some examples, aspects of the operations of 2410 may be performed by a report format manager 1550 as described with reference to FIG. 15.

At 2415, the method may include receiving, from the first UE via the reconfigurable surface, a reference signal over a subset of resources of the resource pool according to a pattern of beams for the reconfigurable surface, where the pattern of beams is based on a resource pattern associated with the resource pool. The operations of 2415 may be performed in accordance with examples as disclosed herein. For example, the second UE may determine a set of symbols and frequencies to monitor based on the resource pattern, and demodulate reference signals received during the identified symbols and frequencies. In some examples, aspects of the operations of 2415 may be performed by a reference signal reception manager 1540 as described with reference to FIG. 15.

At 2420, the method may include transmitting, to the first UE, a report indicating at least one selected beam of the pattern of beams, where transmitting the report indicating the at least one selected beam of the pattern of beams is based on the report format. The operations of 2420 may be performed in accordance with examples as disclosed herein. For example, the second UE may transmit the report via a SCI, PSSCH, a MAC-CE, or PC5-RRC message. In some examples, aspects of the operations of 2420 may be performed by a beam report manager 1535 as described with reference to FIG. 15.

Figure 25:
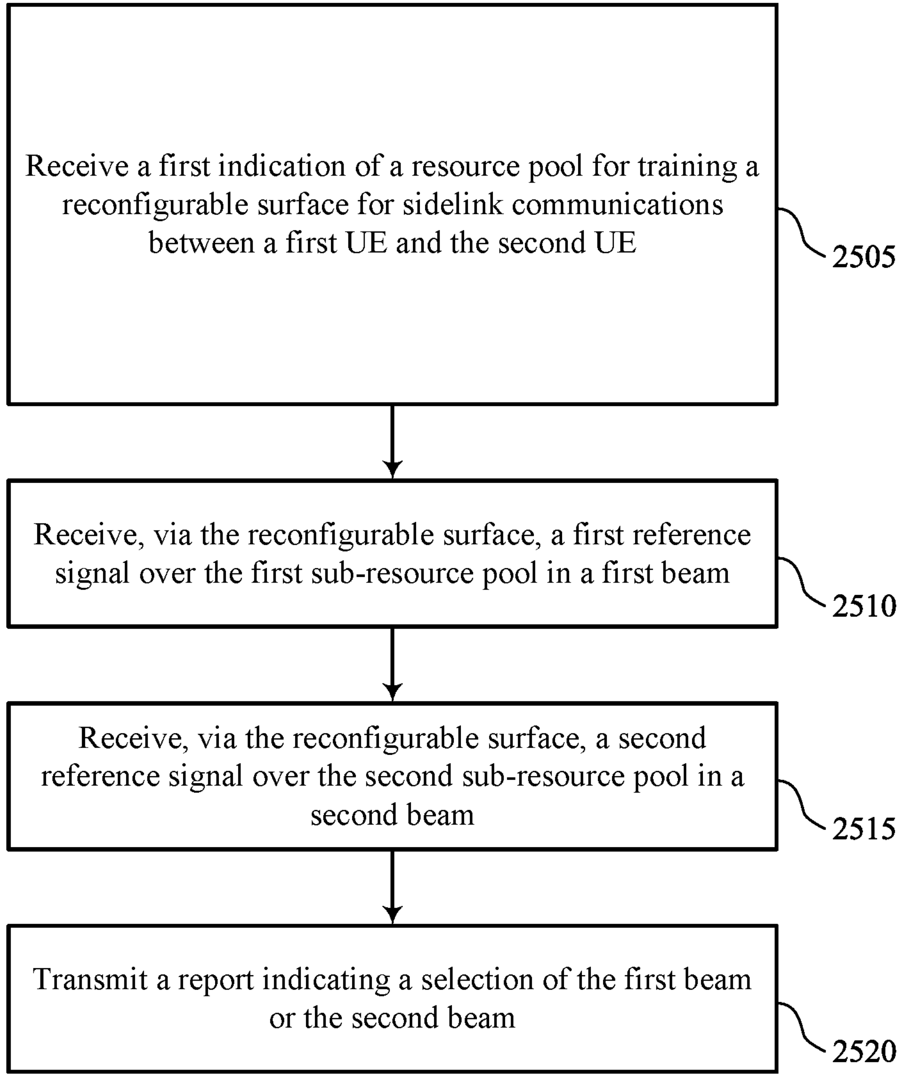

FIG. 25 shows a flowchart illustrating a method 2500 that supports reconfigurable surface training for sidelink in accordance with aspects of the present disclosure. The operations of the method 2500 may be implemented by a UE or its components as described herein. For example, the operations of the method 2500 may be performed by a UE 115 as described with reference to FIGS. 1 through 16. In some examples, a UE may execute a set of instructions to control the functional elements of the UE to perform the described functions. Additionally, or alternatively, the UE may perform aspects of the described functions using special-purpose hardware.

At 2505, the method may include receiving a first indication of a resource pool for training a reconfigurable surface for sidelink communications between a first UE and the second UE, where the resource pool includes a first sub-resource pool, a second sub-resource pool, and a resource gap, and where the resource gap is based on an indicated capability of the reconfigurable surface to support different beams or different configurations for the reconfigurable surface between sub-resource pools. The operations of 2505 may be performed in accordance with examples as disclosed herein. For example, the UE may receive the indication of a resource pool from a network device via an RRC or MAC-CE message. In some examples, aspects of the operations of 2505 may be performed by a resource pool manager 1525 as described with reference to FIG. 15.

At 2510, the method may include receiving, from the first UE via the reconfigurable surface, a first reference signal over the first sub-resource pool in a first beam. The operations of 2510 may be performed in accordance with examples as disclosed herein. For example, the 1. In some examples, aspects of the operations of 2510 may be performed by a reference signal reception manager 1540 as described with reference to FIG. 15.

At 2515, the method may include receiving, from the first UE via the reconfigurable surface, a second reference signal over the second sub-resource pool in a second beam. The operations of 2515 may be performed in accordance with examples as disclosed herein. For example, the UE may determine a set of symbols and frequencies of the second sub-resource pool to monitor, and demodulate reference signals received during the identified symbols and frequencies. In some examples, aspects of the operations of 2515 may be performed by a reference signal reception manager 1540 as described with reference to FIG. 15.

At 2520, the method may include transmitting, to the first UE, a report indicating a selection of the first beam or the second beam for communicating with the first UE via the reconfigurable surface. The operations of 2520 may be performed in accordance with examples as disclosed herein. For example, the UE may transmit the report via a SCI, PSSCH, a MAC-CE, or PC5-RRC message. In some examples, aspects of the operations of 2520 may be performed by a beam report manager 1535 as described with reference to FIG. 15.

Figure 26:
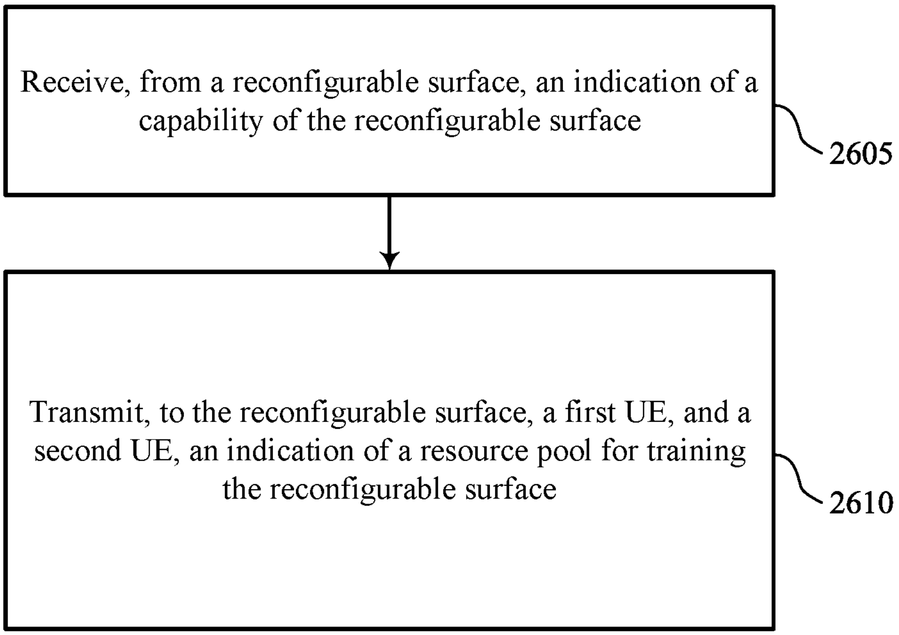

FIG. 26 shows a flowchart illustrating a method 2600 that supports reconfigurable surface training for sidelink in accordance with aspects of the present disclosure. The operations of the method 2600 may be implemented by a network device or its components as described herein. For example, the operations of the method 2600 may be performed by a network device 105 as described with reference to FIGS. 1 through 12 and 17 through 20. In some examples, a network device may execute a set of instructions to control the functional elements of the network device to perform the described functions. Additionally, or alternatively, the network device may perform aspects of the described functions using special-purpose hardware.

At 2605, the method may include receiving, from a reconfigurable surface, an indication of a capability of the reconfigurable surface to support different beams or different configurations for the reconfigurable surface between sub-resource pools. The operations of 2605 may be performed in accordance with examples as disclosed herein. For example, the network device may receive the indication via a communication link between the network device and the RIS (e.g., a backhaul link). In some examples, aspects of the operations of 2605 may be performed by a RIS capability manager 1925 as described with reference to FIG. 19.

At 2610, the method may include transmitting, to the reconfigurable surface, a first UE, and a second UE, an indication of a resource pool for training the reconfigurable surface for sidelink communications between a first UE and the second UE, where the resource pool includes a first sub-resource pool, a second sub-resource pool, and a resource gap, and where the resource gap is based on the indicated capability of the reconfigurable surface. The operations of 2610 may be performed in accordance with examples as disclosed herein. For example, the network device may transmit the indication via a MAC-CE or an RRC message. In some examples, aspects of the operations of 2610 may be performed by a resource pool manager 1930 as described with reference to FIG. 19.

Figure 27:
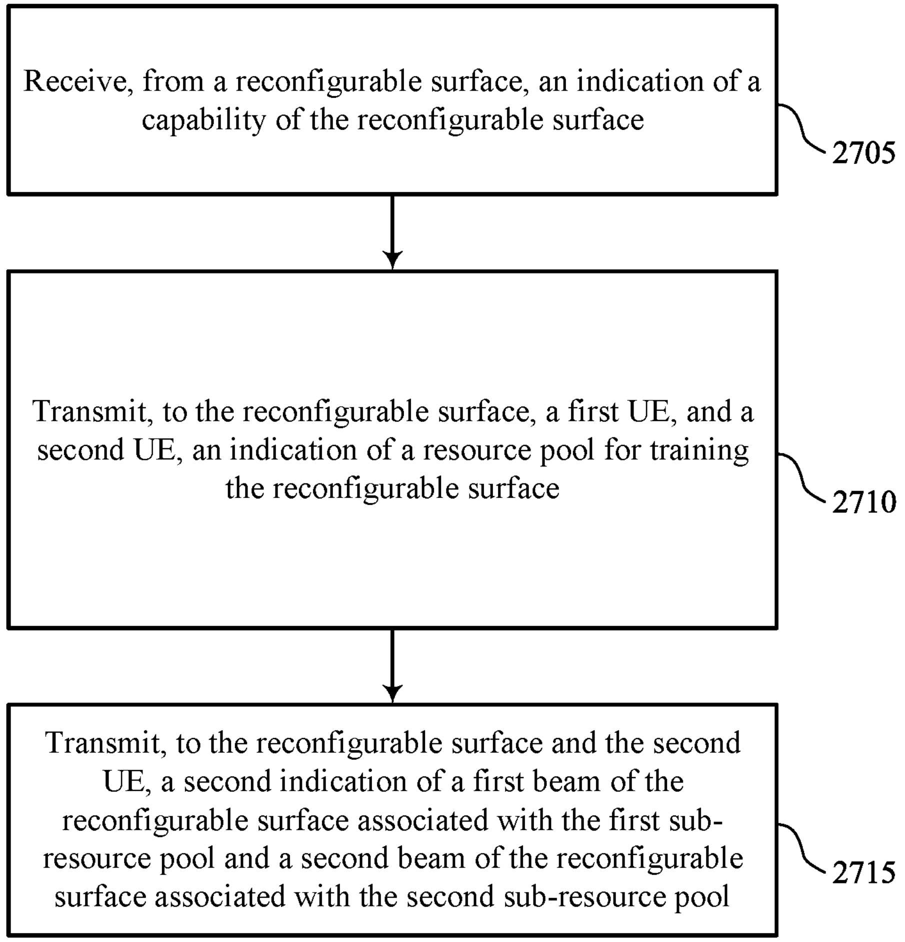

FIG. 27 shows a flowchart illustrating a method 2700 that supports reconfigurable surface training for sidelink in accordance with aspects of the present disclosure. The operations of the method 2700 may be implemented by a network device or its components as described herein. For example, the operations of the method 2700 may be performed by a network device 105 as described with reference to FIGS. 1 through 12 and 17 through 20. In some examples, a network device may execute a set of instructions to control the functional elements of the network device to perform the described functions. Additionally, or alternatively, the network device may perform aspects of the described functions using special-purpose hardware.

At 2705, the method may include receiving, from a reconfigurable surface, an indication of a capability of the reconfigurable surface to support different beams or different configurations for the reconfigurable surface between sub-resource pools. The operations of 2705 may be performed in accordance with examples as disclosed herein. For example, the network device may receive the indication via a communication link between the network device and the RIS (e.g., a backhaul link). In some examples, aspects of the operations of 2705 may be performed by a RIS capability manager 1925 as described with reference to FIG. 19.

At 2710, the method may include transmitting, to the reconfigurable surface, a first UE, and a second UE, an indication of a resource pool for training the reconfigurable surface for sidelink communications between a first UE and the second UE, where the resource pool includes a first sub-resource pool, a second sub-resource pool, and a resource gap, and where the resource gap is based on the indicated capability of the reconfigurable surface. The operations of 2710 may be performed in accordance with examples as disclosed herein. For example, the network device may transmit the indication via a MAC-CE or an RRC message. In some examples, aspects of the operations of 2710 may be performed by a resource pool manager 1930 as described with reference to FIG. 19.

At 2715, the method may include transmitting, to the reconfigurable surface and the second UE, a second indication of a first beam of the reconfigurable surface associated with the first sub-resource pool and a second beam of the reconfigurable surface associated with the second sub-resource pool. The operations of 2715 may be performed in accordance with examples as disclosed herein. For example, the network device may transmit the indication via a MAC-CE or an RRC message. In some examples, aspects of the operations of 2715 may be performed by a RIS beam manager 1935 as described with reference to FIG. 19.

Figure 28:
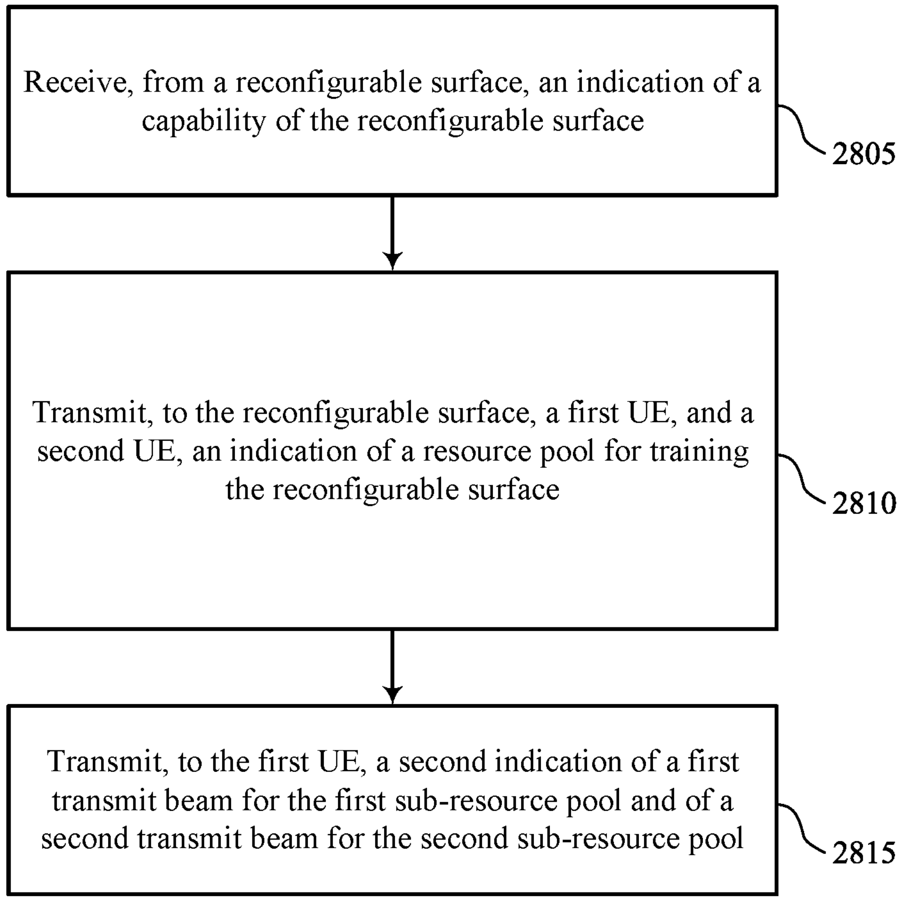

FIG. 28 shows a flowchart illustrating a method 2800 that supports reconfigurable surface training for sidelink in accordance with aspects of the present disclosure. The operations of the method 2800 may be implemented by a network device or its components as described herein. For example, the operations of the method 2800 may be performed by a network device 105 as described with reference to FIGS. 1 through 12 and 17 through 20. In some examples, a network device may execute a set of instructions to control the functional elements of the network device to perform the described functions. Additionally, or alternatively, the network device may perform aspects of the described functions using special-purpose hardware.

At 2805, the method may include receiving, from a reconfigurable surface, an indication of a capability of the reconfigurable surface to support different beams or different configurations for the reconfigurable surface between sub-resource pools. The operations of 2805 may be performed in accordance with examples as disclosed herein. For example, the network device may receive the indication via a communication link between the network device and the RIS (e.g., a backhaul link). In some examples, aspects of the operations of 2805 may be performed by a RIS capability manager 1925 as described with reference to FIG. 19.

At 2810, the method may include transmitting, to the reconfigurable surface, a first UE, and a second UE, an indication of a resource pool for training the reconfigurable surface for sidelink communications between a first UE and the second UE, where the resource pool includes a first sub-resource pool, a second sub-resource pool, and a resource gap, and where the resource gap is based on the indicated capability of the reconfigurable surface. The operations of 2810 may be performed in accordance with examples as disclosed herein. For example, the network device may transmit the indication via a MAC-CE or an RRC message. In some examples, aspects of the operations of 2810 may be performed by a resource pool manager 1930 as described with reference to FIG. 19.

At 2815, the method may include transmitting, to the first UE, a second indication of a first transmit beam for the first sub-resource pool and of a second transmit beam for the second sub-resource pool. The operations of 2815 may be performed in accordance with examples as disclosed herein. For example, the network device may transmit the indication via a MAC-CE or an RRC message. In some examples, aspects of the operations of 2815 may be performed by a transmit beam manager 1940 as described with reference to FIG. 19.

The following provides an overview of aspects of the present disclosure:

Aspect 1: A method for wireless communication at a first UE, comprising: receiving an indication of a resource pool for training a reconfigurable surface for sidelink communications with a second UE: transmitting a reference signal over a subset of resources of the resource pool according to a resource pattern, wherein the resource pattern is identified based at least in part on the resource pool and is associated with a pattern of beams for the reconfigurable surface; and receiving a report indicating at least one selected beam of the pattern of beams.

Aspect 2: The method of aspect 1, further comprising: receiving an indication of the resource pattern, wherein the resource pattern comprises a set of symbols across one or more slots of the resource pool and resource gaps between one or more symbols of the set of symbols.

Aspect 3: The method of aspect 2, wherein the resource pattern is based at least in part on an indicated capability of the reconfigurable surface to switch between different beams or different configurations for the reconfigurable surface.

Aspect 4: The method of any of aspects 1 through 3, further comprising: receiving an indication of a plurality of resource patterns associated with the resource pool; and selecting the resource pattern from the plurality of resource patterns based at least in part on one or more attributes of the sidelink communications.

Aspect 5: The method of aspect 4, further comprising: transmitting an indication of the resource pattern to the second UE via one of a radio resource control message, a medium access control control element message, a sidelink control information message, or a physical sidelink shared channel message.

Aspect 6: The method of any of aspects 1 through 5, further comprising: receiving, from a network entity, an indication of a report format, wherein receiving the report indicating the at least one selected beam of the pattern of beams is based at least in part on the report format.

Aspect 7: The method of aspect 6, wherein receiving the indication of the report format comprises: receiving the indication of the report format via one of a radio resource control message or a medium access control control element message.

Aspect 8: The method of any of aspects 6 through 7, wherein the report format comprises a first set of best beams, a second set of worst beams, one or more metrics associated with beams of the pattern of beams, or a combination thereof.

Aspect 9: The method of aspect 8, wherein the one or more metrics associated with the beams of the pattern of beams comprise a reference signal received power measurement, a reference signal received quality measurement, or a signal to interference and noise ratio.

Aspect 10: The method of aspect 9, wherein the report format indicates a selected metric of the one or more metrics based at least in part on a determined priority or a determined quality of service target associated with the sidelink communications.

Aspect 11: The method of any of aspects 1 through 10, further comprising: receiving, from a network entity, an indication of a set of report formats associated with a set of priorities and quality of service targets; and transmitting, to the second UE, an indication of a selected report format of the set of report formats associated with the set of priorities and quality of service targets, wherein receiving the report indicating the at least one selected beam of the pattern of beams is based at least in part on the selected report format.

Aspect 12: The method of any of aspects 1 through 11, further comprising: receiving, from a network entity, an indication of a set of report formats associated with a set of priorities; and transmitting, to the second UE, an indication of a priority of the set of priorities for the reference signal, wherein receiving the report indicating the at least one selected beam of the pattern of beams comprises receiving the report based at least in part on a report format of the set of report formats associated with the indicated priority.

Aspect 13: The method of any of aspects 1 through 12, further comprising: receiving, from a network entity, an indication of a set of frequency watermarks associated with the resource pool for the reconfigurable surface: wherein transmitting the reference signal over the subset of resources of the resource pool is based at least in part on a selected frequency watermark associated with the resource pool of the set of frequency watermarks.

Aspect 14: The method of any of aspects 1 through 13, wherein transmitting the reference signal over the subset of resources of the resource pool comprises: transmitting the reference signal over a plurality of transmit beams associated with the subset of resources.

Aspect 15: The method of aspect 14, wherein the report further indicates at least one selected transmit beam of the plurality of transmit beams.

Aspect 16: The method of any of aspects 1 through 15, further comprising: communicating with the second UE via the reconfigurable surface based at least in part on the at least one selected beam.

Aspect 17: A method for wireless communication at a second UE, comprising: receiving an indication of a resource pool for training a reconfigurable surface for sidelink communications with a first UE; receiving, from the first UE via the reconfigurable surface, a reference signal over a subset of resources of the resource pool according to a pattern of beams for the reconfigurable surface, wherein the pattern of beams is based at least in part on a resource pattern associated with the resource pool; and transmitting, to the first UE, a report indicating at least one selected beam of the pattern of beams.

Aspect 18: The method of aspect 17, further comprising: receiving an indication of the resource pattern, wherein the resource pattern comprises a set of symbols across one or more slots of the resource pool and resource gaps between one or more symbols of the set of symbols.

Aspect 19: The method of aspect 18, wherein receiving the reference signal comprises: monitoring for the reference signal during the set of symbols.

Aspect 20: The method of any of aspects 18 through 19, wherein the resource pattern is based at least in part on an indicated capability of the reconfigurable surface to switch between different beams or different configurations for the reconfigurable surface.

Aspect 21: The method of any of aspects 17 through 20, further comprising: receiving, from the first UE, an indication of the resource pattern via one of a radio resource control message, a medium access control control element message, a sidelink control information message, or a physical sidelink shared channel message.

Aspect 22: The method of any of aspects 17 through 21, further comprising: receiving, from a network entity, an indication of a report format, wherein transmitting the report indicating the at least one selected beam of the pattern of beams is based at least in part on the report format.

Aspect 23: The method of aspect 22, wherein receiving the indication of the report format comprises: receiving the indication of the report format via one of a radio resource control message or a medium access control control element message.

Aspect 24: The method of any of aspects 22 through 23, wherein the report format comprises a first set of best beams, a second set of worst beams, one or more metrics associated with beams of the pattern of beams, or a combination thereof.

Aspect 25: The method of aspect 24, wherein the one or more metrics associated with the beams of the pattern of beams comprise a reference signal received power measurement, a reference signal received quality measurement, or a signal to interference and noise ratio.

Aspect 26: The method of aspect 25, wherein the report format indicates a selected metric of the one or more metrics based at least in part on a determined priority or a determined quality of service target associated with the sidelink communications.

Aspect 27: The method of any of aspects 17 through 26, further comprising: receiving, from a network entity, an indication of a set of report formats associated with a set of priorities and quality of service targets; and receiving, from the first UE, an indication of a selected report format of the set of report formats associated with the set of priorities and quality of service targets, wherein transmitting the report indicating the at least one selected beam of the pattern of beams is based at least in part on the selected report format.

Aspect 28: The method of any of aspects 17 through 27, further comprising: receiving, from a network entity, an indication of a set of report formats associated with a set of priorities; and receiving, from the first UE, an indication of a priority of the set of priorities associated with the reference signal, wherein transmitting the report indicating the at least one selected beam of the pattern of beams comprises transmitting the report based at least in part on a report format of the set of report formats associated with the indicated priority.

Aspect 29: The method of any of aspects 17 through 28, further comprising: receiving, from a network entity, an indication of a set of frequency watermarks associated with the resource pool for the reconfigurable surface: wherein receiving the reference signal over the subset of resources of the resource pool is based at least in part on a selected frequency watermark associated with the resource pool of the set of frequency watermarks.

Aspect 30: The method of any of aspects 17 through 29, further comprising: communicating with the first UE via the reconfigurable surface based at least in part on the at least one selected beam.

Aspect 31: A method for wireless communication at a second UE, comprising: receiving a first indication of a resource pool for training a reconfigurable surface for sidelink communications between a first UE and the second UE, wherein the resource pool comprises a first sub-resource pool, a second sub-resource pool, and a resource gap, and wherein the resource gap is based at least in part on an indicated capability of the reconfigurable surface to support different beams or different configurations for the reconfigurable surface between sub-resource pools: receiving, from the first UE via the reconfigurable surface, a first reference signal over the first sub-resource pool in a first beam: receiving, from the first UE via the reconfigurable surface, a second reference signal over the second sub-resource pool in a second beam; and transmitting, to the first UE, a report indicating a selection of the first beam or the second beam for communicating with the first UE via the reconfigurable surface.

Aspect 32: The method of aspect 31, wherein receiving the first reference signal comprises receiving the first reference signal based on a first configuration of the reconfigurable surface for the first sub-resource pool, and receiving the second reference signal comprises receiving the second reference signal based on a second configuration of the reconfigurable surface for the second sub-resource pool.

Aspect 33: The method of any of aspects 31 through 32, wherein the resource pool comprises a third sub-resource pool and a second resource gap, and further comprising: receiving, from the reconfigurable surface, a third reference signal over the third sub-resource pool via a third beam.

Aspect 34: The method of any of aspects 31 through 33, wherein the indicated capability is based at least in part on an ability of the reconfigurable surface to adjust surface elements of the reconfigurable surface over a frequency range.

Aspect 35: The method of any of aspects 31 through 34, wherein the first sub-resource pool comprises a first set of symbols within a first frequency range and the second sub-resource pool comprises a second set of symbols within a second frequency range, and the resource gap comprises a duration of time between the first set of symbols and the second set of symbols or a third frequency range between the first frequency range and the second frequency range.

Aspect 36: The method of any of aspects 31 through 35, wherein the first beam is associated with a first transmit beam transmitted by the first UE and a first configuration of the reconfigurable surface, and the second beam is associated with a second transmit beam transmitted by the first UE and the first configuration of the reconfigurable surface.

Aspect 37: The method of aspect 36, further comprising: transmitting, to the first UE with the report, an indication of a second selection of the first transmit beam or the second transmit beam for communicating with the first UE via the reconfigurable surface.

Aspect 38: A method for wireless communication at a network entity, comprising: receiving an indication of a capability of a reconfigurable surface to support different beams or different configurations for the reconfigurable surface between sub-resource pools; and transmitting an indication of a resource pool for training the reconfigurable surface for sidelink communications between a first UE and a second UE, wherein the resource pool comprises a first sub-resource pool, a second sub-resource pool, and a resource gap, and wherein the resource gap is based at least in part on the indicated capability of the reconfigurable surface.

Aspect 39: The method of aspect 38, wherein the first sub-resource pool comprises a first set of symbols within a first frequency range and the second sub-resource pool comprises a second set of symbols within a second frequency range, and the resource gap comprises a duration of time between the first set of symbols and the second set of symbols or a third frequency range between the first frequency range and the second frequency range.

Aspect 40: The method of any of aspects 38 through 39, wherein the capability is based at least in part on an ability of the reconfigurable surface to adjust surface elements of the reconfigurable surface over a frequency range.

Aspect 41: The method of any of aspects 38 through 40, further comprising: transmitting a second indication of a first beam of the reconfigurable surface associated with the first sub-resource pool and a second beam of the reconfigurable surface associated with the second sub-resource pool.

Aspect 42: The method of any of aspects 38 through 41, further comprising: transmitting a second indication of a first transmit beam for the first sub-resource pool and of a second transmit beam for the second sub-resource pool.

Aspect 43: The method of any of aspects 38 through 42, wherein the resource pool comprises a third sub-resource pool and a second resource gap.

Aspect 44: An apparatus for wireless communication at a first UE, comprising a processor: memory coupled with the processor; and instructions stored in the memory and executable by the processor to cause the apparatus to perform a method of any of aspects 1 through 16.

Aspect 45: An apparatus for wireless communication at a first UE, comprising at least one means for performing a method of any of aspects 1 through 16.

Aspect 46: A non-transitory computer-readable medium storing code for wireless communication at a first UE, the code comprising instructions executable by a processor to perform a method of any of aspects 1 through 16.

Aspect 47: An apparatus for wireless communication at a second UE, comprising a processor: memory coupled with the processor; and instructions stored in the memory and executable by the processor to cause the apparatus to perform a method of any of aspects 17 through 30.

Aspect 48: An apparatus for wireless communication at a second UE, comprising at least one means for performing a method of any of aspects 17 through 30.

Aspect 49: A non-transitory computer-readable medium storing code for wireless communication at a second UE, the code comprising instructions executable by a processor to perform a method of any of aspects 17 through 30.

Aspect 50: An apparatus for wireless communication at a second UE, comprising a processor: memory coupled with the processor; and instructions stored in the memory and executable by the processor to cause the apparatus to perform a method of any of aspects 31 through 37.

Aspect 51: An apparatus for wireless communication at a second UE, comprising at least one means for performing a method of any of aspects 31 through 37.

Aspect 52: A non-transitory computer-readable medium storing code for wireless communication at a second UE, the code comprising instructions executable by a processor to perform a method of any of aspects 31 through 37.

Aspect 53: An apparatus for wireless communication at a network entity, comprising a processor: memory coupled with the processor; and instructions stored in the memory and executable by the processor to cause the apparatus to perform a method of any of aspects 38 through 43.

Aspect 54: An apparatus for wireless communication at a network entity, comprising at least one means for performing a method of any of aspects 38 through 43.

Aspect 55: A non-transitory computer-readable medium storing code for wireless communication at a network entity, the code comprising instructions executable by a processor to perform a method of any of aspects 38 through 43.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first user equipment (UE), comprising:

a processor;

memory coupled with the processor; and instructions stored in the memory and executable by the processor to cause the apparatus to:

receive an indication of a resource pool for training a reconfigurable surface for sidelink communications with a second UE;

transmit a reference signal over a subset of resources of the resource pool according to a resource pattern, wherein the resource pattern is identified based at least in part on the resource pool and is associated with a pattern of beams for the reconfigurable surface; and receive a report indicating at least one selected beam of the pattern of beams.

2. The apparatus of claim 1, wherein the instructions are further executable by the processor to cause the apparatus to:

receive an indication of the resource pattern, wherein the resource pattern comprises a set of symbols across one or more slots of the resource pool and resource gaps between one or more symbols of the set of symbols.

3. The apparatus of claim 2, wherein the resource pattern is based at least in part on an indicated capability of the reconfigurable surface to switch between different beams or different configurations for the reconfigurable surface.

4. The apparatus of claim 1, wherein the instructions are further executable by the processor to cause the apparatus to:

receive an indication of a plurality of resource patterns associated with the resource pool; and select the resource pattern from the plurality of resource patterns based at least in part on one or more attributes of the sidelink communications.

5. The apparatus of claim 1, wherein the instructions are further executable by the processor to cause the apparatus to:

receive, from a network entity, an indication of a report format, wherein receiving the report indicating the at least one selected beam of the pattern of beams is based at least in part on the report format.

6. The apparatus of claim 5, wherein the report format comprises a first set of best beams, a second set of worst beams, one or more metrics associated with beams of the pattern of beams, or a combination thereof.

7. The apparatus of claim 6, wherein the one or more metrics associated with the beams of the pattern of beams comprise a reference signal received power measurement, a reference signal received quality measurement, or a signal to interference and noise ratio.

8. The apparatus of claim 7, wherein the report format indicates a selected metric of the one or more metrics based at least in part on a determined priority or a determined quality of service target associated with the sidelink communications.

9. The apparatus of claim 1, wherein the instructions are further executable by the processor to cause the apparatus to:

receive, from a network entity, an indication of a set of report formats associated with a set of priorities and quality of service targets; and transmit, to the second UE, an indication of a selected report format of the set of report formats associated with the set of priorities and quality of service targets, wherein receiving the report indicating the at least one selected beam of the pattern of beams is based at least in part on the selected report format.

10. The apparatus of claim 1, wherein the instructions are further executable by the processor to cause the apparatus to:

receive, from a network entity, an indication of a set of report formats associated with a set of priorities; and transmit, to the second UE, an indication of a priority of the set of priorities for the reference signal, wherein receiving the report indicating the at least one selected beam of the pattern of beams comprises receiving the report based at least in part on a report format of the set of report formats associated with the indicated priority.

11. The apparatus of claim 1, wherein the instructions to transmit the reference signal over the subset of resources of the resource pool are executable by the processor to cause the apparatus to:

transmit the reference signal over a plurality of transmit beams associated with the subset of resources.

12. The apparatus of claim 11, wherein the report further indicates at least one selected transmit beam of the plurality of transmit beams.

13. An apparatus for wireless communication at a second user equipment (UE), comprising:

a processor;

memory coupled with the processor; and instructions stored in the memory and executable by the processor to cause the apparatus to:

receive an indication of a resource pool for training a reconfigurable surface for sidelink communications with a first UE;

receive, from the first UE via the reconfigurable surface, a reference signal over a subset of resources of the resource pool according to a pattern of beams for the reconfigurable surface, wherein the pattern of beams is based at least in part on a resource pattern associated with the resource pool; and transmit, to the first UE, a report indicating at least one selected beam of the pattern of beams.

14. The apparatus of claim 13, wherein the instructions are further executable by the processor to cause the apparatus to:

receive an indication of the resource pattern, wherein the resource pattern comprises a set of symbols across one or more slots of the resource pool and resource gaps between one or more symbols of the set of symbols.

15. The apparatus of claim 13, wherein the instructions are further executable by the processor to cause the apparatus to:

receive, from a network entity, an indication of a report format, wherein transmitting the report indicating the at least one selected beam of the pattern of beams is based at least in part on the report format.

16. The apparatus of claim 15, wherein the report format comprises a first set of best beams, a second set of worst beams, one or more metrics associated with beams of the pattern of beams, or a combination thereof.

17. The apparatus of claim 16, wherein the one or more metrics associated with the beams of the pattern of beams comprise a reference signal received power measurement, a reference signal received quality measurement, or a signal to interference and noise ratio.

18. The apparatus of claim 17, wherein the report format indicates a selected metric of the one or more metrics based at least in part on a determined priority or a determined quality of service target associated with the sidelink communications.

19. The apparatus of claim 13, wherein the instructions are further executable by the processor to cause the apparatus to:

receive, from a network entity, an indication of a set of report formats associated with a set of priorities and quality of service targets; and receive, from the first UE, an indication of a selected report format of the set of report formats associated with the set of priorities and quality of service targets, wherein transmitting the report indicating the at least one selected beam of the pattern of beams is based at least in part on the selected report format.

20. The apparatus of claim 13, wherein the instructions are further executable by the processor to cause the apparatus to:

receive, from a network entity, an indication of a set of report formats associated with a set of priorities; and receive, from the first UE, an indication of a priority of the set of priorities associated with the reference signal, wherein transmitting the report indicating the at least one selected beam of the pattern of beams comprises transmitting the report based at least in part on a report format of the set of report formats associated with the indicated priority.

21. An apparatus for wireless communication at a second user equipment (UE), comprising:

a processor;

memory coupled with the processor; and instructions stored in the memory and executable by the processor to cause the apparatus to:

receive a first indication of a resource pool for training a reconfigurable surface for sidelink communications between a first UE and the second UE, wherein the resource pool comprises a first sub-resource pool, a second sub-resource pool, and a resource gap, and wherein the resource gap is based at least in part on an indicated capability of the reconfigurable surface to support different beams or different configurations for the reconfigurable surface between sub-resource pools;

receive, from the first UE via the reconfigurable surface, a first reference signal over the first sub-resource pool in a first beam;

receive, from the first UE via the reconfigurable surface, a second reference signal over the second sub-resource pool in a second beam; and transmit, to the first UE, a report indicating a selection of the first beam or the second beam for communicating with the first UE via the reconfigurable surface.

22. The apparatus of claim 21, wherein:

receiving the first reference signal comprises receiving the first reference signal based on a first configuration of the reconfigurable surface for the first sub-resource pool, and receiving the second reference signal comprises receiving the second reference signal based on a second configuration of the reconfigurable surface for the second sub-resource pool.

23. The apparatus of claim 21, wherein the resource pool comprises a third sub-resource pool and a second resource gap, wherein the instructions to are executable by the processor to cause the apparatus to:

receive, from the reconfigurable surface, a third reference signal over the third sub-resource pool via a third beam.

24. The apparatus of claim 21, wherein:

the first sub-resource pool comprises a first set of symbols within a first frequency range and the second sub-resource pool comprises a second set of symbols within a second frequency range, and the resource gap comprises a duration of time between the first set of symbols and the second set of symbols or a third frequency range between the first frequency range and the second frequency range.

25. The apparatus of claim 21, wherein:

the first beam is associated with a first transmit beam transmitted by the first UE and a first configuration of the reconfigurable surface, and the second beam is associated with a second transmit beam transmitted by the first UE and the first configuration of the reconfigurable surface.

26. The apparatus of claim 25, wherein the instructions are further executable by the processor to cause the apparatus to:

transmit, to the first UE with the report, an indication of a second selection of the first transmit beam or the second transmit beam for communicating with the first UE via the reconfigurable surface.

27. An apparatus for wireless communication at a network entity, comprising:

a processor;

memory coupled with the processor; and instructions stored in the memory and executable by the processor to cause the apparatus to:

receive an indication of a capability of a reconfigurable surface to support different beams or different configurations for the reconfigurable surface between sub-resource pools; and transmit an indication of a resource pool for training the reconfigurable surface for sidelink communications between a first user equipment (UE) and a second UE, wherein the resource pool comprises a first sub-resource pool, a second sub-resource pool, and a resource gap, and wherein the resource gap is based at least in part on the indicated capability of the reconfigurable surface.

28. The apparatus of claim 27, wherein:

the first sub-resource pool comprises a first set of symbols within a first frequency range and the second sub-resource pool comprises a second set of symbols within a second frequency range, and the resource gap comprises a duration of time between the first set of symbols and the second set of symbols or a third frequency range between the first frequency range and the second frequency range.

29. The apparatus of claim 27, wherein the instructions are further executable by the processor to cause the apparatus to:

transmit a second indication of a first beam of the reconfigurable surface associated with the first sub-resource pool and a second beam of the reconfigurable surface associated with the second sub-resource pool.

30. The apparatus of claim 27, wherein the instructions are further executable by the processor to cause the apparatus to:

transmit a second indication of a first transmit beam for the first sub-resource pool and of a second transmit beam for the second sub-resource pool.

* * * * *